United States Patent
Iwashita

(10) Patent No.: US 9,033,325 B2
(45) Date of Patent: May 19, 2015

(54) OPTICAL FIBER FUSION SPLICER

(71) Applicant: FUJIKURA LTD., Koto-ku, Tokyo (JP)

(72) Inventor: Yoshinori Iwashita, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/087,721

(22) Filed: Nov. 22, 2013

(65) Prior Publication Data

US 2014/0083141 A1    Mar. 27, 2014

Related U.S. Application Data

(63) Continuation of application No. PCT/JP2013/056109, filed on Mar. 6, 2013.

(30) Foreign Application Priority Data

| Mar. 29, 2012 | (JP) | 2012-078259 |
| Sep. 19, 2012 | (JP) | 2012-206309 |
| Dec. 13, 2012 | (JP) | 2012-272849 |

(51) Int. Cl.
    *B23Q 3/08*  (2006.01)
    *G02B 6/255* (2006.01)

(52) U.S. Cl.
    CPC .................. *G02B 6/2553* (2013.01)

(58) Field of Classification Search
    USPC .............. 269/32, 86, 87.2; 385/34, 35, 36, 37
    See application file for complete search history.

(56) References Cited

U.S. PATENT DOCUMENTS

| 5,586,211 | A  | * | 12/1996 | Dumitrou et al. | 385/135 |
| 2003/0091305 | A1 | * | 5/2003 | Brugger et al. | 385/95 |
| 2013/0230286 | A1 | * | 9/2013 | Fukuda et al. | 385/96 |
| 2014/0083141 | A1 |   | 3/2014 | Iwashita | |

FOREIGN PATENT DOCUMENTS

| CN | 203630390 U | 6/2014 |
| JP | 06-160662 A | 6/1994 |
| JP | 09-127357 A | 5/1997 |
| JP | 2686810 B2 | 12/1997 |
| JP | 10-288716 A | 10/1998 |
| JP | 11-023879 A | 1/1999 |
| JP | 11-090625 A | 4/1999 |
| JP | 2000-028842 A | 1/2000 |
| JP | 2001-066456 A | 3/2001 |

(Continued)

OTHER PUBLICATIONS

Office Action issued by Korean Patent Office in Korean Application No. 10-2013-7025290 mailed Jun. 24, 2014.

(Continued)

*Primary Examiner* — Lee D Wilson
*Assistant Examiner* — Shantese McDonald
(74) *Attorney, Agent, or Firm* — Sughrue Mion, PLLC

(57) ABSTRACT

An optical fiber fusion splicer that heats and fusion-splices optical fibers to each other, the optical fiber fusion splicer includes: a coating clamp installation base; a coating clamp that is attached to the coating clamp installation base and has a coating clamp lid that is openable and closable; and a first power source for advancing the coating clamp installation base and opening the coating clamp lid. An operation of opening the coating clamp lid is performed using the first power source after the fusion splicing is completed.

14 Claims, 24 Drawing Sheets

(56) References Cited

FOREIGN PATENT DOCUMENTS

| | | |
|---|---|---|
| JP | 2001-356216 A | 12/2001 |
| JP | 2003-167147 A | 6/2003 |
| JP | 2003-167148 A | 6/2003 |
| JP | 2003-167151 A | 6/2003 |
| JP | 2003-167152 A | 6/2003 |
| JP | 2003-207680 A | 7/2003 |
| JP | 2003-532132 A | 10/2003 |
| JP | 2005-164792 A | 6/2005 |
| JP | 3761192 B | 3/2006 |
| JP | 2009-300846 A | 12/2009 |
| JP | 4382694 B | 12/2009 |
| JP | 2010-072245 A | 4/2010 |
| JP | 2010-266567 A | 11/2010 |
| JP | 2011-090039 A | 5/2011 |

OTHER PUBLICATIONS

International Search Report issued in International Application No. PCT/JP2013/056109 mailed Apr. 9, 2013.

Office Action issued by Japanese Patent Office in Japanese Application No. 2012-078259 mailed Nov. 27, 2012.

Office Action issued by Japanese Patent Office in Japanese Patent Application No. 2012-206309 mailed Jul. 9, 2013.

Office Action issued by Japanese Patent Office in Japanese Application No. 2013-031453 mailed Sep. 24, 2013.

Communication dated Dec. 5, 2014 from the Chinese Patent Office in counterpart application No. 201310109353.0.

* cited by examiner

OPTICAL FIBER FUSION SPLICER

CROSS REFERENCE TO RELATED APPLICATIONS

This application is a continuation application based on a PCT Patent Application No. PCT/JP2013/056109, filed Mar. 6, 2013, whose priority is claimed on Japanese Patent Application No. 2012-78259, filed Mar. 29, 2012, Japanese Patent Application No. 2012-206309, filed Sep. 19, 2012, and Japanese Patent Application No. 2012-272849, filed Dec. 13, 2012, the entire content of which are hereby incorporated by reference.

BACKGROUND OF THE INVENTION

1. Field of the Invention

The present invention relates to an optical fiber fusion splicer, and particularly, to an optical fiber fusion splicer that has coating clamp installation bases, which advance and retract with respect to a heating and fusing portion that heats and fusion-splices optical fibers to each other, on both sides of the heating and fusing portion and that is provided with coating clamps for gripping and fixing the optical fibers on the coating clamp installation bases.

2. Description of the Related Art

As optical fiber fusion splicers, there are provided an apparatus (single-core machine) that performs discharging and heating on a pair of single-core optical fibers, which face each other in the longitudinal direction, between a pair of electrode rods to fusion-splice the single-core optical fibers, and an apparatus (multi-core machine) that performs discharging and heating on multi-core optical fibers (tape fibers) between a pair of electrode rods to collectively fusion-splice the multi-core optical fibers.

Additionally, as an optical fiber fusion splicer in the conventional art (hereinafter, also simply referred to as a fusion splicer), an apparatus having the following functions and configurations is widely provided (Japanese Unexamined Patent Application, First Publication No. H6-160662).

(1) Optical fibers are irradiated with light from two directions using two illumination light sources, and the optical fibers are biaxially imaged (biaxial observation) from two directions using two lenses and two cameras.

(2) A pair of V-grooves are provided on both sides of a heating and fusing portion that is a space between a pair of electrode rods.

The pair of V-grooves are configured so that the tips of the optical fibers to be fusion-spliced can be positioned between the pair of electrode rods.

Additionally, the pair of V-grooves are provided via the heating and fusing portion so as to run along the upper surface of an apparatus body where the pair of electrode rods are arranged, and are provided via the heating and fusing portion so as to be arranged on both sides in a direction (left-and-right direction) perpendicular to a direction (front-and-rear direction) in which the pair of electrode rods face each other.

As the optical fiber, a coated optical fiber, such as an optical fiber core or an optical fiber stand, is used in many cases.

An optical fiber glass portion obtained by removing the covering from the tip of an optical fiber (covered optical fiber) is arranged on a V-groove, and is gripped between a fiber clamp member that presses the optical fiber glass portion against the V-groove from above, and the V-groove.

Two sets of the V-grooves and the fiber clamp members are provided in correspondence with the two optical fibers arranged in the left-and-right direction.

(3) In order to grip covered portions of the left and right optical fibers, movable coating clamps are provided to move in the left-and-right directions of the apparatus body, or fiber holders are respectively arranged on both sides in the left-and-right direction so as to move in the left-and-right direction of the apparatus body.

(4) The discharge generated between the electrode rods is sensitive to air currents, and fluctuation of the discharge also occurs by receiving a slight air current.

Thus, a configuration provided with an openable and closable windshield cover that covers the electrode rods, the V-grooves, the fiber clamp members, and the coating clamps or the fiber holders is adopted as the fusion splicer.

The windshield cover is configured so as to provide a sealing structure in which the electrode rods or the like are covered to prevent air currents from reaching the discharge portion between the pair of electrode rods.

The windshield cover can be openable and closable by a manual operation.

As for the general fusion splicers in the conventional art, the operation of mounting the optical fibers is as follows.

(a) Coating clamp system: openable and closable lid portions of coating clamps attached to the apparatus (fusion splicer) are closed to pinch and grip single-core optical fibers with the coating clamps.

The coating clamp has the lid portion pivotally attached to the base plate fixed onto the coating clamp installation base of the apparatus (fusion splicer).

Large-sized coating clamps are able to grip single-core optical fibers with various diameters of covering.

Additionally, since the coating clamps are attached to the apparatus (fusion splicer), there is no possibility that the coating clamps will be lost.

(b) Fiber holder system: coating clamps (hereinafter also referred to as fiber holders) detachably placed on the coating clamp installation bases of the fusion splicer are used.

After optical fibers are gripped and fixed by the fiber holders detached from the coating clamp installation bases of the fusion splicer, the fiber holders are placed on the coating clamp installation bases of the fusion splicer.

The fiber holder has a base plate, and an openable and closable lid portion that is pivotally attached to the base plate.

The fiber holder grips an optical fiber between the base plate and the lid portion closed with respect to the base plate.

The optical fiber can be easily mounted on the fiber holder by respective processes of covering removal, cutting, and fusing.

However, in the Fiber holder system, it is necessary to prepare various kinds of fiber holders according to the diameter of covering or the number of core wires.

In the fusion splicing operation of optical fibers using the fusion splicer in the conventional art, first, the fiber set operation of mounting the optical fibers, the tips of which are subjected to covering removal (exposure of optical fiber glass portions), cleaning, and regular size cutting, on the fusion splicer is performed in a state where the windshield cover is opened.

The fiber set operation of the coating clamp system fusion splicer means the operation of pinching the covered portion of the optical fiber with the coating clamp.

The fiber set operation of the Fiber holder system fusion splicer means the operation of placing the fiber holder pinching the covered portion of the optical fiber on the coating clamp installation base of the fusion splicer.

If the mounting of the optical fibers to the fusion splicer is completed, the windshield cover is closed, and subsequently, a splicing start switch of the fusion splicer is turned on.

As a result, the fusion splicer advances the coating clamp installation bases toward the heating and fusing portion between the electrode rods.

In the structure in which the coating clamp installation base is advanced, a motor (installation base advancing motor) is driven to drive to move (advance) a moving and driving shaft of a drive mechanism via a motor gear and a drive mechanism gear, and the coating clamp installation base is pushed and advanced toward the heating and fusing portion by the moving and driving shaft.

This causes an optical fiber to advance to a predetermined position.

Next, the tips of the left and right optical fibers (optical fiber glass portions) are melted by the discharge between the electrode rods.

Then, the melted optical fibers are fusion-spliced by being further pushed in the axial direction while continuing to be heated by the discharge.

The discharge between the electrode rods stops automatically after being performed for a predetermined period of time.

The fusion splicer automatically performs a tension test for inspection of a spliced portion after the discharge stops.

Hereinafter, this tension test is also referred to as a proof test.

After the completion of the fusion splicing, the windshield cover is manually opened and the optical fibers are taken out.

In the proof test, the installation base advancing motor is rotationally driven in a direction opposite to the rotational direction thereof at the time of the advancement of the coating clamp installation base to retreat the moving and driving shaft of the drive mechanism.

As a result, a spring for a proof test installed between the base member and the coating clamp installation base of the fusion splicer elastically biases and retreats the coating clamp installation base in a direction away from the heating and fusing portion.

The retreat of the coating clamp installation base stops as a constant tension acts on the optical fibers that are spliced to each other and joined integrally, by the elastic biasing force of the spring for a proof test.

The moving and driving shaft of the drive mechanism retreats to a position where the moving and driving shaft does not come into contact with the coating clamp installation base the retreat of which has stopped as the tension acts on the mutually spliced optical fibers.

A gap is secured between the moving and driving shaft and the coating clamp installation base of the drive mechanism.

As a result, the tension test of the spliced portion between the optical fibers is performed by the elastic biasing force of the spring for a proof test.

For the lid portion of the coating clamp of the Coating clamp system fusion splicer, there is widely adopted a configuration having a lid plate that is pivotally attached to the base plate, a gripping rubber member that is provided at the lid plate to grip and fix the optical fiber together with the base plate when the lid plate is closed with respect to the base plate, and a clamp spring that is provided at the lid plate to elastically bias the gripping rubber member toward the base plate.

This coating clamp can maintain a state where the lid plate is closed with respect to the base plate, with an attractive force generated when a magnet assembled into the base plate magnetically attracts a ferromagnetic body, such as iron or the like, which is provided at the lid plate.

The attractive force of the magnet is adjusted to a degree such that an operator can open the lid plate closed with respect to the base plate with an operator's fingers.

The present inventor has verified the relationship between a force (hereinafter also referred to as a clamp load) that grips an optical fiber between the gripping rubber member, and the base plate with a magnetic attractive force, and a regulating force (hereinafter also referred to as a fiber grip force) that regulates slipping of an optical fiber with respect to the gripping rubber member and the base plate, regarding a general coating clamp used for the Coating clamp system fusion splicer.

The results are shown in FIG. 30.

FIG. 30 shows the results when the relationship between the clamp load and the fiber grip force when the clamp load is made to act is investigated, using various optical fibers, regarding the general coating clamp.

Proof tests are carried out by making a tensile load of 1.96 N to 2.26 N act on the optical fibers.

From FIG. 30, in order to stably maintain a gripped and fixed state without causing slip of the optical fibers even if the coating clamp makes a tensile load of 1.96 N to 2.26 N act on the optical fibers, it is necessary to set the clamp load to 2.94 N or more.

As the clamp spring of the coating clamp, a clamp spring that generates a pressing force of about 3.43 N is adopted in order to obtain a clamp load of 2.94 N or more.

Additionally, as the coating clamp, a coating clamp with grip force (hereinafter also referred to as a lid closing force) that acts between the base plate and the lid plate with the attractive force of the magnet of 3.43 N or more is adopted in order to realize stable maintenance in a state where the lid plate is closed with respect to the base plate.

However, in the coating clamp, with a lid gripping force of 3.43 N or more, it is necessary to strongly pull up and open the lid plate with respect to the base plate against the attractive force of the magnet with an operator's fingers when the lid portion closed with respect to the base plate is manually opened.

For this reason, there is a case where the operation of opening the coating clamp and taking out an optical fiber after the completion of a proof test takes substantial time and effort.

Additionally, the fusion splicing operations of hundreds of optical fibers may be performed per day.

For this reason, in the fusion splicers, shortening of the operation time of the fusion splicing of the optical fibers and improvement of operability are required.

In addition, the fiber holder generally has a configuration in which the lid plate itself capable of being magnetically attracted by the magnet assembled into the base plate functions as a hold-down member that holds down an optical fiber toward the base plate.

In the fiber holder, the whole lid portion is constituted by the lid plate.

Similar to the coating clamp used for the Coating clamp system fusion splicer, even regarding the fiber holder, it is necessary to strongly pull up and open the lid plate with respect to the base plate against the attractive force of the magnet with an operator's fingers when the lid portion closed with respect to the base plate is manually opened.

Accordingly, similar to the Coating clamp system fusion splicer, even regarding the Fiber holder system fusion splicer, there is a case where the operation of opening the coating clamp and taking out an optical fiber after the completion of a proof test takes substantial time and effort.

In view of this, as the coating clamp, for example as disclosed in Paragraphs (0013) to (0018) and FIG. 1 of Japanese Unexamined Patent Application, First Publication No. H6-160662, there is suggested a configuration in which a lid plate (movable-side clamp 22) is openable and closable by normal and reverse rotational driving of a motor 25 provided at a coating clamp installation base (base 17 of the fusion splicer) with respect to a base plate (fixed-side clamp 18).

Moreover, in the coating clamp (gripping device) disclosed in Japanese Unexamined Patent Application, First Publication No. H6-160662, the movable-side clamp 22 (lid plate) functions as a whole lid portion.

In this coating clamp, a rack 21 coupled and fixed to the movable-side clamp 22 via a locking pin 22 is engaged with a pinion gear 24 coupled to an output shaft of the motor 25 at a base 17 of the fusion splicer.

Then, in this coating clamp, the rack 21 is lifted and lowered by the normal and reverse rotational driving of the motor 25 to open and close the lid plate with respect to the base plate.

Hereinafter, this coating clamp is also referred to as a motor driven coating clamp.

However, in the above-described motor driven coating clamp, it is necessary to arrange an opening and closing driving motor (hereinafter also referred to as a lid plate opening and closing motor) of the lid plate inside the fusion splicer.

Additionally, in that case, devices, such as a motor for the advance and retract operation of the coating clamp installation base, a motor for the focalization operation of a camera for imaging an optical fiber, and driving force transmitting parts transmitting the driving forces from these motors, are highly densely provided inside the fusion splicer.

Additionally, in the case of the fusion splicer that has a self-core-alignment function, motors for alignment of the optical fibers set in the V-grooves on both left and right sides are also provided inside the fusion splicer.

In this way, devices, such as a motor, are densely arranged inside the fusion splicer.

For this reason, when the lid plate opening and closing motor is assembled into the fusion splicer, apparatus designs are greatly influenced, and an increase in size and cost of the fusion splicer is unavoidable.

Additionally, since the motor driven coating clamp grips an optical fiber between the base plate and the lid plate with the driving force of the motor, it is necessary to continue supplying electric power to the motor in order to maintain gripping and fixing of a covered portion of the optical fiber, and the amount of power consumed is large.

For this reason, when the fusion splicer provided with the motor driven coating clamp is driven with batteries outdoors, the number of operations of fusion splicing up to battery exchange is small.

An object of the invention is to provide a fusion splicer that can realize shortening of the operation time of fusion splicing of optical fibers and improvement in operability at low cost, without nearly (or completely) affecting apparatus size, and that can avoid an increase in power consumption.

SUMMARY

In order to solve the above problems, the invention provides the following configurations.

A first aspect of the invention is an optical fiber fusion splicer that heats and fusion-splices optical fibers to each other. The optical fiber fusion splicer includes a coating clamp installation base; a coating clamp that is attached to the coating clamp installation base and has a coating clamp lid that is openable and closable; and a first power source for advancing the coating clamp installation base and opening the coating clamp lid. An operation of opening the coating clamp lid is performed using the first power source after the fusion splicing is completed.

The optical fiber fusion splicer related to the first aspect may further include a drive mechanism that advances the coating clamp installation base with the power of the first power source. After the fusion splicing is completed, the drive mechanism may be separated from the coating clamp installation base, and the operation of opening the coating clamp lid may be performed with the power of the first power source transmitted via the drive mechanism after the separation from the coating clamp installation base.

The optical fiber fusion splicer related to the above first aspect may further include a pin that is placed at a lower portion of the coating clamp lid and is pushed up via a link part when a portion of the drive mechanism is separated and retreated from the coating clamp installation base. When the pin is pushed up, the pin may push up the coating clamp lid to perform the operation of opening the coating clamp lid.

The optical fiber fusion splicer related to the above first aspect may further include a second power source; and a windshield opening and closing mechanism that opens and closes the windshield cover, using the second power source. The operation of opening the coating clamp lid may be performed with the power generated by the first power source and the power generated by the second power source.

A second aspect of the invention is an optical fiber fusion splicer that heats and fusion-splices optical fibers to each other. The optical fiber fusion splicer includes a coating clamp installation base; a second power source; a coating clamp that is attached to the coating clamp installation base and has a coating clamp lid that is openable and closable; and a windshield opening and closing mechanism used to open and close a windshield cover and opening the coating clamp lid, using the second power source. An operation of opening the coating clamp lid is performed with the power generated by the second power source after the fusion splicing is completed.

The optical fiber fusion splicer may further include a coupling portion arranged at at least one of the coating clamp lid and the windshield cover. The coating clamp lid may be opened by the operation of opening the windshield cover when the coating clamp lid and the windshield cover are coupled to each other by the coupling portion.

The coupling portion may be a magnet that couples the coating clamp lid and the windshield cover to each other with magnetic attraction.

The coupling portion may be a lid engagement protruding piece that is provided so as to protrude from the windshield cover and is detachably engaged with the coating clamp lid to couple the coating clamp lid to the windshield cover.

The coating clamp may have an elastic member which adds a force in a direction in which the coating clamp lid is opened so that the coating clamp lid is easily opened.

The optical fiber fusion splicer related to the above first or second aspect may further include a fixing portion that is provided on the coating clamp installation base to allow the coating clamp to be fixable and detachable; and a fiber holder that is detachably mounted on the coating clamp installation base and has a lid plate that is openable and closable. The coating clamp and the fiber holder may have a replaceable structure, and the lid plate of the fiber holder may be opened by the same mechanism as the mechanism that opens the coating clamp lid when the fiber holder is mounted.

The optical fiber fusion splicer related to the above first or second aspect may further include a second coating clamp lid that faces the coating clamp via a discharge portion in an advance direction of the coating clamp installation base; and software that switches setting on whether to simultaneously open both of the coating clamp lid and the second coating clamp lid or whether to open only one of the coating clamp lid and the second coating clamp lid after the fusion splicing is completed.

In the optical fiber fusion splicers related to the above aspects of the invention, the operation of opening the coating clamp lid is automatically performed using the power source for advancing the coating clamp installation base after the fusion splicing is completed.

For this reason, according to the aspects of the invention, the opening of the coating clamp lid after the completion of the fusion splicing can be easily and smoothly performed compared to a case where an operator manually opens the coating clamp lid.

As a result, shortening of the operation time of the fusion splicing of the optical fibers and improvement of operability can be realized.

Since the optical fiber fusion splicer related to the above aspects of the invention has a configuration in which the power source for advancing the coating clamp installation base is used as a power source for opening the coating clamp lid, there is no need for separately providing a power source exclusive for opening the coating clamp lid.

That is, according to the aspects of the invention, the number of power sources to be installed can be reduced.

For this reason, according to the invention, it is possible to realize shortening of the operation time of the fusion splicing of the optical fibers and improvement in operability at low costs, without nearly (or completely) affecting the apparatus size.

Additionally, in the optical fiber fusion splicers related to the aspects of the invention, an increase in power consumption can be avoided by reduction in the number of power sources to be installed.

Additionally, in the optical fiber fusion splicers related to the above aspects of the invention, the manual opening of the coating clamp lid in a closed state can be performed without damaging component parts of a driving force transmission system for advancing the coating clamp installation base.

DETAILED DESCRIPTION OF THE PREFERRED EMBODIMENTS

Figure 1:
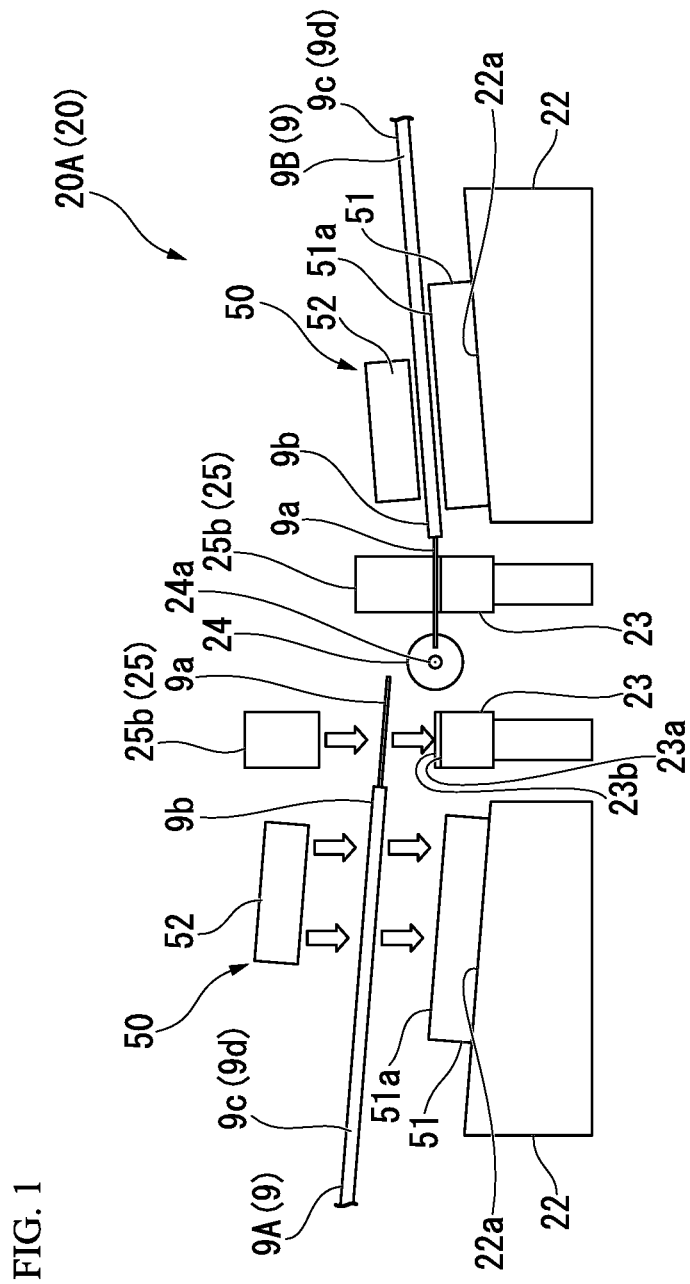
FIG. 1 is a front view schematically showing a configuration of an optical fiber fusion splicer related to an embodiment of the invention, and is a view showing the fusion splicer with a configuration in which coating clamps are arranged on both left and right sides of a heating and fusing portion.

An optical fiber fusion splicer (hereinafter, also simply referred to as a fusion splicer) related to an embodiment of the invention will be described below with reference to the drawings.

FIGS. 1 to 5 are views illustrating the overall structure of the fusion splicer 20.

The fusion splicer 20 (reference numeral 20A is appended in the drawings) shown in FIGS. 1 to 5 is a Coating clamp system fusion splicer.

In FIG. 1, a symbol 9A is appended to one of a pair of optical fibers 9 that is fusion-spliced by the fusion splicer 20A, and a symbol 9B is appended to the other.

As the optical fiber 9 illustrated here, a covered optical fiber with a configuration in which a covering material 9c (coating covering) made of a synthetic resin is deposited on and integrated with an outer periphery of an optical fiber glass portion 9a (naked optical fiber), such as an optical fiber core wire or an optical fiber element wire, is used.

As shown in FIGS. 1 to 5, the fusion splicer 20A has an apparatus body 21 having a box-shaped appearance, and a pair of the movable stages 22 assembled into an upper portion of the apparatus body 21 and arranged apart from each other.

Additionally, the fusion splicer 20A has a pair of electrode rods 24, coating clamps 50 each attached to one of the movable stages 22, a pair of grooved substrates 23, and a windshield cover 60, on the apparatus body 21.

In the fusion splicer 20A the tips of the optical fibers 9A and 9B can be heated and fused to each other by the discharge between tapered tips of the pair of electrode rods 24 that face each other.

As shown in FIGS. 2 to 5, the pair of electrode rods 24 are provided apart from each other via a discharge portion 24a that is a region (space) between the tips that face each other.

As shown in FIG. 1, the pair of movable stages 22 are provided apart from each other in a direction orthogonal to the interval direction of the pair of electrode rods 24.

Figure 2:
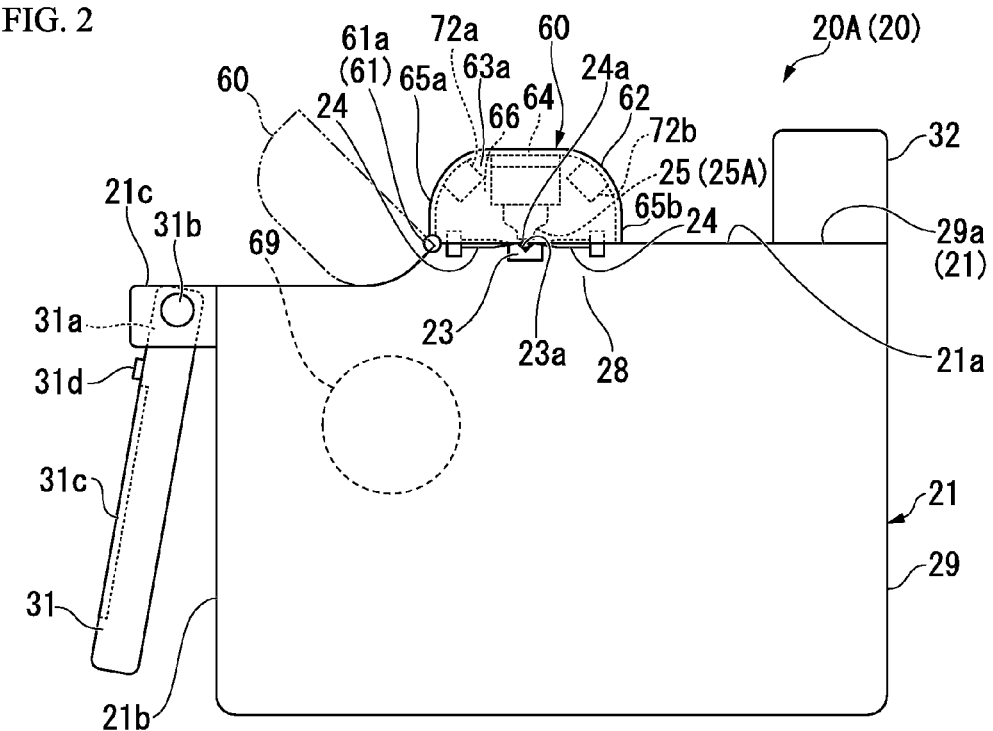
FIG. 2 is an overall side view (right side view) showing the optical fiber fusion splicer of FIG. 1, and is a view showing a state where a windshield cover is closed.
Figure 3:
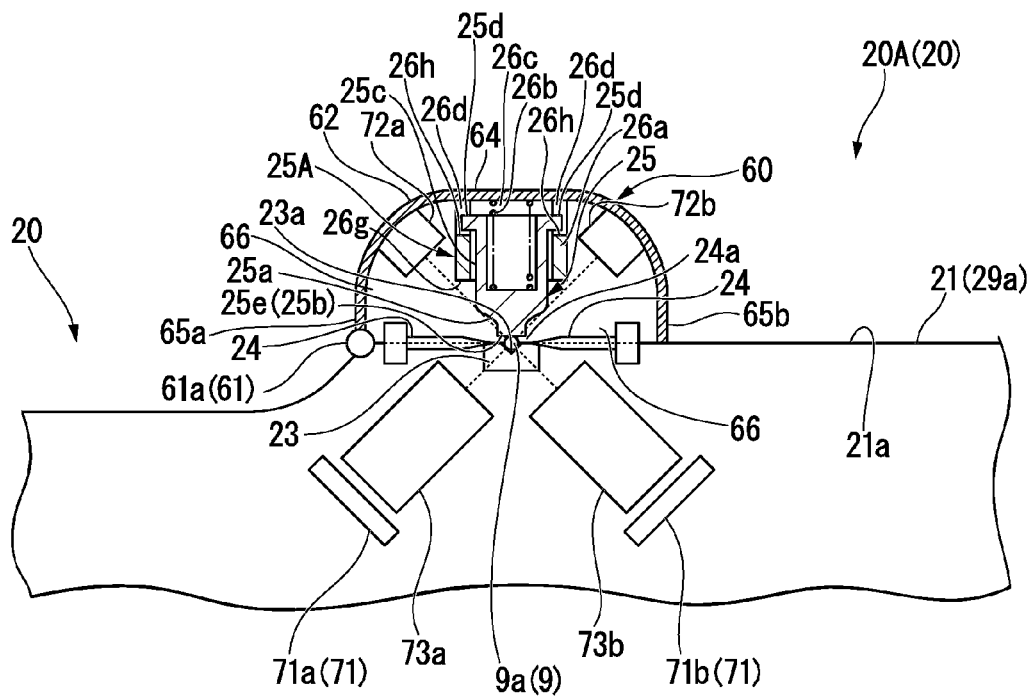
FIG. 3 is a side cross-sectional view (right side cross-sectional view) schematically showing a structure in the vicinity of the windshield cover of the optical fiber fusion splicer of FIG. 1, and is a view showing a state where the windshield cover is closed.

As shown in FIG. 2 and the like, the direction (the interval direction; a line segment including both the tips of the pair of electrode rods 24) in which the pair of electrode rods 24 face each other and the direction ( ) in which the pair of movable stages 22 face each other are perpendicular to an apparatus up-and-down direction (up-and-down direction in FIGS. 1 to 3).

In addition, the "apparatus up-and-down direction" means a direction that coincides with the up-and-down direction (up-and-down direction in FIGS. 1 to 3) of the apparatus body 21 in which an upper surface 21a on which the electrode rods 24 are arranged is defined as an upper side, and a lower surface opposite to the upper surface 21a is defined as a lower side.

In the present specification, the fusion splicer 20 will be described with the interval direction (the left-and-right direction of FIG. 1, the sheet depth direction of FIGS. 2 and 3, and the up-and-down direction of FIGS. 4 and 5) of the pair of movable stages 22 being defined as a left-and-right direction, and the interval direction (the sheet depth direction of FIGS. 1 and 19 and the left-and-right direction of FIGS. 2 to 5) of the pair of electrode rods 24 being defined as a front-and-rear direction.

Additionally, as shown in FIG. 2, the fusion splicer 20 has a monitor device 31 and a reinforcing sleeve heater 32 that are provided apart from each other in the front-and-rear direction in the apparatus body 21.

The fusion splicer 20 will be described with a monitor device 31 side (left side in FIGS. 2 and 3) being defined as the front and a reinforcing sleeve heater 32 side (right side in FIGS. 2 and 3) being defined as the rear.

Figure 4:
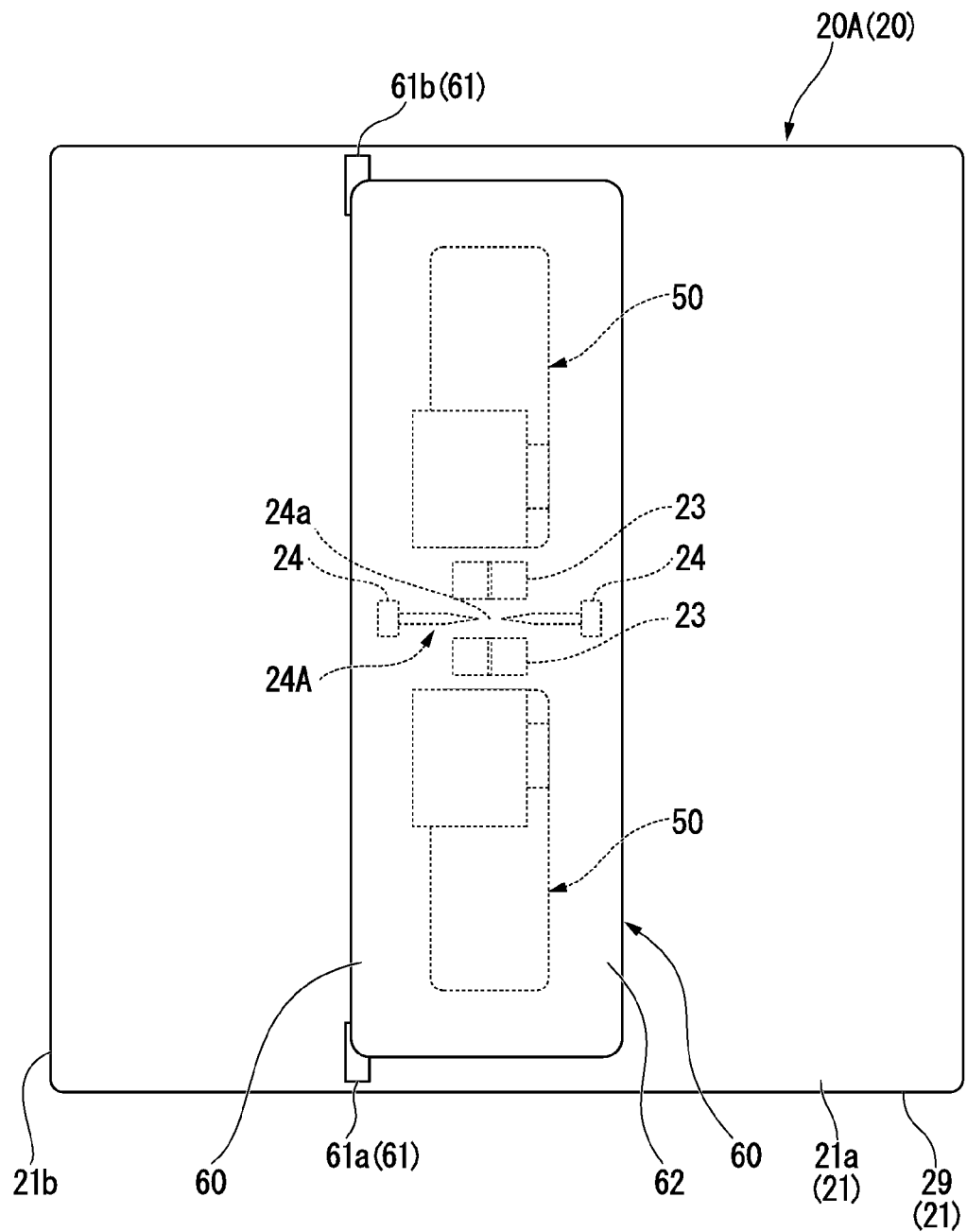
FIG. 4 is a plan view schematically showing the optical fiber fusion splicer of FIG. 1, and is a view showing a state where the windshield cover is closed.
Figure 5:
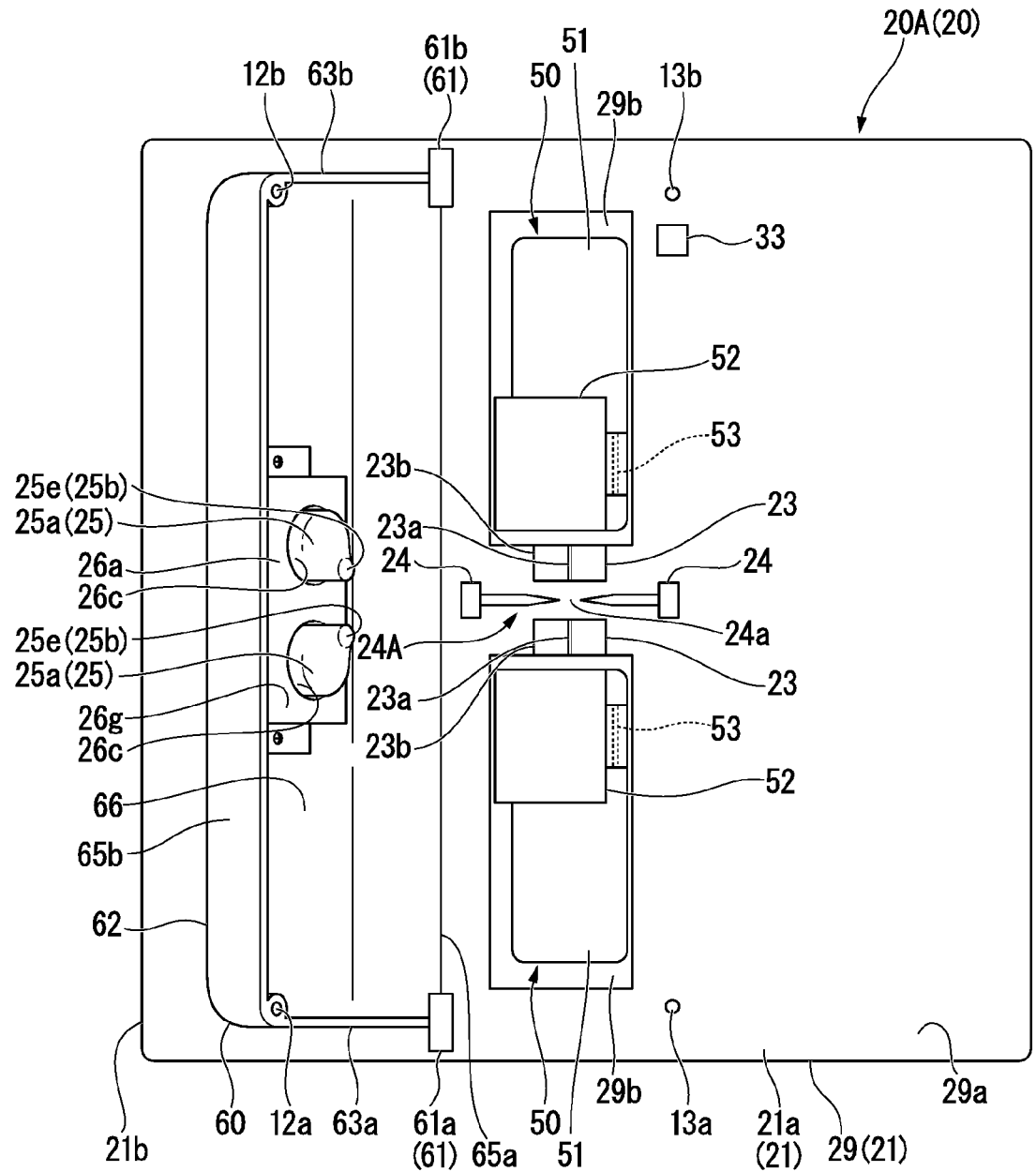
FIG. 5 is a plan view schematically showing the optical fiber fusion splicer of FIG. 1, and is a view showing a state where the windshield cover is opened.

In FIGS. 4 and 5, the left side is the front and the right side is the rear.

Additionally, in the present specification, description will be made with the upper side being defined as up and the lower side being defined as down, in FIGS. 1 to 3 and FIG. 20, and the sheet front side being defined as up and the sheet reverse side being defined as down, in FIGS. 4 and 5.

As shown in FIG. 2, the monitor device 31 is configured in the shape of a panel.

A hinge pin 31b for rotatably supporting the monitor device 31 with respect to the apparatus body 21 is attached to an upper front side of the apparatus body 21.

The hinge pin 31b, specifically, is supported by a protruding portion 21c that protrudes to the splicer front side from an upper portion of a front surface 21b (front surface of a housing 29) of the apparatus body 21.

A base end portion 31a of the monitor device 31 is attached to the apparatus body 21 via the hinge pin 31b.

Additionally, the monitor device 31 extends in a direction opposite to the side where the hinge pin 31b is provided, from the base end portion 31a.

The monitor device 31 can be changed in orientation with respect to the apparatus body 21 around an axis in the left-and-right direction of the fusion splicer by its rotation around the hinge pin 31b.

The rotational resistance of the monitor device 31 with respect to the apparatus body 21 is adjusted to such strength (magnitude) that the monitor device is directly touched by an operator's hand and is manually rotatable with respect to the apparatus body 21 and that, when a rotative force is not applied, the rotation of the monitor device can be stopped to a desired orientation with respect to the apparatus body 21.

As shown in FIG. 3, a camera 71 for imaging the optical fibers arranged in the discharge portion 24a (or also including a position near the discharge portion 24a) is assembled into the apparatus body 21 of the fusion splicer 20.

The fusion splicer 20 can cause an image captured by the camera 71 to be displayed on a display surface 31c of the monitor device 31 (refer to FIG. 2).

As shown in FIG. 3, the cameras 71 are assembled in two places of the apparatus body 21 where the positions of the cameras are shifted from each other in the front-and-rear direction.

Out of the cameras 71 in two places, reference numeral 71a in the drawing is appended to a first camera located on the front side, and reference numeral 71b in the drawing is appended to a second camera located on the rear side.

Additionally, lenses 73a and 73b arranged on the discharge portion 24a side of the respective cameras 71a and 71b are also assembled into the apparatus body 21.

The respective cameras 71a and 71b image the optical fibers 9 arranged in the discharge portion 24a and at positions near the discharge portion 24a via the lenses 73a or 73b provided in the apparatus body 21.

Imaging light sources 72a and 72b for irradiating the discharge portion 24a and positions near the discharge portion with light when imaging is performed using the cameras 71 are arranged inside the windshield cover 60.

The fusion splicer 20 realizes biaxial observation in which the optical fibers 9 are illuminated from two directions by the two imaging light sources 72a and 72b and the optical fibers 9 are biaxially imaged from respective directions by the two lenses 73a and 73b and the two cameras 71a and 71b.

In the fusion splicer 20, as shown in FIG. 3, when the windshield cover 60 is closed, the imaging light source 72a inside the windshield cover 60 and the second camera 71b are arranged to face each other via the discharge portion 24a, and the imaging light source 72b and the first camera 71a are arranged to face each other via the discharge portion 24a.

As the imaging light sources 72a and 72b, for example, light emitting diodes or the like can be suitably used.

In addition, the imaging light sources 72a and 72b may be turned on at least when the optical fibers are imaged using the cameras 71.

For this reason, the imaging light sources 72a and 72b, for example, may be turned on only when the optical fibers are imaged by the cameras 71 and may be turned off at all other times.

As shown in FIG. 2, the reinforcing sleeve heater 32 is fixed onto a rear end portion on the apparatus body upper surface 21a.

The reinforcing sleeve heater 32 is a device that covers a fusion-spliced portion between the optical fibers 9A and 9B with a heated and shrank heat-shrinkable reinforcing sleeve after the completion of fusion splicing and spliced portion inspection of the optical fibers 9A and 9B, and thereby reinforcing the fusion-spliced portion between the optical fibers 9A and 9B.

When an operator performs a fusion splicing operation between the optical fibers 9 using the fusion splicer 20, it is preferable to use the fusion splicer 20 in an orientation where the front surface side (front side) of the fusion splicer becomes an operator side.

It is preferable that the monitor device 31 be arranged along the front surface 21b of the apparatus body 21.

When the monitor device 31 is oriented along the front surface 21b with respect to the apparatus body 21, the rear surface of the monitor device opposite to the display surface 31c is arranged to face the apparatus body front surface 21b.

The monitor device 31 is orientated along the front surface 21b with respect to the apparatus body 21, thereby enabling an operator to easily view the display surface 31c from the front side of the fusion splicer 20.

As shown in FIG. 1, the movable stage 22 functions as a coating clamp installation base for attaching the coating clamp 50 (specifically, a lower clamp member 51 to be described below).

The coating clamp 50 has a plate-shaped lower clamp member 51 fixed onto the movable stage 22, and a plate-shaped upper clamp member 52 (hereinafter also referred to as a coating clamp lid) that is pivotally attached to the lower clamp member 51 and is openably and closably provided with respect to an upper surface 51a of the lower clamp member 51.

As shown in FIG. 5, the coating clamp lid 52 is rotatably attached to the lower clamp member 51 via a pivot 53 provided at the end portion of the lower clamp member 51 on an apparatus rear side (splicer rear side).

Figure 6A:
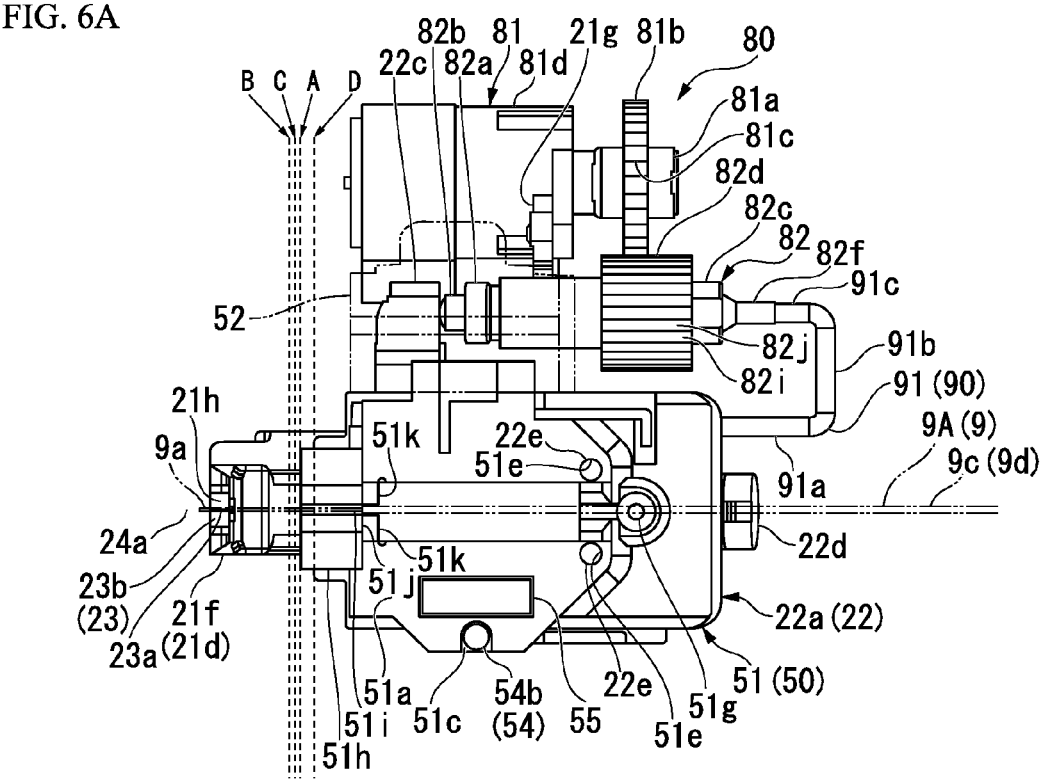
FIG. 6A is a plan view schematically showing a state where a movable shaft and a gear having a pressing portion of an installation base drive mechanism (micrometer) are at an initial position, and a coating clamp installation base is at a position (line A) at the time of fiber mounting, regarding the relationship between the installation base drive mechanism and the coating clamp installation base of the optical fiber fusion splicer of FIG. 1.
Figure 14A:
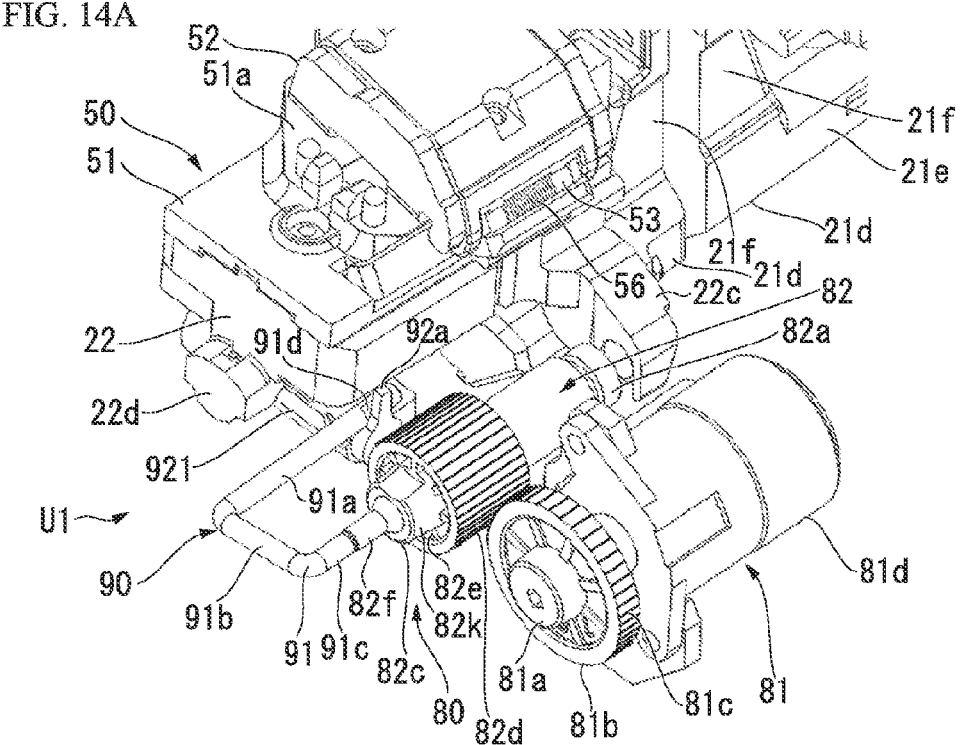
FIG. 14A is a view of the installation base drive mechanism of the installation base advancing mechanism, the coating clamp installation base, and the coating clamp in the state shown in FIGS. 8A and 8B, when viewed from a viewing point different from FIG. 13 of the diagonal rear side.
Figure 14B:
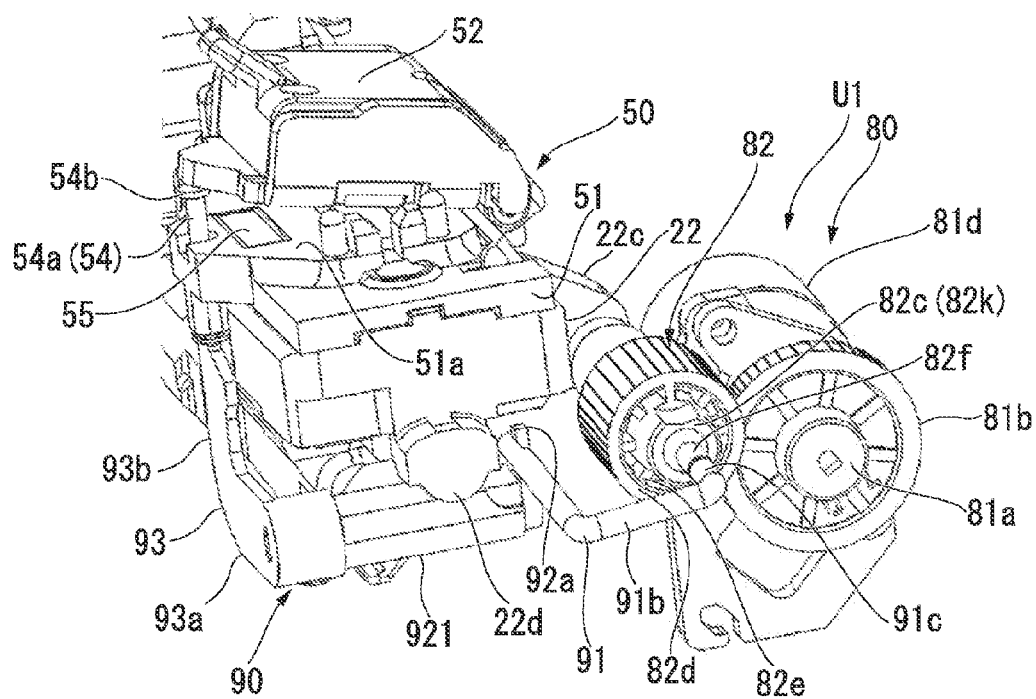
FIG. 14B is a view of the installation base drive mechanism of the installation base advancing mechanism, the coating clamp installation base, and the coating clamp in the state shown in FIGS. 8A and 8B, when viewed from a viewing point different from FIG. 13 of the diagonal rear side, and is a perspective view when viewed from a viewing point different from FIG. 14A.

As shown in FIG. 6A, FIG. 14A, and the like, the movable stage 22 has a plate-shaped installation base body 22a, and an advancement power receiving protrusion 22c that protrudes from the side surface of the installation base body 22a on one side in the splicer front-and-rear direction (splicer rear side in the illustrated example).

The lower clamp member 51 of the coating clamp 50, specifically, is fixed onto an upper surface 22b of the installation base body 22a of the movable stage 22.

In addition, the protruding position of the advancement power receiving protrusion 22c with respect to the installation base body 22a only needs to be a position where an installation base pushing member 82b of an installation base advancing mechanism 80 that advances the movable stage 22 toward the discharge portion 24a can be butted against and come into contact with the advancement power receiving protrusion, except for on the installation base body 22a, and is not limited to one side of the installation base body 22a in the splicer front-and-rear direction.

The protruding position of the advancement power receiving protrusion 22c with respect to the installation base body 22a may be, for example, a lower portion of the installation base body 22a.

As shown in FIG. 1, the coating clamp 50 can grip and fix the optical fiber 9 between the lower clamp member 51 and the coating clamp lid 52.

The coating clamp 50, specifically, grips and fixes a covered portion 9d, which is the portion of an outer periphery of the optical fiber glass portion 9a covered with the covering material 9c, between the lower clamp member 51 and the coating clamp lid 52.

Additionally, the coating clamp 50 can switch between the gripping and grip release of the optical fiber 9 by the opening and closing of the coating clamp lid 52 with respect to the upper surface 51a of the lower clamp member.

The coating clamp 50 has a configuration in which a permanent magnet 55 (lid closing magnet; refer to FIG. 10) that magnetically attracts a metal portion of the coating clamp lid 52 is assembled into the lower clamp member 51.

The permanent magnet 55 is the clamp lid holding means, and holds the coating clamp lid 52 closed with respect to the lower clamp member 51, to maintain a state where the coating clamp lid 52 is closed with respect to the lower clamp member 51.

As the clamp lid holding means, it is preferable that the holding state of the coating clamp lid 52 be realizable simply by manually closing the coating clamp lid 52 with respect to the lower clamp member 51 and that the holding be manually releasable.

The coating clamp 50 of the fusion splicer 20A can stably maintain the gripped and fixed state between the lower clamp member 51 and the coating clamp lid 52 without causing slip of an optical fiber by the magnetic attractive force of the permanent magnet 55, even if a tensile load of 1.96 to 2.26 N is made to act on the optical fiber.

Moreover, in the coating clamp 50, the magnetic attractive force of the permanent magnet 55 is set to such a magnitude that an operator is enabled to directly operate the coating clamp lid 52 with an operator's fingers and manually execute an opening and closing operation with respect to the lower clamp member 51.

The clamp lid holding means is not limited to the permanent magnet that magnetically attracts the metal portion of the coating clamp lid 52.

As the clamp lid holding means, for example, holding means or the like using an engaging claw capable of being manually detached can be adopted.

As the clamp lid holding means, holding means that is widely known in the conventional art with respect to the coating clamp of the fusion splicer can be adopted.

Figure 10:
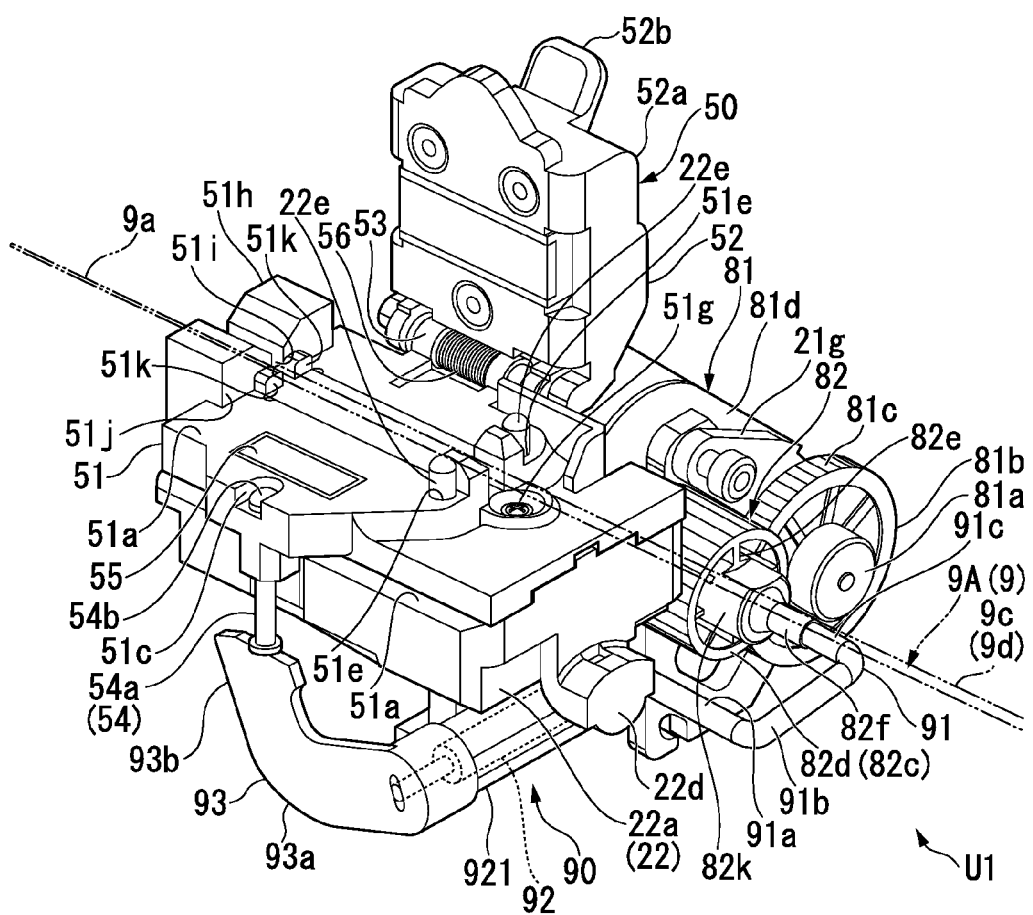
FIG. 10 is a view showing an installation base advancing mechanism (including the installation base drive mechanism), a clamp opening mechanism, the coating clamp installation base, and the coating clamp in the optical fiber fusion splicer of FIG. 1, and a perspective view schematically showing a state where the movable shaft and the gear having a pressing portion of the installation base drive mechanism are at the initial position, and the coating clamp installation base is at the position at the time of fiber mounting.

As shown in FIGS. 10 and 14A, the coating clamp 50 has an elastic member 56 (hereinafter also referred to as an opening auxiliary elastic member) for elastically biasing the coating clamp lid 52, to rotate the coating clamp lid with respect to the lower clamp member 51 to an opening limit position (the position of the coating clamp lid 52 shown in FIG. 10).

FIG. 10 shows a state where the coating clamp lid 52 is at the opening limit position.

In the coating clamp 50 of the illustrated example, the opening auxiliary elastic member 56 is, specifically, a torsion spring into which the pivot 53 is inserted.

Hereinafter, when the opening auxiliary elastic member 56 means the torsion spring, the opening auxiliary elastic member 56 is also referred to as a torsion spring.

In addition, the magnetic attractive force of the permanent magnet 55 is set to a range where, in consideration of the elastic biasing force of the opening auxiliary elastic member 56, the gripped and fixed state of the optical fiber by the coating clamp 50 can be stably maintained with an operator's fingers without causing slip even if a tensile load of 1.96 to 2.26 N is made to act on the optical fiber and an operator can directly execute the opening and closing operation of the coating clamp lid 52 by operator's fingers.

The opening auxiliary elastic member 56 only needs to be able to elastically bias the coating clamp lid 52 in the opening direction to rotate the coating clamp lid to the opening limit position, and is not limited to the torsion spring.

For example, as shown in FIG. 10, the opening limit position of the coating clamp lid 52 is a position when the coating clamp lid 52 is rotated at an angle that is more than 90 degrees and equal to or less than 120 degrees, from the state (closed state) where the coating clamp lid is closed with respect to the lower clamp member 51.

The elastic biasing force of the opening auxiliary elastic member 56 is set to a range where the coating clamp lid 52 opened with respect to the lower clamp member 51 can be rotated to the opening limit position, and the operation of closing the coating clamp lid 52 at the opening limit position with respect to the lower clamp member 51 can be manually and easily performed.

By setting the opening limit position of the coating clamp lid 52 to the position where the coating clamp lid 52 is rotated from the state where the coating clamp lid is closed with respect to the lower clamp member 51 at an angle that is more than 90 degrees and equal to or less than 120 degrees, the coating clamp lid 52 opened with respect to the lower clamp member 51 can be reliably prevented from falling down to the lower clamp member 51 side due to self-weight of the coating clamp lid 52.

Additionally, the coating clamp lid 52 is erected from the lower clamp member 51 at the opening limit position.

For example, in a case where the coating clamp lid 52 opened with respect to the lower clamp member 51 falls to the side opposite to the lower clamp member 51 via the pivot 53 in the splicer front-and-rear direction and is butted against and brought into contact with the apparatus body upper surface 21a, it is necessary to raise the coating clamp lid 52 from the apparatus body upper surface 21a when the coating clamp lid 52 is manually closed with respect to the lower clamp member 51.

Additionally, it is necessary to rotate the coating clamp lid 52 by approximately 180 degrees.

In contrast, when the opening limit position of the coating clamp lid 52 is set to a position where the coating clamp lid 52 is rotated from the state where the coating clamp lid is closed with respect to the lower clamp member 51 at an angle that is more than 90 degrees and equal to or less than 120 degrees, the lower clamp member 51 can be simply closed only by manually rotating the coating clamp lid 52 at the opening limit position so as to fall toward the upper surface 51a of the lower clamp member.

Accordingly, a configuration in which the opening limit position is set to a position where the coating clamp lid 52 is rotated from the state where the coating clamping lid closed with respect to the lower clamp member 51 at an angle that is more than 90 degrees and equal to or less than 120 degrees enables the operation of manually closing the coating clamp lid 52 opened with respect to the lower clamp member 51 to be efficiently and easily performed.

The attractive force of the permanent magnet 55 that acts on the coating clamp lid 52 declines drastically according to an increase in the distance between the coating clamp lid 52 and the permanent magnet 55.

The coating clamp 50 is configured such that the coating clamp lid 52 floats slightly with respect to the lower clamp member 51, for example, the rotation angle of the coating clamp lid 52 with respect to the lower clamp member 51 is less than 30 degrees and the elastic biasing force of the opening auxiliary elastic member 56 and the attractive force of the permanent magnet 55 that acts on the coating clamp lid 52 become equal to each other.

The position (position according to the rotation with respect to the lower clamp member 51) of the coating clamp lid 52 when the elastic biasing force of the opening auxiliary elastic member 56 and the attractive force of the permanent magnet 55 that acts on the coating clamp lid 52 become equal to each other is hereinafter also referred to as an attractive force and biasing force balanced position (attractive force and opening force balanced position).

If the coating clamp lid 52 exceeds the attractive force and biasing force balanced position when the coating clamp lid 52 in a state where the coating clamp lid is closed with respect to the lower clamp member 51 is opened, the elastic biasing force of the opening auxiliary elastic member 56 exceeds the attractive force of the permanent magnet 55 that acts on the coating clamp lid 52.

For this reason, if the coating clamp lid 52 is rotated to a position exceeding the attractive force and biasing force balanced position, the coating clamp lid is rotated to the opening limit position by the elastic biasing force of the opening auxiliary elastic member 56 after that time.

Accordingly, the coating clamp 50 can easily realize opening of the coating clamp lid 52 closed with respect to the lower clamp member 51 to the opening limit position.

Figure 7A:
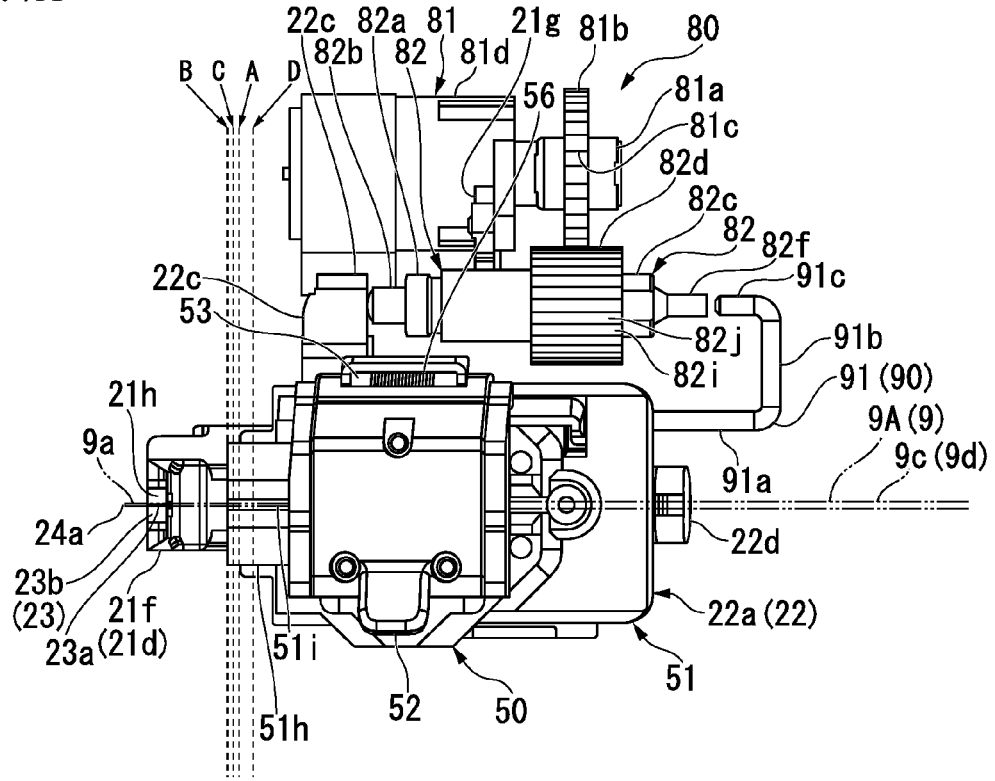
FIG. 7A is a plan view schematically showing a state where the movable shaft and the gear having a pressing portion of the installation base drive mechanism (micrometer) advance from the initial position, and the coating clamp installation base that has advanced correspondingly reaches a line B, regarding the relationship between the installation base drive mechanism and the coating clamp installation base of the optical fiber fusion splicer of FIG. 1.
Figure 7B:
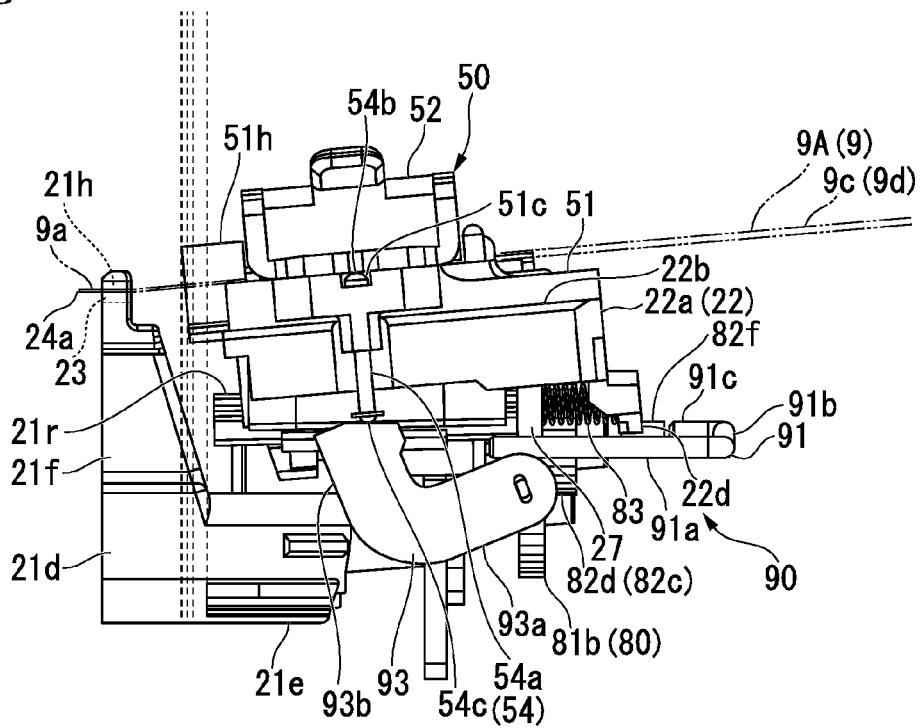
FIG. 7B is a front view schematically showing a state where the movable shaft and the gear having a pressing portion of the installation base drive mechanism (micrometer) advance from the initial position, and the coating clamp installation base that has advanced correspondingly reaches the line B, regarding the relationship between the installation base drive mechanism and the coating clamp installation base of the optical fiber fusion splicer of FIG. 1.

As shown in FIGS. 7A and 7B, the optical fiber 9 is gripped and fixed by the coating clamp 50 and thereby mounted on the fusion splicer 20A.

The coating clamp 50 functions as a fiber mounting portion for mounting the optical fiber 9 on the fusion splicer 20A.

In the operation of fusion-splicing the optical fibers 9A and 9B using the fusion splicer 20A, as shown by a virtual line of FIG. 2, the optical fiber 9 (covered portion 9d) is pinched between the lower clamp member 51 and the coating clamp lid 52 by manually operating the opening and closing of the coating clamp lid 52 of the coating clamp 50 in a state where the windshield cover 60 is opened as shown in FIG. 5.

As shown in FIG. 1, an optical fiber of which the optical fiber glass portion 9a is exposed by removing the covering material 9c of the tip portion of the optical fiber 9 in advance is used as the optical fiber 9 gripped and fixed by the coating clamp 50.

Additionally, the optical fiber 9 is gripped and fixed by the coating clamp 50 such that the tip side, from which the optical fiber glass portion 9a is exposed, protrudes from the coating clamp 50 to the discharge portion 24a side and the optical fiber glass portion 9a is placed on a positioning groove 23a formed in the grooved substrate 23.

Hereinafter, the portion of the optical fiber 9 that is made to protrude to the discharge portion 24a side from the coating clamp 50 (specifically, the lower clamp member 51) is also referred to as a protruding portion 90b.

As shown in FIGS. 1 and 5, the grooved substrates 23 are provided between the discharge portion 24a and the movable stages 22 on both left and right sides of the discharge portion, respectively.

The grooved substrates 23 on both left and right sides function to align the tips (specifically, the tip of the optical fiber glass portions 9a) of the pair of optical fibers 9A and 9B that are gripped and fixed by the coating clamps 50 and mounted on the fusion splicer 20A, on the same straight line (virtual straight line) in the splicer left-and-right direction with high precision by the positioning grooves 23a.

As shown in FIG. 6A, FIG. 6B, FIG. 16A, FIG. 16B, and the like, the apparatus body 21 has upper supporting members 21d that are fixed to the housing 29 and are arranged on the upper portion inside the housing 29, on both left and right sides of the discharge portion 24a.

The upper supporting member 21d has a base portion 21e fixed to the housing 29 via a part (not shown), and a standing wall portion 21f provided so as to protrude from the base portion 21e.

Figure 6B:
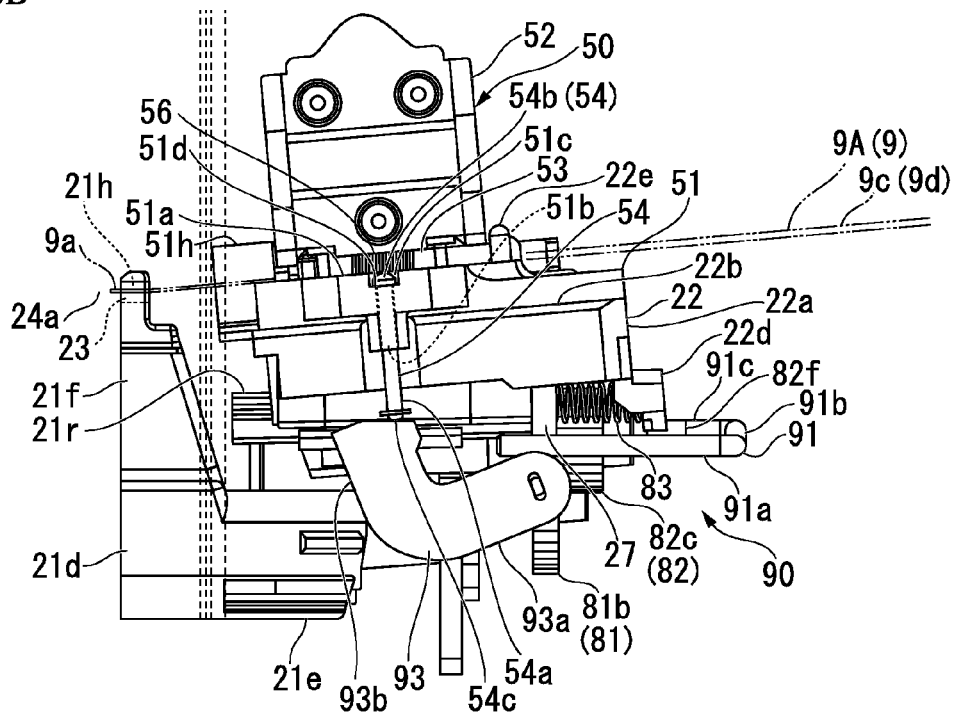
FIG. 6B is a front view schematically showing a state where the movable shaft and the gear having a pressing portion of the installation base drive mechanism (micrometer) are at the initial position, and the coating clamp installation base is at the position (line A) at the time of fiber mounting, regarding the relationship between the installation base drive mechanism and the coating clamp installation base of the optical fiber fusion splicer of FIG. 1.

As shown in FIG. 6A, FIG. 6B, and the like, the grooved substrate 23 is assembled into an upper end recessed groove 21h that is recessed from the upper end of the standing wall portion 21f of the upper supporting member 21d, and is fixed to the standing wall portion 21f.

The grooved substrate 23 is fixed to the housing 29 of the apparatus body 21 via the upper supporting member 21d.

The upper end recessed groove 21h of the upper supporting member 21d is formed to penetrate an upper end portion of the standing wall portion 21f of the upper supporting member 21d in the splicer left-and-right direction.

The upper surface 23b (substrate upper surface) of the grooved substrate 23 is arranged at a position shifted downward (the sheet reverse side of FIG. 6A and the lower side of FIG. 6B) from an upper end of the standing wall portion 21f of the upper supporting member 21d.

The positioning groove 23a of the grooved substrate 23 is formed in the upper surface 23b (substrate upper surface) of the grooved substrate 23 so as to extend in the splicer left-and-right direction.

FIG. 3 shows that the positioning groove 23a of the grooved substrate 23 of the fusion splicer 20A is a V-groove.

However, the positioning groove 23a has only to be able to position the optical fiber glass portion 9a exposed to the tip portion of the optical fiber 9 with high precision, and is not limited to the V-groove.

As the positioning groove 23a, for example, a round groove (groove with a semicircular cross-section), a U groove, a trapezoidal groove, or the like may be adopted.

In addition, the grooved substrate 23 of the fusion splicer 20A is preferably made of ceramic in order to withstand the heat of discharge heating.

In an apparatus (fusion splicer) having an axial core alignment mechanism for an optical fiber, the respective left and right grooved substrates 23 are fixed onto the left and right optical fiber axial core alignment mechanisms, respectively.

On the other hand, in the case of a fusion splicer with no axial core alignment mechanism for an optical fiber, the grooved substrate 23 may be directly fixed onto the apparatus body 21.

FIGS. 6A to 10 and FIGS. 12 to 14B show the vicinity of one of the movable stages 22 on both left and right sides in FIG. 1.

As shown in FIG. 6B, FIG. 7B, FIG. 8B, FIG. 9B, and the like, the movable stage 22 is guided by a rail 21r that is fixed to the housing 29 of the apparatus body 21 and provided inside an upper portion of the housing, and is provided so as to be movable in the left-and-right direction with respect to the apparatus body housing 29.

The rail 21r, specifically, is fixed to the housing 29 of the apparatus body 21 and arranged so as to extend in the splicer left-and-right direction.

Figure 16A:
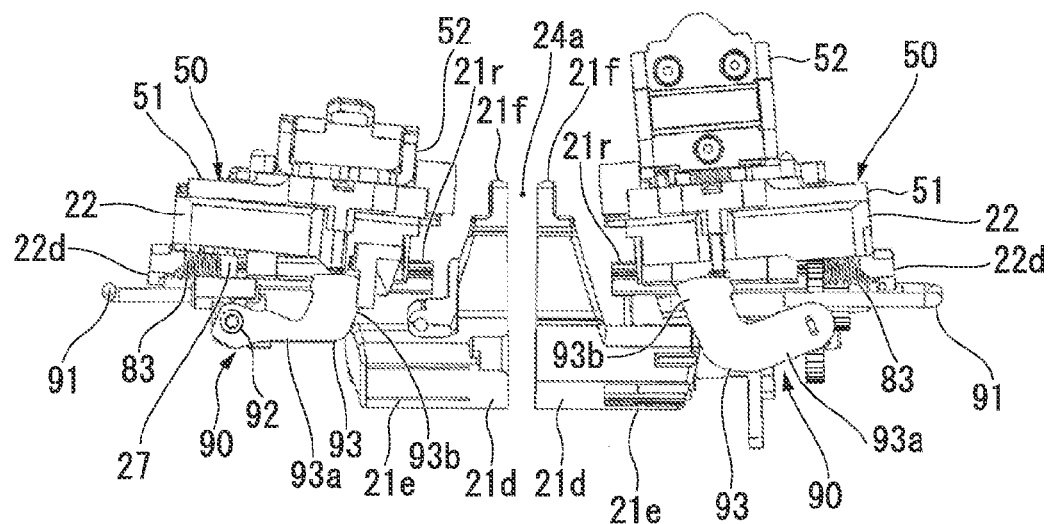
FIG. 16A is a schematic view illustrating setting switching (setting switching of software) of driving control of the installation base advancing mechanism (specifically, the advancing mechanism power source) of the optical fiber fusion splicer of FIG. 1, and a view showing the one-sided automatic opening of automatically opening only one of the coating clamps on both left and right sides.
Figure 16B:
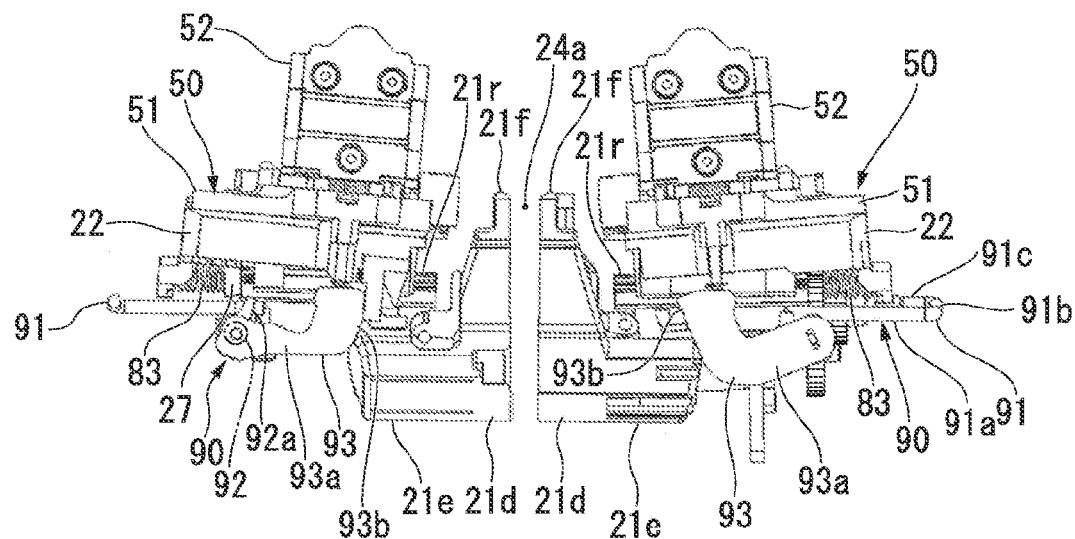
FIG. 16B is a schematic view illustrating the setting switching (setting switching of software) of the driving control of the installation base advancing mechanism (specifically, the advancing mechanism power source) of the optical fiber fusion splicer of FIG. 1, and a view showing the both-sided automatic opening of automatically opening the coating clamps on both left and right sides.

As shown in FIGS. 16A and 16B, the rails 21r are provided on both left and right sides of the discharge portion 24a, respectively.

The movable stages 22 on both left and right sides are respectively provided so as to be guided by the rails 21r and movable in the left-and-right direction with respective to the apparatus body 21, that is, so as to be capable of advancing toward and retracting from the discharge portion 24a.

As shown in FIG. 5, the coating clamps 50 on both left and right sides are provided on the movable stages 22, so that substantially all of the coating clamps are located on the apparatus body upper surface 21a that is an upper surface of the top plate portion 29a of the apparatus body 29.

Additionally, the positions of the coating clamps 50 on both left and right sides are respectively aligned with elongated window holes 29b formed in the top plate portion 29a of the apparatus body housing 29 so as to extend in the splicer left-and-right direction.

The coating clamp 50 advances and retreats toward the discharge portion 24a together with the movable stage 22.

The top plate portion 29a of the apparatus body housing 29 does not hinder the advance and retract movement of the coating clamp 50 and the movable stage 22 with respect to the discharge portion 24a.

As shown in FIG. 6A, FIGS. 11A to 14B, and the like, the fusion splicer 20 has the installation base advancing mechanism 80 that moves (advances) the movable stage 22 from a position apart from the discharge portion 24a toward the discharge portion 24a.

Additionally, as shown in FIG. 6B, FIG. 7B, FIG. 8B, FIG. 9B, and the like, the fusion splicer 20 has a proofing spring 83 for elastically biasing the movable stage 22 advanced by the installation base advancing mechanism 80 to move the movable stage in a direction (retreat direction) apart from the discharge portion 24a, and a clamp opening mechanism 90 used to open the coating clamp lid 52 closed with respect to the lower clamp member 51 of the coating clamp 50.

The installation base advancing mechanisms 80, the proofing springs 83, and the clamp opening mechanisms 90 are respectively provided on both sides of the discharge portion 24a in the splicer left-and-right direction.

As shown in FIG. 6B or the like, the proofing spring 83 is interposed between a projection-shaped installation base spring receiving portion 22d provided so as to protrude from the lower side of a rear end portion of the installation base body 22a of the movable stage 22, and a spring receiving member 27 fixed to the rear end of the rail 21r opposite to the front end thereof on the discharge portion 24a side.

The installation base spring receiving portion 22d is arranged at a position apart from the spring receiving member 27 in an opposite direction from the discharge portion 24a.

Specifically, the proofing spring 83 of the illustrated example is a compression coil spring.

The proofing spring 83 is provided between the installation base spring receiving portion 22d and the spring receiving member 27 such that the axis direction of the proofing spring is aligned with a direction in which the installation base spring receiving portion 22d and the spring receiving member 27 face each other.

The installation base advancing mechanism 80 has a power source 81 (first power source), and an installation base pushing member 82b that is moved in the splicer left-and-right direction by the driving force of the power source 81.

The installation base pushing member 82b performs, through the driving force of the power source 81, an advancing movement of pressing the movable stage 22 to move (push) the movable stage 22 toward the discharge portion 24a from a position apart from the discharge portion 24a, and a retracting movement that is a movement in a direction opposite to the advance movement.

The movable stage 22 is pushed by the installation base pushing member 82b from the side opposite to the side where the discharge portion 24a is provided, and thereby advanced toward the discharge portion 24a.

As shown in FIG. 6A and the like, the installation base pushing member 82b of the installation base advancing mechanism 80, specifically, presses the advancement power receiving protrusion 22c of the movable stage 22 from the side opposite to the side where the discharge portion 24a is provided, to thereby push and advance the movable stage 22.

Figure 11A:
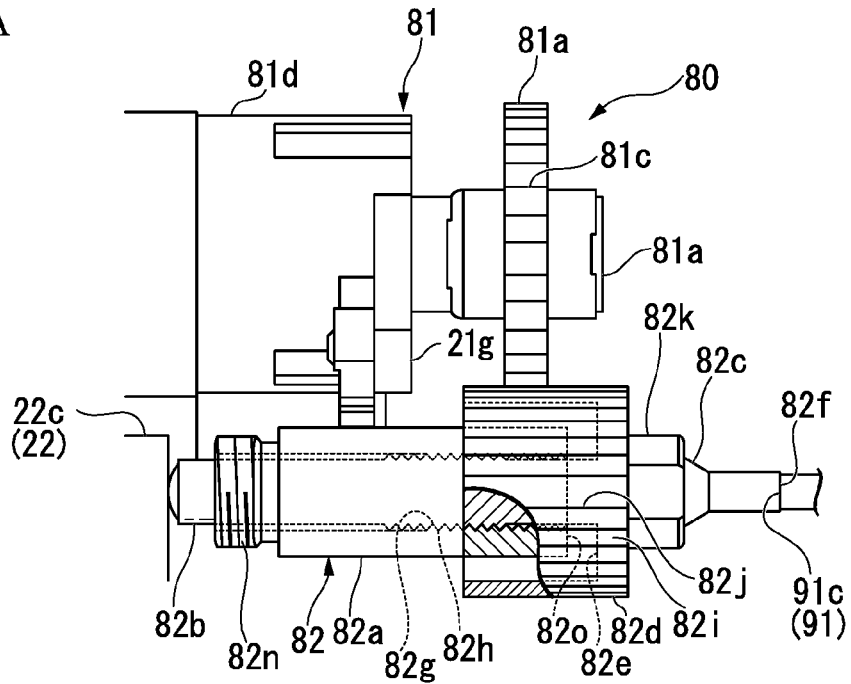
FIG. 11A is a plan view illustrating the structure of the installation base advancing mechanism of FIG. 10.

As shown in FIGS. 6A and 11A, the installation base advancing mechanism 80 of the illustrated example, specifically, has the power source 81, and a drive mechanism 82 (hereinafter also referred to as an installation base drive mechanism) that is driven by the driving force of the power source 81 to move (advance) the movable stage 22 from a position apart from the discharge portion 24a toward the discharge portion 24a.

The installation base drive mechanism 82 has the installation base pushing member 82b (specifically, the movable shaft to be described below).

The installation base pushing member 82b of the installation base drive mechanism 82 can perform the advance movement and the retreat movement by the driving force of the power source 81.

The installation base drive mechanism 82 pushes and advances the movable stage 22 toward the discharge portion 24a by the advance movement of the installation base pushing member 82b.

The power source 81 of the installation base advancing mechanism 80 is hereinafter also referred to as an advancing mechanism power source.

As the advancing mechanism power source 81, a power source that is driven by an electromagnetic force to generate power is preferable, and for example, an electric motor, an electromagnet, a solenoid, or the like is preferable.

The advancing mechanism power source 81 illustrated in FIGS. 6A, FIGS. 11A to 14B, and the like is, specifically, an electric motor and the installation base drive mechanism 82 is, specifically, a micrometer.

Hereinafter, the advancing mechanism power source 81 is also referred to as an electric motor, and the installation base drive mechanism 82 is also referred to as a micrometer.

FIG. 11A is an enlarged plan view showing the structure of the installation base drive mechanism 82 (micrometer).

As shown in FIG. 11A and the like, the micrometer 82 of the illustrated example has a barrel 82a fixed to the housing 29 of the apparatus body 21 via a fixing member (not shown), a movable shaft 82b inserted into the barrel 82a, and a gear 82c having a pressing portion fixed to the movable shaft 82b.

The micrometer 82 is attached to the housing 29 by screwing a male thread portion 82n formed at an outer periphery of the tip portion of the barrel 82a into a female thread portion (not shown) formed in the housing 29.

The female thread portion of the housing 29 is formed in a protrusion inside the housing 29.

The female thread portion barrel 82a is fixed to the housing 29 by screwing the male thread portion 82n into the housing 29.

In addition, the male thread portion 82n of the outer periphery of the tip portion of the barrel 82a is shown only in FIG. 11A, and the illustration thereof is omitted in the other drawings.

The movable shaft 82b is threadedly attached to the barrel 82a by making a male thread portions 82h formed at an outer periphery of a central portion in the longitudinal direction (axis direction) of the movable shaft mesh with a female thread portion 82g formed in at an inner peripheral surface of the barrel 82a.

The gear 82c having a pressing portion is fixed to an end portion (rear end portion) of the movable shaft 82b made to protrude from a rear end portion (base end portion) of the barrel 82a.

As shown in FIG. 11A, the gear 82c having a pressing portion has a cylindrical sleeve-like gear body 82d, and a rear wall portion 82k supported via a supporting member 82e that protrudes from the inner surface of the sleeve-like gear body 82d to the inside of one end portion of the sleeve-like gear body 82d in the axis direction.

The sleeve-like gear body 82d of the gear 82c having a pressing portion accommodates the rear end portion (base end portion) of the barrel 82a therein.

The sleeve-like gear body 82d has the rear end portion of the barrel 82a inserted thereinto.

The rear wall portion 82k is fixed to one end portion (rear end portion) of the movable shaft 82b in the axis direction, and is arranged on the rear side (base end side) of the barrel 82a.

The movable shaft 82b has a rear end portion (base end portion) fixed to the rear wall portion 82k of the gear 82c having a pressing portion, and is integrated with the gear 82c having a pressing portion.

The supporting member 82e protrudes in radial direction of the movable shaft 82b from the rear wall portion 82k so as to be arranged on the rear side of the barrel 82a, and connects the rear wall portion 82k and a rear end portion of the sleeve-like gear body 82d.

Additionally, the gear 82c having a pressing portion has a pressing protrusion 82f that protrudes from the rear wall portion 82k to the side opposite to the side where the movable shaft 82b is provided.

Figure 11B:
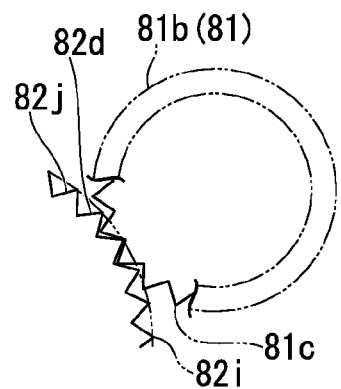
FIG. 11B is a view illustrating the structure of the installation base advancing mechanism of FIG. 10, and is an enlarged view illustrating the relationship between an outer peripheral gear portion of a sleeve-like gear body of the gear having a pressing portion of the installation base drive mechanism (micrometer), and a drive gear rotationally driven with the power generated by an advancing mechanism power source.
Figure 11C:
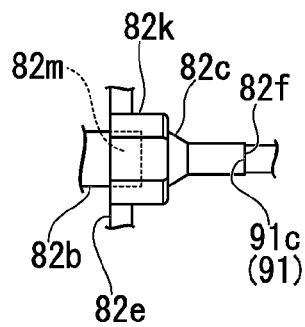
FIG. 11C is a view illustrating the structure of the installation base advancing mechanism of FIG. 10, and is a view illustrating an example (press-fitting) of the fixed structure of the movable shaft to a rear wall portion of the gear having a pressing portion of the installation base drive mechanism (micrometer).

As shown in FIG. 11C, the movable shaft 82b of the installation base drive mechanism 82 of the illustrated example has one portion (rear end portion) press-fitted into a fitting hole 82m formed in the rear wall portion 82k of the gear 82c having a pressing portion, and is fixed to and integrated with the gear 82c having a pressing portion.

In addition, a technique for fixing and integrating one end (rear end) of the movable shaft 82b to the rear wall portion 82k of the gear 82c having a pressing portion is not particularly limited but, for example, screwing or the like can also be adopted.

Additionally, as the micrometer 82, a configuration in which the movable shaft 82b is formed integrally with the gear 82c having a pressing portion may be adopted.

In FIG. 11A, the movable shaft 82b and the sleeve-like gear body 82d of the gear 82c having a pressing portion are coaxially provided at the barrel 82a.

Additionally, the movable shaft 82b and the sleeve-like gear body 82d are provided so as to be rotatable around the central axis of the barrel 82a with respect to the barrel 82a.

The movable shaft 82b rotates integrally with the gear 82c having a pressing portion by rotating the gear 82c having a pressing portion with respect to the barrel 82a.

As a result, the movable shaft 82b moves in the axis direction of the barrel 82a relative to the barrel 82a as the threaded engaging position of the male thread portion 82h of the movable shaft with respect to the female thread portion 82g inside the barrel 82a changes.

Additionally, as the movable shaft 82b moves in the axis direction of the barrel 82a relative to the barrel 82a, the gear 82c having a pressing portion also moves in the axis direction of the barrel 82a relative to the barrel 82a integrally with the movable shaft 82b.

In FIG. 6A and FIG. 11A, the movable shaft 82b penetrates the inside of the barrel 82a.

In FIGS. 6A and 11A, the movable shaft 82b protrudes from the tip (front end) of the barrel 82a at the tip side of the movable shaft opposite to the base end side fixed to the rear wall portion 82k of the gear 82c having a pressing portion.

As the micrometer 82 rotates the gear 82c having a pressing portion, the length of the movable shaft 82b that protrudes from the tip of the barrel 82a can be changed.

The micrometer 82 is provided so that the central axis of the barrel 82a and the movable shaft 82b and the splicer left-and-right direction coincide with each other.

Additionally, the micrometer 82 is provided within the apparatus body 21 (within the housing 29) in an orientation such that the tip of the barrel 82a in the splicer left-and-right direction is the discharge portion 24a side, and the side where the rear wall portion 82k and the pressing protrusion 82f of the gear 82c having a pressing portion are arranged is the side opposite to the side where the discharge portion 24a is provided.

In the present specification, the installation base drive mechanism 82 will be described with the discharge portion 24a side in the splicer left-and-right direction being defined as the front (left side of FIG. 11A) and the side (right side of FIG. 11A) opposite to the discharge portion 24a being defined as the rear.

In addition, the movable stage 22, the coating clamp 50, the whole installation base advancing mechanism 80, the proofing spring 83, and the clamp opening mechanism 90 will also be described with the discharge portion 24a side in the splicer left-and-right direction being defined as the front and the side opposite to the side where the discharge portion 24a is provided being defined as the rear.

Additionally, the front side of the installation base advancing mechanism 80 is hereinafter also referred to as a drive mechanism front side, and the rear side of the installation base advancing mechanism is hereinafter also referred to as a drive mechanism rear side.

As shown in FIG. 11A and the like, the rear wall portion 82k and the pressing protrusion 82f of the gear 82c having a pressing portion are arranged on the rear side (drive mechanism rear side) of the rear end 82o of the barrel 82a.

Additionally, the central portion of the cross-section of the pressing protrusion 82f perpendicular to the front-and-rear direction of the drive mechanism is located on the central axis of the sleeve-like gear body 82d.

As shown in FIGS. 11A and 11B, in the gear 82c having a pressing portion, a gear portion 82i (hereinafter also referred to as an outer peripheral gear portion) formed at an outer periphery of the sleeve-like gear body 82d of the gear 82c having a pressing portion meshes with a gear 81b (hereinafter also referred to as a drive gear) fixed to the drive shaft 81a of the advancing mechanism power source 81.

The gear 82c having a pressing portion is rotated around an axis with respect to the barrel 82a by the rotational driving of the drive shaft 81a of the advancing mechanism power source 81.

As shown in FIG. 6A, FIG. 11A, and the like, the electric motor 81 has a sheathing case 81d fixed to the housing 29 of the apparatus body 21.

In the electric motor 81, a drive gear 81b having a drive shaft that is coaxial with a drive shaft 81a is fixed to a protruding portion (hereinafter also referred to as an axial protruding portion) of the drive shaft 81a that protrudes from the sheathing case 81d.

The drive shaft 81a and the drive gear 81b of the advancing mechanism power source 81 are rotationally driven around a rotation axis in the splicer left-and-right direction.

The sheathing case 81d of the electric motor 81, specifically, is fixed to an auxiliary supporting member 21g fixed to the housing 29 of the apparatus body 21.

The electric motor 81 (specifically, the sheathing case 81d) is attached to the housing 29 of the apparatus body 21 via the auxiliary supporting member 21g.

The outer peripheral gear portion 82i of the sleeve-like gear body 82d of the gear 82c having a pressing portion is constituted by toothed portions 82j provided so as to protrude from a plurality of places in a direction around the axis of the sleeve-like gear body 82d.

Each toothed portion 82j is formed in the shape of a ridge that extends in the splicer left-and-right direction (front-and-rear direction of the drive mechanism).

Ridge-like toothed portions 81c that extend in the splicer front-and-rear direction are provided so as to protrude from a plurality of places of an outer periphery of the drive gear 81b of the advancing mechanism power source 81.

The toothed portions 82j of the outer peripheral gear portion 82i of the gear 82c having a pressing portion and the toothed portions 81c of the drive gear 81b of the advancing mechanism power source 81 extend parallel to each other.

The toothed portions 81c of the drive gear 81b of the advancing mechanism power source 81 mesh with the outer peripheral gear portion 82i of the gear 82c having a pressing portion of the installation base drive mechanism 82.

The gear 82c having a pressing portion is rotated by the rotational driving of the drive shaft 81a and the drive gear 81b of the advancing mechanism power source 81.

The advancing mechanism power source 81 can perform normal and reverse switching of the drive gear 81b in the rotational direction.

As shown in FIG. 6A, FIG. 7A, FIG. 8A, and FIG. 9A, the gear 82c having a pressing portion is rotated by the rotational driving of the drive gear 81b of the advancing mechanism power source 81, and thereby moves in the axis direction of the barrel 82a together with the movable shaft 82b with respect to the barrel 82a.

The rotation of the drive gear 81b of the advancing mechanism power source 81 that moves the gear 82c having a pressing portion and the movable shaft 82b to the front side with respect to the barrel 82a is hereinafter referred to as a normal rotation, and the rotation of the drive gear 81b in a direction opposite to the normal direction is hereinafter also referred to as a reverse rotation.

As already described, the toothed portions 82j of the outer peripheral gear portion 82i of the gear 82c having a pressing portion and the toothed portions 81c of the drive gear 81b of the advancing mechanism power source 81 are formed so as to extend parallel to each other.

For this reason, as the gear 82c having a pressing portion is rotated by the rotational driving of the drive gear 81b of the advancing mechanism power source 81, the gear having a pressing portion smoothly moves in the axis direction of the barrel 82a with respect to the barrel 82a while slidingly moving in the axis direction (in the splicer left-and-right direction) of the drive shaft 81a with respect the drive gear 81b of the advancing mechanism power source 81.

When the gear 82c having a pressing portion is rotated by the normal rotational driving of the drive gear 81b of the advancing mechanism power source 81, the gear having a pressing portion moves toward the drive mechanism front side relative to the barrel 82a while slidingly moving in the axis direction of the drive shaft 81a with respect to the drive gear 81b.

Additionally, when the gear 82c having a pressing portion is rotated by the reverse rotational driving of the drive gear 81b of the advancing mechanism power source 81, the gear having a pressing portion moves toward the drive mechanism rear side relative to the barrel 82a while slidingly moving in the axis direction of the drive shaft 81a with respect to the drive gear 81b.

As shown in FIGS. 6A and 7A, the length of the movable shaft 82b of the installation base drive mechanism 82 that protrudes from the tip (front end) of the barrel 82a increases as the gear 82c having a pressing portion moves toward the drive mechanism front side with respect to the barrel 82a when the gear 82c having a pressing portion is rotated (normally rotated) by the normal rotational driving of the advancing mechanism power source 81.

Then, the movable shaft 82b presses the movable stage 22 (specifically, the advancement power receiving protrusion 22c) by the front end thereof that protrudes from the tip of the barrel 82a, and advances (pushes) the movable stage 22 toward the discharge portion 24a.

The movable shaft 82b of the installation base drive mechanism 82 functions as an installation base pushing member that pushes and advances the movable stage 22.

As shown in FIGS. 6A and 11A, when a power switch (not shown) for the fusion splicer 20A is brought into an ON state from an OFF state, the movable shaft 82b of the installation base drive mechanism 82 is brought into a state where the tip side thereof slightly protrudes from the tip of the barrel 82a.

At this time, the movable shaft 82b and the gear 82c having a pressing portion are at positions (position shown in FIGS. 6A and 11A; hereinafter also referred to as an initial position) where the movable shaft and the gear having a pressing portion are movable toward the drive mechanism front side with respect to the barrel 82a by the rotation around an axis with respect to the barrel 82a, and are movable toward the drive mechanism rear side.

Additionally, at this time, as shown in FIGS. 6A and 11A, in the movable stage 22, the advancement power receiving protrusion 22c of the movable stage is pressed against the tip of the movable shaft 82b at the initial position from the drive mechanism front side (discharge portion 24a side) by the elastic biasing force of the proofing spring 83, and the advancement power receiving protrusion 22c is brought into contact with the tip of the movable shaft 82b so as to butt thereagainst.

The position of the movable stage 22 with respect to the apparatus body housing 29 in the splicer left-and-right direction at this time is also referred to as a position at the time of fiber mounting.

The position at the time of fiber mounting is further apart from the discharge portion 24a than the advance limit position (position shown in FIGS. 7A and 7B) of the movable stage 22 with respect to the discharge portion 24a by the driving of the installation base advancing mechanism 80.

In addition, the position of the coating clamp 50 when the movable stage 22 is located at the position at the time of fiber mounting is hereinafter also referred to as a position at the time of fiber mounting.

As shown in FIG. 1, when the power switch is brought into an ON state from an OFF state, the fusion splicer 20A is brought into a state where the movable stages 22 and the coating clamps 50 on both left and right sides are arranged at the positions at the time of fiber mounting.

Additionally, at this time, the proofing spring 83 is brought into a state where the proofing spring is slightly compressed between the installation base spring receiving portion 22d and the spring receiving member 27.

As shown in FIG. 10, FIGS. 12 to 14B, and the like, the clamp opening mechanism 90 has a link part 91, an opening lever shaft 92 (refer to FIGS. 10 and 13), and an opening lever 93 fixed to the opening lever shaft 92 and rotating integrally with the opening lever shaft 92.

The opening lever shaft 92 is shown only in FIGS. 10, 13, 15A, 15B, 16A, 16B, and 29A, and the illustration thereof is omitted in the other drawings.

As shown in FIG. 6B, FIG. 7B, and the like, the coating clamp 50 has a thrust-up pin 54 that is elevatably provided at the lower clamp member 51.

Figure 8A:
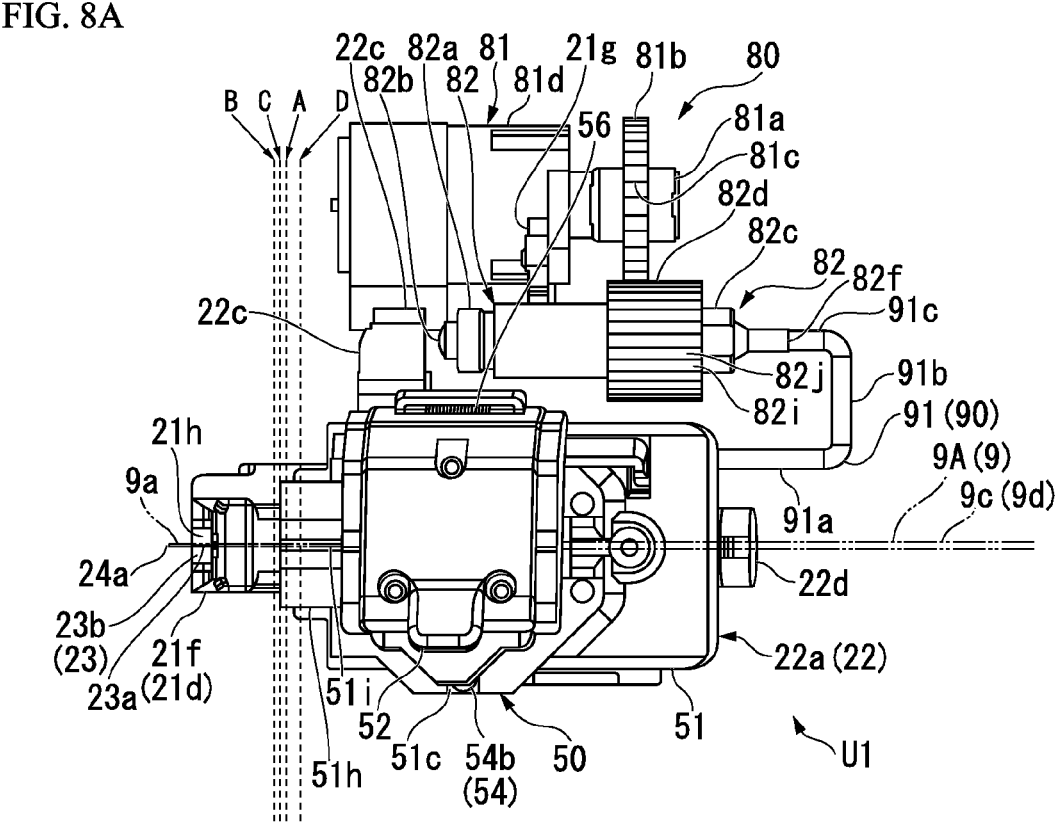
FIG. 8A is a plan view schematically showing a state where the movable shaft and the gear having a pressing portion of the installation base drive mechanism (micrometer) move further rearward than the initial position, and a clamp opening mechanism that is driven correspondingly rotates and lifts a coating clamp lid of the coating clamp to release gripping and fixing of an optical fiber, regarding the relationship between the installation base drive mechanism and the coating clamp installation base of the optical fiber fusion splicer of FIG. 1.
Figure 8B:
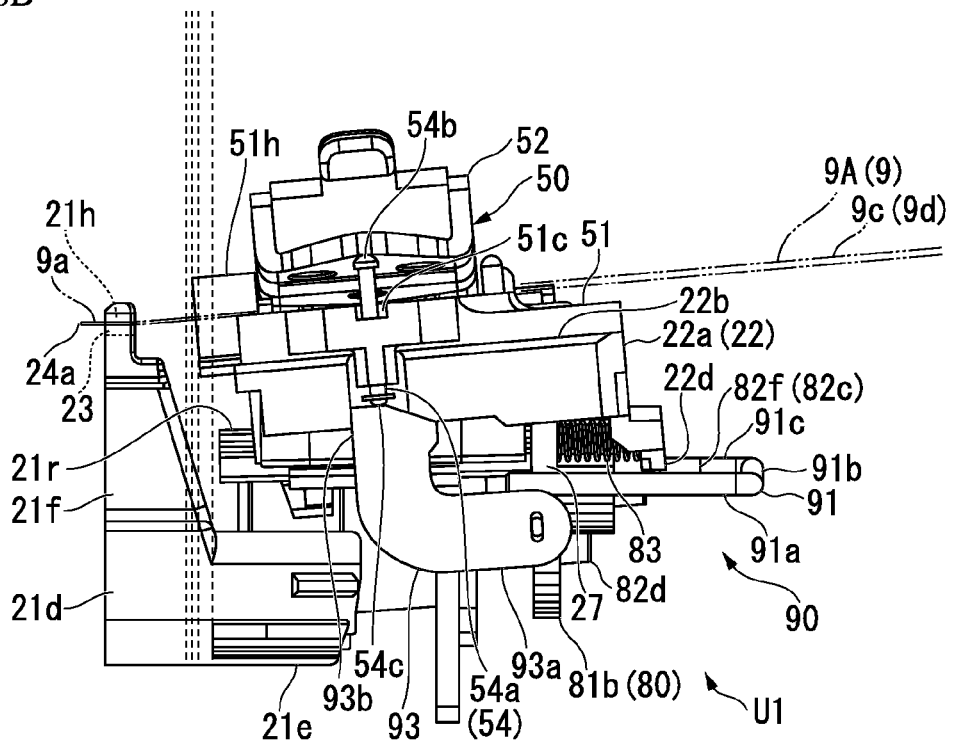
FIG. 8B is a front view schematically showing a state where the movable shaft and the gear having a pressing portion of the installation base drive mechanism (micrometer) move further rearward than the initial position, and the clamp opening mechanism that is driven correspondingly rotates and lifts the coating clamp lid of the coating clamp to release the gripping and fixing of the optical fiber, regarding the relationship between the installation base drive mechanism and the coating clamp installation base of the optical fiber fusion splicer of FIG. 1.
Figure 9A:
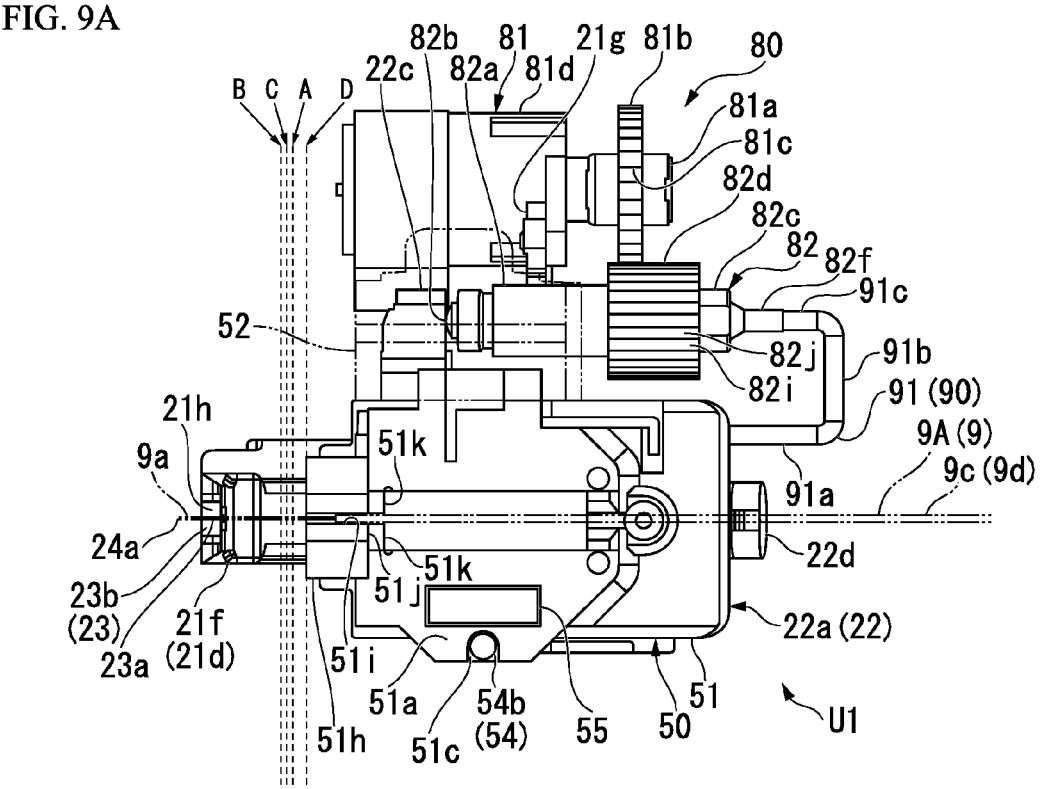
FIG. 9A is a plan view schematically showing a state where the movable shaft and the gear having a pressing portion of the installation base drive mechanism (micrometer) further retreat from the state of FIGS. 8A and 8B, and the coating clamp installation base reaches a position (line D) located further rearward than the position at the time of fiber mounting, regarding the relationship between the installation base drive mechanism and the coating clamp installation base of the optical fiber fusion splicer of FIG. 1.
Figure 9B:
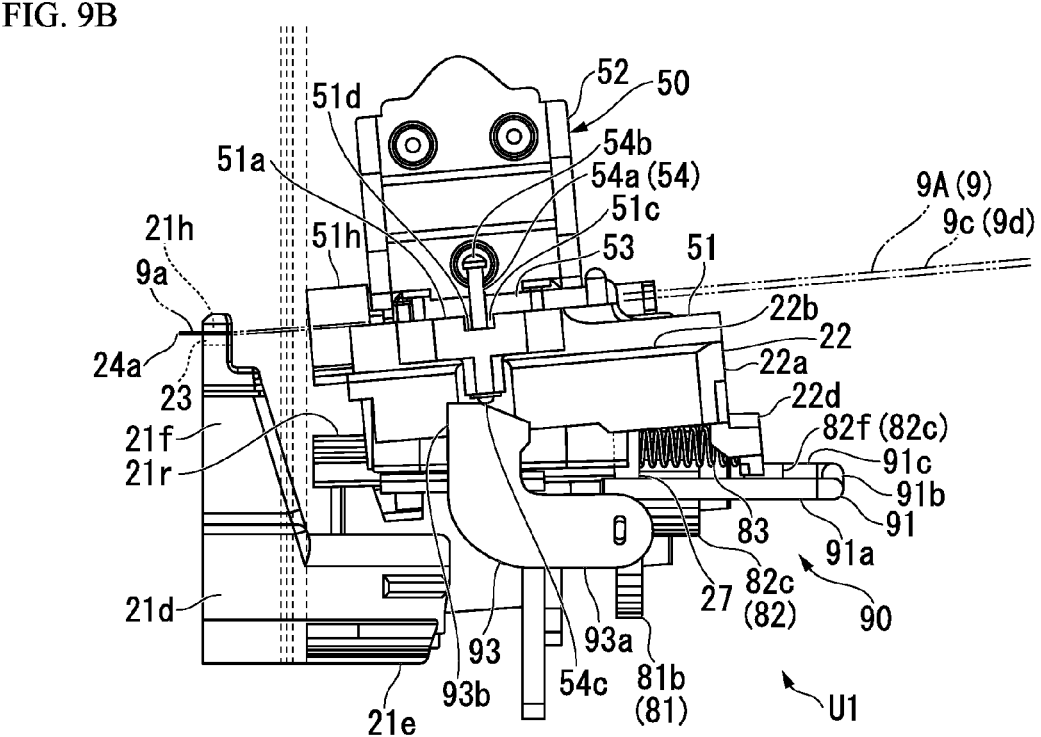
FIG. 9B is a front view schematically showing a state where the movable shaft and the gear having a pressing portion of the installation base drive mechanism (micrometer) further retreat from the state of FIGS. 8A and 8B, and the coating clamp installation base reaches the position (line D) located further rearward than the position at the time of fiber mounting, regarding the relationship between the installation base drive mechanism and the coating clamp installation base of the optical fiber fusion splicer of FIG. 1.

As shown in FIG. 8B, FIG. 9B, and the like, the thrust-up pin 54 is lifted with respect to the lower clamp member 51 to thereby push up the coating clamp lid 52 in the closed state to open the coating clamp lid with respect to the lower clamp member 51.

The opening lever 93 of the clamp opening mechanism 90 is rotated together with the opening lever shaft 92 by the driving force of the advancing mechanism power source 81 transmitted via the link part 91 to push up the thrust-up pin 54.

As the opening lever 93 that is rotationally driven pushes up the thrust-up pin 54, the clamp opening mechanism 90 opens the coating clamp lid 52 in the state of being closed with respect to the lower clamp member 51, with respect to the lower clamp member 51.

The opening lever 93 functions as a pin push-up member that pushes up the thrust-up pin 54 by the driving force of the advancing mechanism power source 81.

As shown in FIG. 6A, FIG. 7A, and the like, the link part 91 of the illustrated example has a rod-shaped main body 91a that extends in the left-and-right direction of the splicer 20A, a rod-shaped horizontal material portion 91*b* that protrudes from a rear end of the rod-shaped main body 91*a* opposite to a front end thereof on the discharge portion 24*a* side to one side (splicer rear side in the illustrated example) of the splicer 20A in the front-and-rear direction, and a driving force receiving portion 91*c* that protrudes from the protruding end of the horizontal material portion 91*b* to the discharge portion 24*a* side.

The protruding end of the driving force receiving portion 91*c* of the link part 91 is arranged on the rear side (drive mechanism rear side) of the pressing protrusion 82*f* at the rear end of the gear 82*c* having a pressing portion of the micrometer 82.

In FIG. 6A, the protruding end of the driving force receiving portion 91*c* is butted against and brought into contact with the rear end of the pressing protrusion 82*f* of the gear 82*c* having a pressing portion at the initial position, of the micrometer 82.

As shown in FIG. 10, FIGS. 12 to 14B, and the like, the opening lever shaft 92 is provided within a tubular bracket 921 that is fixed to the apparatus body housing 29 and is provided within the housing 29.

The bracket 921 and the opening lever shaft 92 extend along the central axis of the splicer 20A in the front-and-rear direction below the rail 21*r*.

The bracket 921 is fixed to a supporting member (not shown) that is fixed to the apparatus body housing 29 and is provided within the housing 29.

The opening lever shaft 92 is rotatably supported around the central axis thereof by the bracket 921.

In addition, the bracket 921 only needs to be able to rotatably support the opening lever shaft 92 around the central axis thereof, and the shape thereof is not limited to the tubular shape.

The opening lever shaft 92 may be supported, for example, by the ring-like bracket 921 in a plurality of places in the longitudinal direction of the opening lever shaft so as to be rotatable around the central axis of the opening lever shaft 92 in an orientation where the opening lever shaft extends in the splicer front-and-rear direction.

Figure 12:
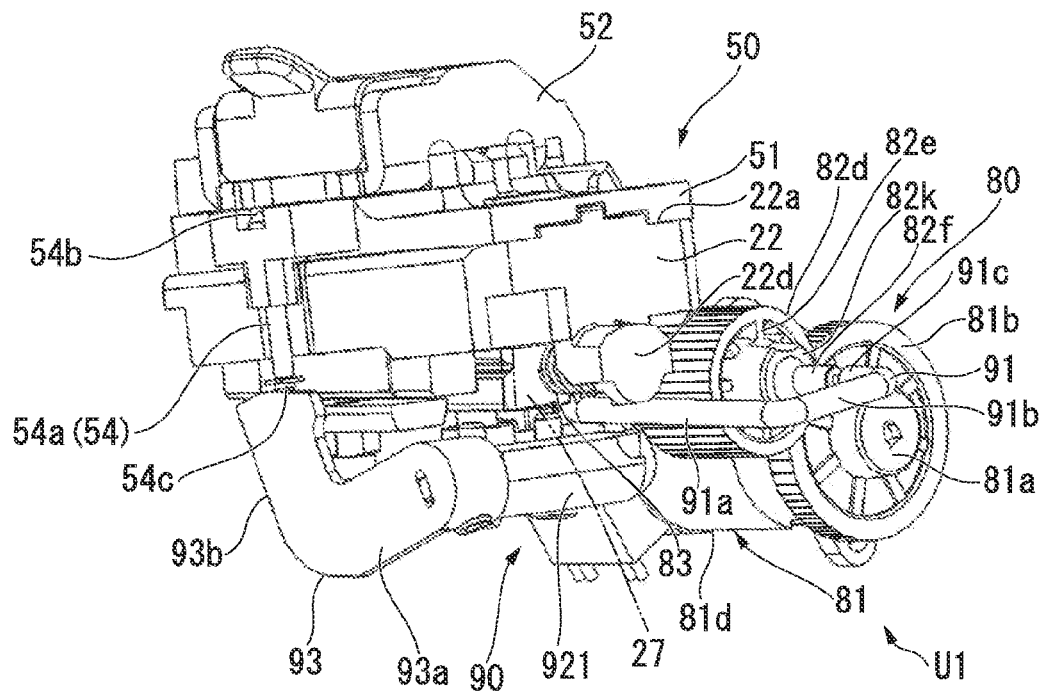
FIG. 12 is a perspective view of the installation base advancing mechanism, the clamp opening mechanism, the coating clamp installation base, and the coating clamp of FIG. 10, when viewed from a diagonal rear side.
Figure 13:
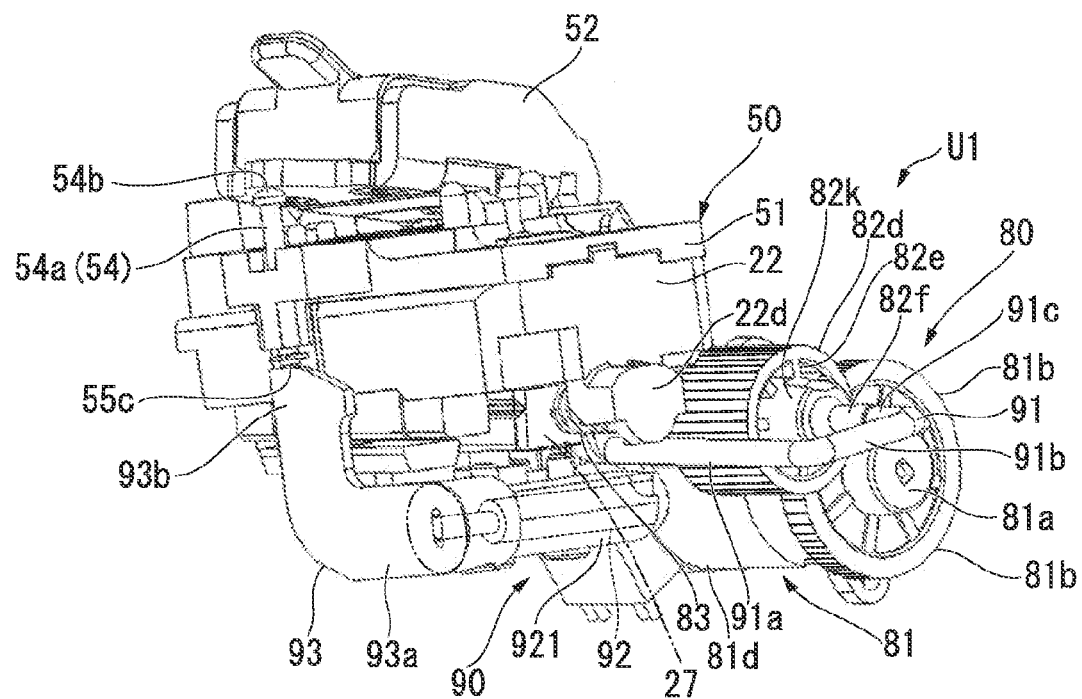
FIG. 13 is a perspective view of the installation base drive mechanism of the installation base advancing mechanism, the coating clamp installation base, and the coating clamp in the state shown in FIGS. 8A and 8B, when viewed from a viewing point of the diagonal rear side.

As shown in FIG. 10, FIG. 12, and the like, the opening lever 93 is a member in which a push-up piece 93*b* that protrudes in a direction perpendicular to the longitudinal direction of an elongated arm portion 93*a* is provided integrally at one end portion of the arm portion 93*a* in the longitudinal direction.

In the opening lever 93, a base end portion of the arm portion 93*a* opposite to the side where a tip portion is provided in which the push-up piece 93*b* is provided so as to protrude in the longitudinal direction of the arm portion, is fixed to one end portion of the opening lever shaft 92 in its extending direction.

The arm portion 93*a* of the opening lever 93 is fixed to the portion of the opening lever shaft 92 that protrudes from the end portion of the bracket 921.

Additionally, the arm portion 93*a* of the opening lever 93 extends in a direction perpendicular to the rotation axis of the opening lever shaft 92 from the opening lever shaft 92.

In FIGS. 16A and 16B, the base end portion of the arm portion 93*a* of the opening lever 93 of the clamp opening mechanism 90 on the right side (right side in FIGS. 16A and 16B) when viewed from the splicer front side is fixed to the end portion of the opening lever shaft 92 on the splicer front side.

The installation base advancing mechanism 80 on the right side when viewed from the splicer front side is arranged further toward the splicer rear side than the movable stage 22 on the right side when viewed from the splicer front side.

FIGS. 28A, 28B, 29A, and 29B show the positional relationship between the movable stage 22 on the left side (left side in FIGS. 16A and 16B) when viewed from the splicer front side, and the installation base advancing mechanism 80 and the clamp opening mechanism 90.

Figure 29A:
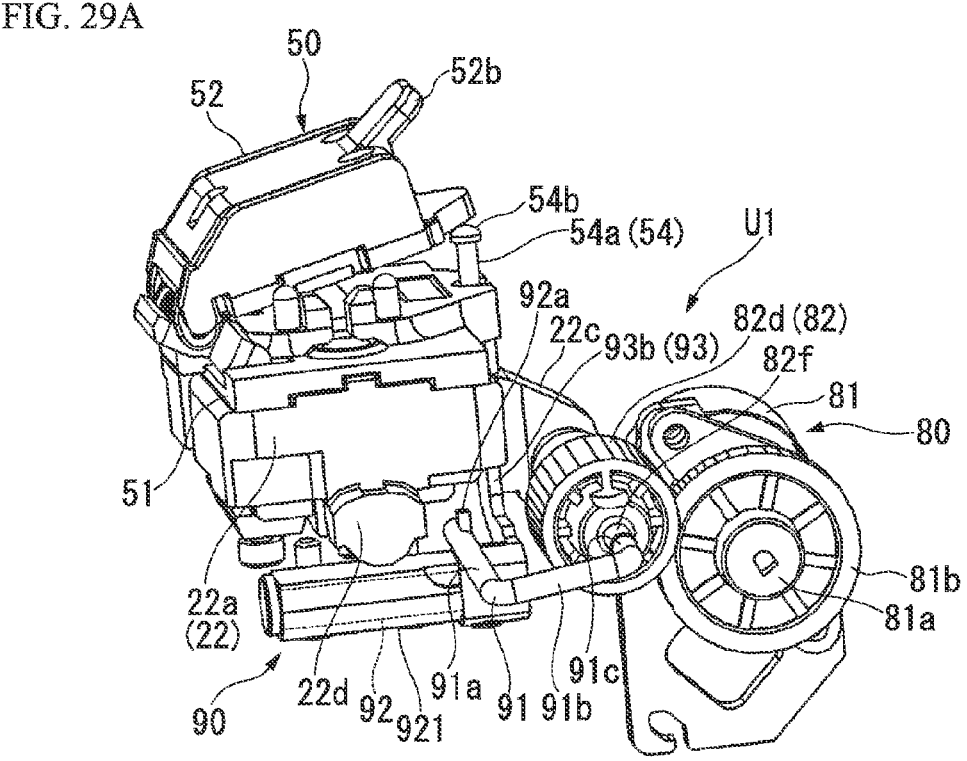
FIG. 29A is a view showing a state where a thrust-up pin of the clamp opening mechanism thrusts up the coating clamp lid in the closed state to open the coating clamp lid slightly with respect to the lower clamp member, regarding the advancing and retreating unit of FIGS. 28A and 28B, and is a perspective view of the advancing and retreating unit when viewed from the diagonal rear side.
Figure 29B:
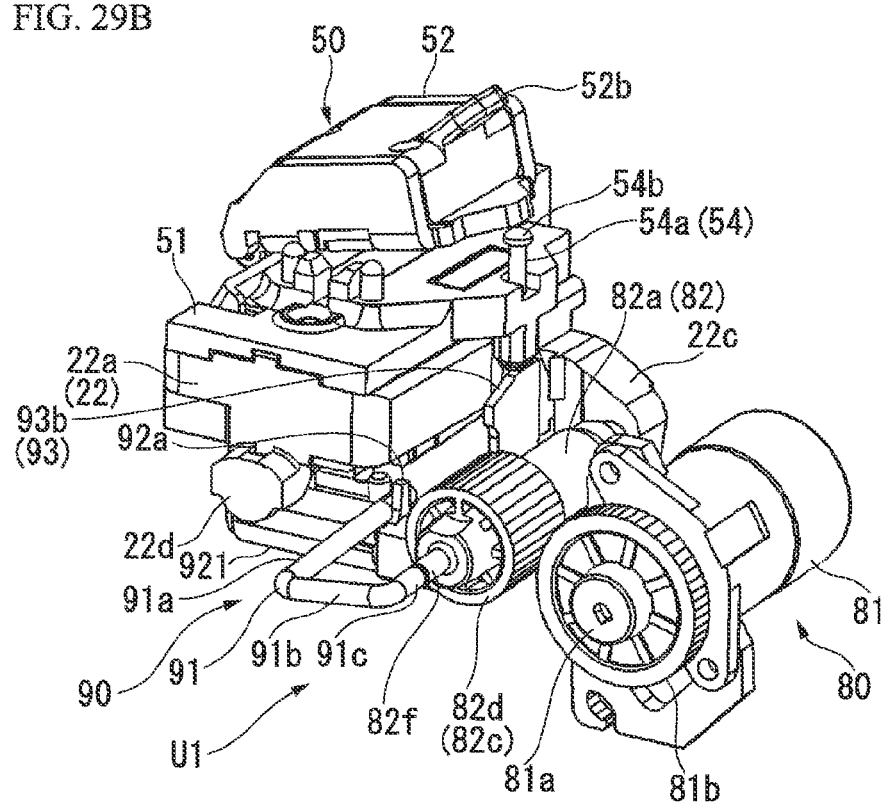
FIG. 29B is a view showing a state where the thrust-up pin of the clamp opening mechanism thrusts up the coating clamp lid in the closed state to open the coating clamp lid slightly with respect to the lower clamp member, regarding the advancing and retreating unit of FIGS. 28A and 28B, and is a perspective view of the advancing and retreating unit when viewed at an angle different from FIG. 29B and viewed from the diagonal rear side.
Figure 30:
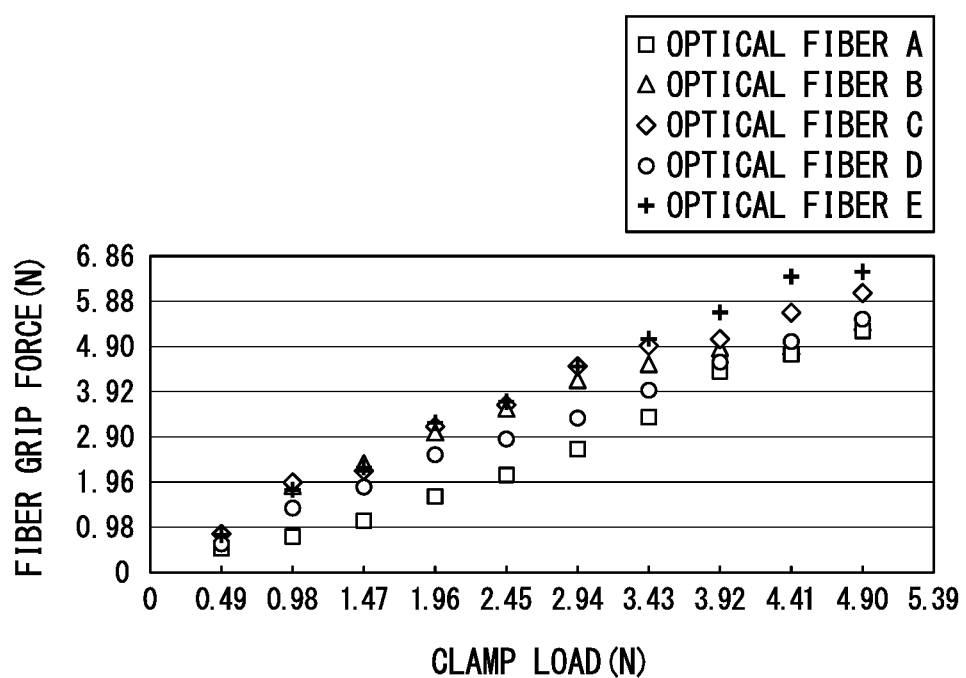
FIG. 30 is a graph showing the relationship between a force with which an optical fiber is gripped between a gripping rubber member and a base plate and a grip force that acts between the base plate and the lid plate by a magnetic attractive force, in a general coating clamp used for the Coating clamp system fusion splicer.

As shown in FIGS. 16A, 16B, 28A, 28B, 29A, and 29B, the base end portion of the arm portion 93*a* of the opening lever 93 of the clamp opening mechanism 90 on the left side when viewed from the splicer front side is fixed to the end portion of the opening lever shaft 92 on the splicer front side (refer to FIG. 29A).

The installation base advancing mechanism 80 on the left side when viewed from the splicer front side is arranged further toward the splicer front side than the movable stage 22 on the left side when viewed from the splicer front side.

The thrust-up pin 54 of the coating clamp 50 is inserted into a pin insertion hole 51*b* (refer to FIG. 6B) that penetrates the thickness of the plate-shaped lower clamp member 51, and is provided so as to be elevatable with respect to the lower clamp member 51.

In addition, the pin insertion hole 51*b* is shown only in FIG. 6B, and the illustration thereof is omitted in the other drawings.

As shown in FIG. 6B, the thrust-up pin 54 has a head 54*b* formed with a size such that the head cannot be inserted into the pin insertion hole 51*b*, at one end, in the longitudinal direction, of a pin body 54*a* formed with a size such that the pin body can be inserted into the pin insertion hole 51*b*.

The thrust-up pin 54 is provided in the coating clamp 50 by inserting the pin body 54*a* into the pin insertion hole 51*b* and arranging the head 54*b* on the lower clamp member 51.

The length of the pin body 54*a* in the longitudinal direction is longer compared to the length of the pin insertion hole 51*b* in the axis direction.

In FIGS. 6B and 10, the head 54*b* of the thrust-up pin 54 is accommodated in a head accommodation recess 51*c* formed in the lower clamp member 51 by being recessed from the upper surface 51*a*, and is butted against and brought into contact with a bottom surface 51*d* (accommodation recess bottom surface) of the head accommodation recess 51*c*.

Additionally, the portion of the pin body 54*a* below the portion of the pin body accommodated in the pin insertion hole 51*b* protrudes downward from the lower clamp member 51.

The position of the thrust-up pin 54 shown in FIGS. 6B and 10 with respect to the lower clamp member 51 is hereinafter also referred to as an elevation lower limit position.

When the thrust-up pin 54 is at the elevation lower limit position, the whole head 54*b* of the thrust-up pin 54 is accommodated in the head accommodation recess 51*c*.

For this reason, the head 54*b* of the thrust-up pin 54 at the elevation lower limit position does not come into contact with the coating clamp lid 52 closed with respect to the lower clamp member 51, and does not become an obstacle to closing together the coating clamp lid 52 with respect to the lower clamp member 51.

As shown in FIG. 10 and the like, the pin insertion hole 51*b* of the lower clamp member 51 is formed at the end portion (an end portion opposite to the splicer rear side where the installation base advancing mechanism 80 is arranged) of the lower clamp member 51 on the splicer front side in the splicer front-and-rear direction.

The thrust-up pin 54 is provided at the end portion of the lower clamp member 51 on the splicer front side so as to be elevatable (more specifically, movable in the axis direction of the pin insertion hole 51b).

Additionally, the thrust-up pin 54 is arranged at a position apart from the opening lever shaft 92 to the discharge portion 24a side (opening mechanism front side) in the splicer left-and-right direction.

As shown in FIGS. 6B and 10, the arm portion 93a of the opening lever 93 extends from the opening lever shaft 92 to the discharge portion 24a side (opening mechanism front side) in the splicer left-and-right direction.

The push-up piece 93b of the opening lever 93 protrudes upward from the tip portion the arm portion 93a.

Additionally, in FIGS. 6B and 10, the push-up piece 93b of the opening lever 93 is arranged below a lower end 54c of the thrust-up pin 54 at the elevation lower limit position.

The state of the clamp opening mechanism 90 shown in FIGS. 6B and 10 is also referred to as an initial state.

When the clamp opening mechanism 90 is in the initial state, the protruding end of the driving force receiving portion 91c of the link part 91 is butted against and brought into contact with the rear end of the pressing protrusion 82f of the gear 82c having a pressing portion at the initial position, of the micrometer 82, and the push-up piece 93b of the opening lever 93 is arranged below the lower end of the thrust-up pin 54 at the elevation lower limit position.

In addition, the initial state of the clamp opening mechanism 90 may be a state where the protruding end of the driving force receiving portion 91c of the link part 91 is arranged apart from the rear end of the pressing protrusion 82f of the gear 82c having a pressing portion at the initial position, of the micrometer 82, to the rear side (drive mechanism rear side) via a slight gap.

Additionally, in FIGS. 6B and 10, although the protruding end of the push-up piece 93b of the opening lever 93 is butted against and brought into contact with the lower end 54c of the thrust-up pin 54, the initial state of the clamp opening mechanism 90 may be a state where the protruding end of the push-up piece 93b of the opening lever 93 is arranged apart from the lower end of the thrust-up pin 54 to the lower side via a slight gap.

As shown in FIG. 8A, FIG. 9A, and the like, the gear 82c having a pressing portion of the micrometer 82 is rotated by the reverse rotational driving of the drive shaft 81a of the electric motor 81 and is thereby movable from the initial position to the drive mechanism rear side with respect to the barrel 82a.

When the gear 82c having a pressing portion of the micrometer 82 is moved further toward the drive mechanism rear side than the initial position, the link part 91 of the clamp opening mechanism 90 in the initial state is pushed in a direction (opening mechanism rear side) in which the link part is apart from the discharge portion 24a by the pressing protrusion 82f of the rear end of the gear 82c having pressing portion (refer to FIGS. 8A and 9A).

In addition, the link part 91 moves in the splicer left-and-right direction while being guided by a guide member (not shown) provided within the apparatus body housing 29.

The link part 91 moves in the splicer left-and-right direction while being guided by the guide member in a state where the rod-shaped main body 91a extends in the splicer left-and-right direction and the protruding of the horizontal material portion 91b from the rear end of the rod-shaped main body 91a to one side (splicer rear side in the illustrated example) in the splicer front-and-rear direction is maintained.

Figure 15A:
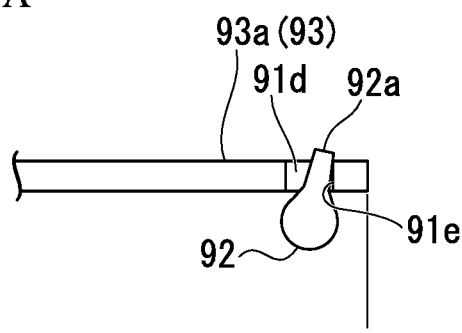
FIG. 15A is a schematic view illustrating the relationship between an engaging recess formed in a link part of the clamp opening mechanism and an engaging protrusion provided to protrude from an opening lever shaft, and is a view showing a case where the clamp opening mechanism is in an initial state.
Figure 15B:
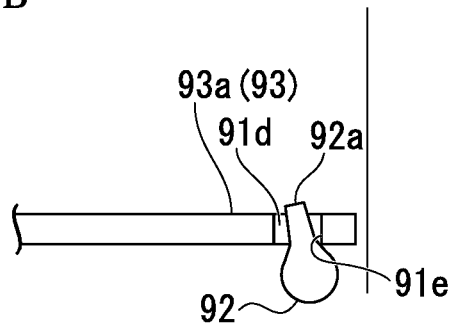
FIG. 15B is a schematic view illustrating the relationship between the engaging recess formed in the link part of the clamp opening mechanism and the engaging protrusion provided to protrude from the opening lever shaft, and is a view showing a state where the link part of the clamp opening mechanism is retreated compared to the state of FIG. 15A.

As shown in FIGS. 14A, 14B, 15A, and 15B, an engaging recess 91d recessed from a side surface of an outer periphery of the rod-shaped main body 91a is formed at a front end portion of the rod-shaped main body 91a of the link part 91 on the discharge portion 24a side (right side in FIGS. 15A and 15B).

The link part 91 accommodates an engaging protrusion 92a provided so as to protrude from an outer periphery of the end portion of the opening lever shaft 92 opposite to the side where the opening lever 93 is provided, in the engaging recess 91d of the front end portion of the rod-shaped main body 91a.

The engaging protrusion 92a is provided so as to protrude from the portion of the opening lever shaft 92 protruding from the end portion of the bracket 921.

In the clamp opening mechanism 90, when the link part 91 is pushed by the pressing protrusion 82f from the initial state, a stepped portion 91e (refer to FIGS. 15A and 15B; hereinafter also referred to as a front stepped portion) at the front end position of the engaging recess 91d of the rod-shaped main body 91a pushes the engaging protrusion 92a of the opening lever shaft 92 from the discharge portion 24a side to rotate the opening lever shaft 92.

This causes the opening lever 93 to rotate clockwise in FIG. 6B together with the opening lever shaft 92 from the state shown in FIG. 6B.

As a result, the clamp opening mechanism 90 can push up the thrust-up pin 54 according to the ascent of the push-up piece 93b of the opening lever 93 rotated together with the opening lever shaft 92.

In the fusion splicer 20A, the gear 82c having a pressing portion of the installation base drive mechanism 82 pushes the link part 91 of the clamp opening mechanism 90.

As a result, the opening lever 93 is configured so as to rotate the coating clamp lid 52 of the coating clamp 50 from the state where the coating clamp lid is closed with respect to the lower clamp member 51 to a position above the attractive force and biasing force balanced position, thereby allowing the thrust-up pin 54 to be pushed up.

As shown in FIGS. 2 to 5, the windshield cover 60 is attached to the apparatus body 21 via the rotating shaft 61 supported on the apparatus body 21 so as to be rotatable around the rotation axis of the splicer in the left-and-right direction.

The fusion splicer 20 can rotate the windshield cover 60 around the rotating shaft 61 by the driving force of the electric power source 69 (refer to FIG. 2; windshield opening and closing power source or second power source) assembled into the housing 29 of the apparatus body 21, to open and close the windshield cover with respect to the apparatus body 21.

The electric power source 69 of the illustrated example is, specifically, an electric motor.

The windshield cover 60 is openable and closable by the driving force of the electric motor 69 transmitted via a driving force transmission system (not shown).

Additionally, in the drawings, reference numeral 61a is appended to a rotating shaft 61 on the right side of the fusion splicer (the right side when viewed from the fusion splicer front side) in the left-and-right direction, and reference numeral 61b is appended to the rotating shaft 61 on the left side.

As shown in FIGS. 2 to 5, the windshield cover 60 has a cover body 62 that has an elongated structure that extends in a shape having a U-shaped cross-section, and end wall portions 63a and 63b (refer to FIG. 5) provided at both ends thereof in the longitudinal direction substantially perpendicularly to the longitudinal direction of the cover body 62, and is configured in the shape of an elongated container.

The end wall portions 63a and 63b of the cover body 62 on both sides in the longitudinal direction are provided so as to block both ends in an extending direction of a grooved space inside the cover body 62.

As shown in FIG. 2, FIG. 3, FIG. 5, and the like, the cover body 62 of the windshield cover 60 of the illustrated example has an elongated plate-shaped top wall portion 64, and a pair of side wall portions 65a and 65b that protrude in the shape of a rib over the total length of the top wall portion 64 in the longitudinal direction from both ends of the top wall portion 64 in the width direction to one surface side of the top wall portion 64.

The inner space 66 (hereinafter also referred to as a cover inner space 66) surrounded by the cover body 62, and the end wall portions 63a and 63b on both sides of the cover body in the longitudinal direction opens over the total length of the cover body 62 in the longitudinal direction to the side of the cover body 62 opposite to the side where the top wall portion 64 is provided.

The windshield cover 60 is rotatably provided with respect to the apparatus body 21, and one of both ends (both ends of a cross section) on the opening side (lower side in FIGS. 2 and 3) of the cross-section of the cover body 62 is attached to the apparatus body 21 via the rotating shaft 61.

Additionally, the windshield cover 60 is provided on the apparatus body 21 so that the longitudinal direction thereof is aligned with the splicer left-and-right direction.

As shown in FIG. 2, the rotating shafts 61 of the windshield cover 60, the pair of electrode rods 24, the coating clamps 50 on the respective movable stages 22, and the pair of grooved substrates 23 are provided between the hinge pin 31b on the front side and the reinforcing sleeve heater 32 on the rear side in the splicer front-and-rear direction.

Additionally, the movable stages 22 are also provided between the hinge pin 31b and the reinforcing sleeve heater 32 in the splicer front-and-rear direction.

As shown in FIGS. 2 and 3, the windshield cover 60 is butted against and brought into contact with the apparatus body upper surface 21a where the end portions of the cover body 62 and the end wall portions 63a and 63b on the opening portion side of the cover inner space 66, when being closed with respect to the apparatus body 21.

As shown in FIG. 4, the windshield cover 60 accommodates the pair of electrode rods 24 located on the apparatus body 21, the coating clamps 50 on the respective movable stages 22, and the pair of grooved substrates 23 therein, when being closed with respect to the apparatus body 21.

Additionally, when the windshield cover 60 is closed with respect to the apparatus body 21, all of the upper sides of the movable stages 22 are covered with the windshield cover 60.

The fusion splicing between the optical fibers 9 using the fusion splicer 20 is performed in a state where the windshield cover 60 is closed with respect to the apparatus body 21.

The windshield cover 60 closed with respect to the apparatus body 21 also covers the discharge portion 24a between the electrode rods 24 together with the electrode rods 24, and prevents air currents outside the windshield cover 60 from affecting the fusion splicing between the optical fibers 9.

As shown in FIGS. 8A, 8B, 9A, 9B, and 18, the end wall portions 63a and 63b on both sides of the windshield cover 60 in the longitudinal direction are formed with cutout portions (fiber insertion cutout portions) (not shown) that are recessed from the end faces of the cover inner space 66 on the opening portion side.

The windshield cover 60 can accommodate the portions of the optical fibers 9, which is gripped and fixed by the coating clamps 50 and arranged on the apparatus body upper surface 21a, in the fiber insertion cutout portions, when being closed with respect to the apparatus body 21.

As a result, the windshield cover 60 can be brought into a state where the optical fibers 9 pass through the inside and outside of the windshield cover 60 via the fiber insertion cutout portions.

The windshield cover 60 can accommodate portions of the optical fibers 9 in the longitudinal direction in the fiber insertion cutout portions and avoid strongly pinching the optical fibers 9 between the end wall portions 63a and 63b and the apparatus body upper surface 21a and damaging the optical fibers.

As shown in FIG. 3, FIG. 5, and the like, the rotating shafts 61a and 61b of the windshield cover 60 are provided further toward the splicer front side than the electrode rods 24, the coating clamps 50, and the grooved substrates 23 of the fusion splicer 20.

Additionally, the rotating shafts 61a and 61b are provided further toward the splicer front side than the movable stages 22 of the fusion splicer 20.

When the windshield cover 60 is closed with respect to the apparatus body 21, the pair of side wall portions 65a and 65b are arranged on both sides in the splicer front-and-rear direction via the electrode rods 24, the coating clamps 50, the grooved substrates 23, and the movable stages 22 (not shown).

The rotating shaft 61 pivotally attaches the end portion, opposite to the top wall portion 64, of the side wall portion 65a, which is located on the splicer front side with respect to the cover inner space 66 when the windshield cover 60 is closed with respect to the apparatus body upper surface 21a, out of the pair of side wall portions 65a and 65b, to the housing 29 of the apparatus body 21.

By turning off the power switch (not shown) from an ON state, the fusion splicer 20 is brought into a state (hereinafter referred to as a non-use state) where the movable stages 22 are arranged at the positions at the time of fiber mounting described above and the windshield cover 60 is closed.

By turning on the power switch in an OFF state, the fusion splicer 20 in the non-use state is brought into a fiber set standby state where the movable stages 22 are arranged at the positions at the time of fiber mounting and the windshield cover 60 is opened.

FIGS. 1, 6A, and 11A show the fiber set standby state.

As shown in FIGS. 6A and 11A, in the fiber set standby state, the movable shaft 82b and the gear 82c having a pressing portion of the micrometer 82 are arranged at the initial positions with respect to the barrel 82a.

Additionally in the fiber set standby state, the clamp opening mechanism 90 is brought into the initial state shown in FIGS. 6B and 10.

The thrust-up pin 54 is arranged at the elevation lower limit position.

In addition, in the fiber set standby state, the coating clamp lid 52 of the coating clamp 50 may be arranged at the opening limit position even if the coating clamp lid is closed with respect to the lower clamp member 51.

In the operation of fusion-splicing the optical fibers 9A and 9B using the fusion splicer 20A, first, the optical fibers 9 are respectively gripped and fixed by the coating clamps 50 (refer to FIG. 1) on both left and right sides, in the fiber set standby state described above.

As for the gripping and fixing of the optical fiber 9 by the coating clamp 50, the optical fiber 9 is gripped and fixed between the lower clamp member 51 and the coating clamp lid 52 by closing the coating clamp lid 52 with respect to the lower clamp member 51 after the optical fiber 9 is placed on the lower clamp member 51 in a state where the coating clamp lid 52 is opened with respect to the lower clamp member 51.

In the fiber set standby state, when the coating clamp lid 52 is closed with respect to the lower clamp member 51, the coating clamp lid 52 is manually opened with respect to the lower clamp member 51. Then, the optical fiber 9 is placed on the lower clamp member 51 and the coating clamp lid 52 is closed with respect to the lower clamp member 51.

As shown in FIGS. 6A and 10, the lower clamp member 51 of the coating clamp 50 has a protruding wall portion 51h that protrudes onto the end portion of the lower clamp member on the discharge portion 24a side.

The protruding wall portion 51h is formed with a fiber groove 51i recessed from the upper surface thereof.

The fiber groove 51i is formed to penetrate the protruding wall portion 51h in the splicer left-and-right direction.

The optical fiber 9 gripped and fixed by the coating clamp 50 has the covered portion 9d placed on the upper surface 51a that extends from the protruding wall portion 51h of the lower clamp member 51 to the rear side, in an opened state where the coating clamp lid 52 of the coating clamp 50 is opened.

Additionally, before the coating clamp lid 52 in the opened state is closed, the optical fiber glass portion 9a exposed by removing the covering material of the tip portion of the optical fiber 9 is inserted into the fiber groove 51i, and the tip portion of the optical fiber glass portion 9a protruding from the front end of the upper surface 51a of the lower clamp member is placed on the positioning groove 23a formed in the grooved substrate 23.

Then, as described above, the coating clamp lid 52 is closed and the covered portion 9d is gripped and fixed by the coating clamp 50, in a state where the covered portion 9d of the optical fiber 9 is placed on the upper surface 51a of the lower clamp member and the tip portion of the optical fiber glass portion 9a is placed on the positioning groove 23a in the grooved substrate 23.

In FIGS. 6A and 10, the optical fiber 9 is placed on the upper surface 51a of the lower clamp member such that the tip of the covered portion 9d is aligned with a rear end face 51j (the end face of the protruding wall portion 51h on the rear side of the coating clamp 50 in the front-and-rear direction) of the protruding wall portion 51h.

The lower clamp member 51 of the coating clamp 50 of the illustrated example has a pair of fiber guide projections 51k that protrude onto a front end portion of the upper surface 51a of the lower clamp member.

The pair of fiber guide projections 51k are provided at positions near the rear end face 51j of the protruding wall portion 51h.

A grooved space located on a virtual extension of the fiber groove 51i in the front-and-rear direction of the coating clamp 50 is secured between the pair of fiber guide projections 51k.

The surfaces of pair of fiber guide projections 51k that face each other are located on extensions of internal surfaces on both sides of the fiber groove 51i.

In FIGS. 6A and 10, the optical fiber 9 is placed on the upper surface 51a of the lower clamp member such that the tip of the covered portion 9d accommodated in the grooved space between the pair of fiber guide projections 51k is aligned with the rear end face 51j of the protruding wall portion 51h.

An optical fiber whose external diameter of the covered portion 9d is equal to or slightly smaller than the interval of the pair of fiber guide projections 51k and the width of the fiber groove 51i is used as the optical fiber 9.

The covered portion 9d of the optical fiber 9 is capable of being inserted into the fiber groove 51i.

In addition, when the coating clamp lid 52 in a state where the coating clamp lid is opened with respect to the lower clamp member 51 is closed with respect to the lower clamp member 51, the coating clamp lid is closed together with respect to the upper surface 51a of the lower clamp member on the rear side of the protruding wall portion 51h and the fiber guide projections 51k while avoiding the protruding wall portion and the fiber guide projections.

The protruding wall portion 51h and the fiber guide projections 51k of the lower clamp member 51 do not become an obstacle to the opening and closing of the coating clamp lid 52 with respect to the lower clamp member 51.

The pair of fiber guide projections 51k of the lower clamp member 51 of the coating clamp 50 illustrated in FIGS. 6A and 10 are formed integrally with the protruding wall portion 51h of the lower clamp member 51.

However, the pair of fiber guide projections 51k may be formed at positions apart from the protruding wall portion 51h of the lower clamp member 51 to the rear side thereof.

The fiber groove 51i of the lower clamp member 51 of the coating clamp 50 illustrated in FIGS. 6A and 10 has a groove bottom surface that is continuous with the upper surface 51a of the lower clamp member.

However, the bottom of the fiber groove 51i may be located below the upper surface 51a of the lower clamp member.

As shown in FIG. 1, the upper surfaces 22b of the installation base bodies 22a of the movable stages 22 on both left and right sides of the fusion splicer 20A incline so as to be located on the upper side (the upper side in FIGS. 1 and 6A) as being apart from the discharge portion 24a.

Additionally, the upper surfaces 51a and the fiber grooves 51i of the lower clamp members 51 of the coating clamps 50 on both left and right sides also incline so as to be located on the upper side (the upper side in FIGS. 1 and 6A), as being apart from the discharge portion 24a.

Additionally, the optical fiber 9 is gripped and fixed by the coating clamp 50 such that the tip side from which the optical fiber glass portion 9a is exposed (refer to FIG. 1) protrudes from the coating clamp 50 to the discharge portion 24a side and the optical fiber glass portion 9a is placed on the positioning groove 23a formed in the grooved substrate 23.

When the optical fibers 9A and 9B are fixed and gripped by the coating clamps 50 on both left and right sides, the lengths of the protruding portions 90b from the coating clamps 50 are adjusted so that the tips of the optical fiber glass portions 9a of the respective optical fibers 9 are arranged to face each other via a slight gap.

Additionally, in the optical fibers 9A and 9B, the tips of the optical fiber glass portions 9a of the respective optical fibers 9 are arranged on both left and right sides via a virtual straight line connecting the tips of the pair of electrode rods 24, by the adjustment of the lengths of the protruding portions 90b.

As shown in FIG. 2, the fusion splicer 20A has a cover closing switch 31d provided so as to protrude from an outer peripheral portion of the monitor device 31 on the display surface 31c side.

In the fusion splicer 20A, the cover closing operation (windshield cover closing operation) of closing the windshield cover 60 in the opened state with respect to the apparatus body 21 is performed by turning on the cover closing switch 31d by a push-in operation to thereby drive the electric drive source 69 (refer to FIG. 2) after the gripping and fixing of the optical fibers 9A and 9B to the coating clamps 50 are completed.

Then, the fusion splicer 20A automatically starts a fusion splicing operation, using detection signal obtained from the cover-closing detector 33 as a trigger, when the cover-closing detector 33 (refer to FIG. 5) detects that the windshield cover 60 is closed with respect to the apparatus body 21.

The fusion splicer 20 has a control device that controls the driving of the whole fusion splicer.

The fusion splicer 20 shifts to the fusion splicing operation from the windshield cover closing operation by the control of the control device when the control device acquires a detection signal from the cover-closing detector 33.

In addition, the cover closing switch 31*d* is not particularly limited and is not limited to a push-in type switch that is switched on by a push-in operation.

The cover closing switch 31*d* may be a dial type switch that is switched on (turned on) by a rotation operation.

Additionally, the cover closing switch 31*d* may be, for example, a display button that causes a touch panel used as the monitor device 31 to perform display.

Additionally, the installation position of the cover closing switch 31*d* in the fusion splicer is not particularly limited. For example, a configuration in which the cover closing switch 31*d* is provided in the apparatus body 21 may be adopted.

As the cover-closing detector 33, a well-known detector used in order to detect that the windshield cover 60 is brought into the closed state may be used for the fusion splicer.

Here, a magnetic sensor that detects magnetic bodies (for example, magnets 12*a* and 12*b* shown in FIG. 5) attached to the windshield cover 60 is used as the cover-closing detector 33.

This magnetic sensor detect (is brought into a detection state) that the windshield cover 60 is closed, in non-contact, and is brought into a non-detection state when the windshield cover 60 is displaced in the opening direction from the closed position and the windshield cover 60 is not brought into the closed state.

The magnets 12*a* and 12*b* shown in FIG. 5 function to magnetically attract magnet catches 13*a* and 13*b* that are ferromagnetic bodies made of iron or the like attached to the upper portion of the apparatus body 21 so as to be exposed to the apparatus body upper surface 21*a*, and causes the windshield cover 60 in the closed state to be reliably butted against and brought into contact with the apparatus body upper surface 21*a*.

The attractive force with which the magnets 12*a* and 12*b* attract the magnet catches 13*a* and 13*b* is set to a magnitude such that manual opening of the windshield cover 60 in the closed state is allowed.

A driving force that acts on the windshield cover 60 from the electric power source 69 when the opening operation of the windshield cover 60 in the closed state is markedly strong compared to the attractive force with which the magnets 12*a* and 12*b* attract the magnet catches 13*a* and 13*b*.

For this reason, the attractive force with which the magnets 12*a* and 12*b* attract the magnet catches 13*a* and 13*b* does not become an obstacle to the opening operation of the windshield cover 60 in the closed state caused by the driving force of the electric power source 69.

The cover-closing detector 33 is not limited to the above-described magnetic sensor.

As the cover-closing detector 33, for example, a non-contact sensor, such as a photosensor, or a touch sensor that detects the opening and closing of the windshield cover depending on the contact or separation of the windshield cover may also be adopted.

Additionally, as the cover-closing detector, an encoder, an angle sensor, or the like, which measures the rotation angle of the windshield cover in the portion (rotating portion for detection) formed on the extension of the rotating shall of the windshield cover or around the windshield cover, may also be adopted.

In the case of the rotation angle measurement sensor, such as an encoder or an angle sensor, it is possible to detect that the windshield cover 60 is arranged at a fully opened position in addition to detecting that the windshield cover 60 is arranged at the closed position, and it is also possible to detect that the windshield cover 60 is between the fully opened position and the closed position.

When the cover-closing detector 33 detects that the windshield cover 60 is closed, the fusion splicer 20 has cover closing completion notification device that notifies this.

The configuration in which information notification (cover closing notification information) is output from the cover closing completion notification device when the cover-closing detector 33 detects that the windshield cover 60 is closed effectively contributes to the opening and closing situation of the windshield cover 60 being grasped by an operator who uses the fusion splicer.

As shown in FIG. 3, when the cover closing operation is completed, a fiber clamp member 25 provided inside the windshield cover 60 holds down the portion (optical fiber glass portion 9*a*) of the optical fiber 9 arranged on the positioning groove 23*a* of the grooved substrate 23 toward the bottom of the positioning groove 23*a*.

This allows the optical fiber glass portion 9*a* of the optical fiber 9 to be positioned with high precision by the positioning groove 23*a*.

As shown in FIG. 5, the fiber clamp members 25 are provided in two places in the longitudinal direction of the windshield cover 60 so as to correspond to the grooved substrates 23 provided on both left and right sides.

In addition, illustration of the fiber clamp members 25 is omitted in FIG. 4 among FIGS. 1 to 5.

Figure 26:
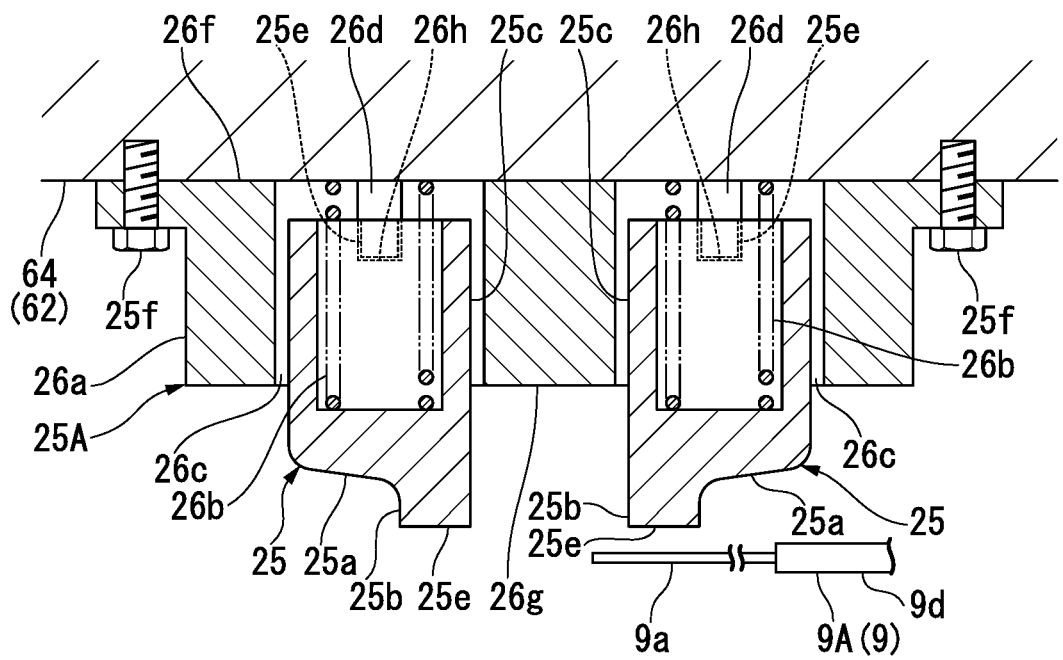
FIG. 26 is a cross-sectional view showing an example of a clamp unit provided in the windshield cover.

As shown in FIG. 3, FIG. 5, FIG. 26, and the like, a clamp unit 25A having a clamp supporting member 26*a* fixed to the inner surface of the top wall portion 64, the two fiber clamp members 25, and two springs 26*b* are attached to the windshield cover 60 of the illustrated example.

As shown in FIG. 3, FIG. 5, FIG. 26, and the like, the fiber clamp member 25 of the illustrated example has a tubular (cylindrical in the illustrated example) barrel portion 25*c*, a tip wall portion 25*a* that blocks one end of the barrel portion 25*c* in the axis direction, and a fiber hold-down protrusion 25*b* that protrudes from the tip wall portion 25*a* to the side opposite to the barrel portion 25*c*.

In FIG. 3, FIG. 5, FIG. 26, FIG. 27, and the like, the clamp supporting member 26*a* is formed in the shape of a plate.

The clamp supporting member 26*a* is fixed to top wall portion 64 of the windshield cover 60 along the inner surface.

The clamp supporting member 26*a* of the illustrated example is screwed and fixed to the windshield cover top wall portion 64, using screws 25*f*.

Additionally, the clamp supporting member 26*a* of the illustrated example is formed in the shape of an elongated plate that extends in the splicer left-and-right direction.

Additionally, the clamp supporting member 26*a* is formed with a clamp accommodation hole 26*c* that accommodates the end portion (base end portion) of the barrel portion 25*c* of the fiber clamp member 25 opposite to the side where the fiber hold-down protrusion 25*b* is provided.

The clamp accommodation holes 26*c* are respectively formed in two places of the clamp supporting member 26*a* apart from each other in the splicer left-and-right direction so as to penetrate the clamp supporting member 26*a* in the thickness direction.

The clamp accommodation hole 26c opens to a rear surface 26f of the clamp supporting member 26a that faces the windshield cover top wall portion 64, and a front surface 26g opposite to the rear surface 26f.

As shown in FIGS. 3 and 26, the fiber clamp member 25 has a falling-out preventing projection 25d that protrudes from an outer periphery of a base end portion of the barrel portion 25c.

Figure 27:
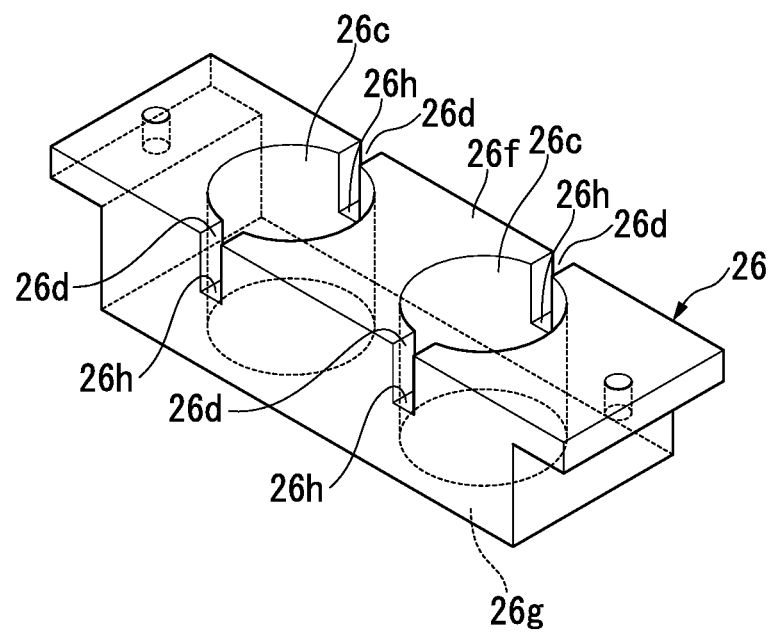
FIG. 27 is a perspective view showing a clamp supporting member of the clamp unit of FIG. 26.
Figure 28A:
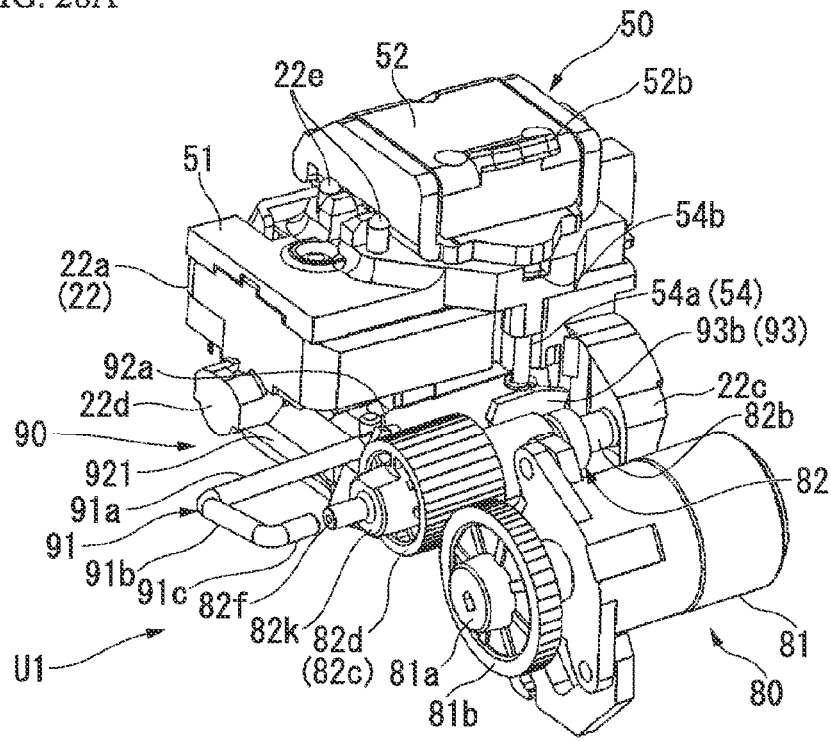
FIG. 28A is a view showing a case where the clamp opening mechanism is in the initial state, regarding the advancing and retreating unit located on the left side when the fusion splicer of FIG. 1 is viewed from the front side, and a perspective view of the advancing and retreating unit when viewed from the diagonal rear side.
Figure 28B:
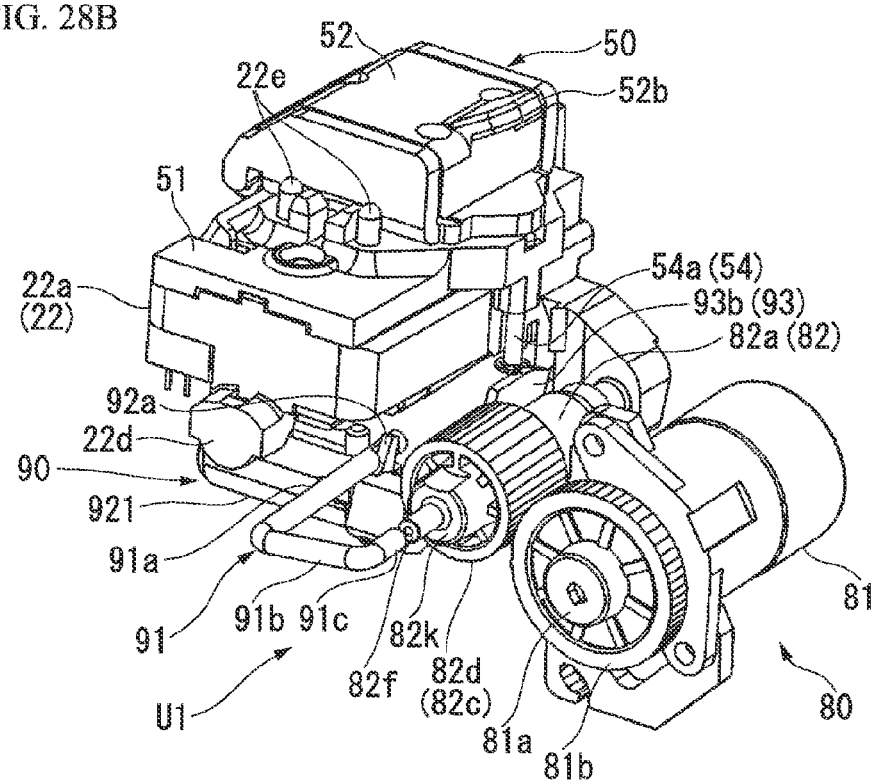
FIG. 28B is a view showing a case where the clamp opening mechanism is in the initial state, regarding the advancing and retreating unit located on the left side when the fusion splicer of FIG. 1 is viewed from the front side, and a perspective view of the advancing and retreating unit when viewed at an angle different from that of FIG. 28A.

As shown in FIGS. 3, 26, and 27, the clamp supporting member 26a is formed with a projection accommodating cutout portion 26d that accommodate a falling-out preventing projection 25d of the fiber clamp member 25.

The projection accommodating cutout portion 26d is formed so as to be become a recess recessed from the inner surface of the end portion (base end portion) of the clamp accommodation hole 26c on the top wall portion 64 side of the windshield cover.

The projection accommodating cutout portion 26d of the illustrated example is formed from the inner surface of the base end of the clamp accommodation hole 26c to the end face of the clamp supporting member 26a.

As shown in FIG. 3, FIG. 26, and the like, each fiber clamp member 25 is provided at the clamp supporting member 26a in an orientation where the barrel portion 25c is inserted into the clamp accommodation hole 26c and the fiber hold-down protrusion 25b is located on the side opposite to the side where the windshield cover top wall portion 64 is provided via the barrel portion 25c.

Additionally, the falling-out preventing projection 25d of each fiber clamp member 25 is inserted into the projection accommodating cutout portion 26d of the clamp supporting member 26a.

The distance from the front surface 26g of the clamp supporting member 26a to the windshield cover top wall portion 64 is smaller than the length of the barrel portion 25c of the fiber clamp member 25 in the axis direction.

The fiber clamp member 25 protrudes to the front surface 26g side of the clamp supporting member 26a, that is, the side opposite to the side where the windshield cover top wall portion 64 is provided via the clamp supporting member 26a.

The barrel portion 25c of the fiber clamp member 25 and the falling-out preventing projection 25d are movable in the axis direction of the clamp accommodation hole 26c with respect to the clamp supporting member 26a.

The fiber clamp member 25 is provided so as to be movable in the axis direction of the clamp accommodation hole 26c with respect to the clamp supporting member 26a.

The fiber clamp member 25 is movable in the axis direction of the clamp accommodation hole 26c with respect the clamp supporting member 26a in a state where the fiber hold-down protrusion 25b is located on the side opposite to the side where the windshield cover top wall portion 64 is provided via the barrel portion 25c by the inner surface of the clamp accommodation hole 26c of the clamp supporting member 26a.

The fiber clamp member 25 moves in the axis direction of the clamp accommodation hole 26c with respect to the clamp supporting member 26a, and thereby, the protruding length thereof from the clamp supporting member 26a changes.

When the fiber clamp member 25 moves in the axis direction of the clamp accommodation hole 26c with respect to the clamp supporting member 26a, the falling-out preventing projection 25d moves in the axis direction of the clamp accommodation hole 26c in the projection accommodating cutout portion 26d while being guided by the inner surfaces on both sides of the projection accommodating cutout portion 26d in the circumferential direction of the inner surface of the clamp accommodation hole 26c.

The falling-out preventing projection 25d also functions as a rotation stop projection that regulates the rotation of the fiber clamp member 25 around the axis.

As shown in FIG. 3, FIG. 26, and the like, the spring 26b is interposed between the windshield cover top wall portion 64 and the fiber clamp member 25.

The spring 26b elastically biases the fiber clamp member 25 to the side opposite to the side where the windshield cover top wall portion 64 is provided via the clamp supporting member 26a.

The spring 26b of the clamp unit 25A of the illustrated example is, specifically, a compression coil spring.

The spring 26b (compression coil spring) has one end portion in the axis direction thereof inserted into the barrel portion 25c of the fiber clamp member 25, and is interposed between the tip wall portion 25a of the fiber clamp member 25 and the windshield cover top wall portion 64 such that the axis direction is aligned with the axis direction of the barrel portion 25c of the fiber clamp member 25.

As shown in FIGS. 3, 26, and 27, a stepped surface 26h is formed at the end of the projection accommodating cutout portion 26d of the clamp supporting member 26a on the front surface 26g side of the clamp supporting member.

As shown in FIG. 26, when a push-in force to the clamp supporting member 26a does not act on the fiber clamp member 25, the falling-out preventing projection 25d of the fiber clamp member 25 is butted against and brought into contact with (brought into pressure contact with) the stepped surface 26h of the clamp supporting member 26a from the rear surface 26f side of the clamp supporting member by the elastic biasing force of the spring 26b that acts on the fiber clamp member 25.

The length of the fiber clamp member 25 that protrudes from the clamp supporting member 26a becomes the maximum when the falling-out preventing projection 25d of the fiber clamp member is butted against and brought into contact with the stepped surface 26h of the clamp supporting member 26a.

The position of the fiber clamp member 25 with respect to the clamp supporting member 26a at this time, that is, the position of the fiber clamp member 25 shown in FIG. 26, is hereinafter also referred to as a clamp member initial position.

The fiber clamp member 25 at the clamp member initial position is apart from the windshield cover top wall portion 64.

A clearance is secured between the fiber clamp member 25 and the windshield cover top wall portion 64 at the clamp member initial position.

The fiber clamp member 25 at the clamp member initial position can be pushed in with respect to the clamp supporting member 26a up to a push-in limit position where the base end thereof opposite to the tip side where the fiber hold-down protrusion 25b is located is butted against and brought into contact with the windshield cover top wall portion 64.

As shown in FIG. 3, each fiber clamp member 25 can hold down the optical fiber glass portion 9a arranged on the positioning groove 23a of the grooved substrate 23 toward the bottom of the positioning groove 23a from above by a protruding end face 25e of the fiber hold-down protrusion 25b of the tip of the fiber clamp member when the cover closing operation is completed.

As shown in FIGS. 1 and 5, two fiber clamp members 25 are provided at positions apart from each other in the splicer left-and-right direction via the discharge portion 24a so as to correspond to the grooved substrates 23 on both sides in the splicer left-and-right direction.

As shown in FIG. 3, the fiber clamp member 25 is pushed in slightly from the clamp member initial position with respect to the clamp supporting member 26a, when the optical fiber glass portion 9a is pinched between the fiber clamp member and the grooved substrate 23 by the cover closing operation.

As the optical fiber 9, an optical fiber whose diameter of the optical fiber glass 9a is markedly small compared to the separation distance between the fiber clamp member 25 at the clamp member initial position and the windshield cover top wall portion 64 is adopted.

As a result, when the optical fiber glass portion 9a is pinched between the fiber clamp member 25 and the grooved substrate 23 by the cover closing operation, the fiber clamp member 25 does not reach the push-in limit position already described.

Additionally, when the optical fiber glass portion 9a is pinched between the fiber clamp member 25 and the grooved substrate 23 by the cover closing operation, the fiber clamp member 25 holds down the optical fiber glass portion 9a toward the bottom of the positioning groove 23a by the elastic biasing force of the spring 26b.

In the fusion splicing operation of the fusion splicer 20A, as the cover-closing detector 33 detects that the cover closing operation is completed and the windshield cover 60 is closed with respect to the apparatus body 21, the advancing mechanism power source 81 is driven (the electric motor is normally rotationally driven), the movable stages 22 on both left and right sides are advanced from the position at the time of fiber mounting (refer to FIGS. 7A and 7B), and is made to approach the discharge portion 24a.

As shown in FIGS. 7A and 7B, the movable stage 22 is advanced as the advancement power receiving protrusion 22c thereof is pushed to the tip (front end) of the micrometer movable shaft 82b advanced by the driving force of the advancing mechanism power source 81.

In the fusion splicer 20A, the tips (the tips of the optical fiber glass portions 9a) of the optical fibers 9A and 9B are advanced to a predetermined position by the advance of the movable stages 22 on both left and right sides.

Then, in the fusion splicer 20A, the left and right optical fibers are joined together and fusion-spliced by the discharge between the electrode rods 24 while performing discharge.

The discharge between the pair of electrode rods 24 stops automatically after being performed for a predetermined period of time.

In FIGS. 6A to 9B, lines A to D represent changes in the position (position in the splicer left-and-right direction) of the front end of the lower clamp member 51 of the coating clamp 50 accompanying the movement of the movable stage 22.

As shown in FIGS. 6A and 6B, when the movable stage 22 is located at the position at the time of fiber mounting, the front end of the lower clamp member 51 of the coating clamp 50 is located on line A.

The lower clamp member 51 of the coating clamp 50 advances and retreats toward the discharge portion 24a integrally with the movable stage 22, with the advance and retract movement of the movable stage 22 with respect to the discharge portion 24a.

For this reason, if the movable stage 22 advances after the cover-closing detector 33 detects that the fusion splicer 20A completes the cover closing operation and the windshield cover 60 is closed with respect to the apparatus body 21, the lower clamp member 51 of the coating clamp 50 also advances toward the discharge portion 24a integrally with the movable stage 22.

As shown in FIGS. 7A and 7B, when the fusion splicing operation is completed (discharge stop), the coating clamp 50 is arranged in a place where the front end of the lower clamp member 51 is located on line B.

In addition, the force with which the fiber clamp member 25 pushes the optical fiber glass portion 9a into the positioning groove 23a is adjusted to such magnitude that the optical fiber glass portion 9a can smoothly slide (moves in a contact state) on the grooved substrate 23 with the advance of the movable stage 22.

This allows the optical fiber glass portion 9a to advance integrally with the movable stage 22 when the fusion splicer 20 advances the movable stage 22.

The fusion splicer 20A performs the inspection of a spliced portion after the completion (the stop of discharge between the electrode rods 24) of the fusion splicing.

The fusion splicer 20A drives the electric power source 69 to automatically perform the cover opening operation (windshield cover opening operation) of opening the windshield cover 60 and the spliced portion tension inspection, after the completion of the spliced portion inspection (spliced portion inspection operation).

The windshield cover 60 remains in the closed state until the cover opening operation is started from the completion of the cover closing operation by the ON operation of the cover closing switch 31d.

The start timing of spliced portion tension inspection can be set regardless of the start of the cover opening operation.

Additionally, the completion timing of the spliced portion tension inspection can be set regardless of the completion of the cover opening operation.

The spliced portion tension inspection may be completed before the start of the cover opening operation or may be completed after the completion of the cover opening operation.

The fusion splicer 20A drives the advancing mechanism power source 81 to automatically return the movable stage 22 to the position at the time of fiber mounting, after the completion of spliced portion tension inspection.

The fusion splicer 20A synchronizes the driving of the advancing mechanism power sources 81 of the installation base advancing mechanisms 80 on both left and right sides with each other, to execute the advance and retract movement of the movable stages 22 and the coating clamps 50 on both left and right sides with respect to the discharge portion 24a similar to each other.

Additionally, the fusion splicer 20A can automatically open (the opening operation of the coating clamp lid 52) the coating clamps 50 on both left and right sides that grip and fix the optical fibers 9, respectively, by the clamp opening mechanisms 90 (to be described below).

The spliced portion tension inspection performed by the fusion splicer 20A is completed as the coating clamps 50 on both left and right sides are automatically opened.

The automatic openings of the coating clamps 50 on both left and right sides are realized simultaneously with each other as the movable stages 22 and the coating clamps 50 on both left and right sides advance and retract with respect to the discharge portion 24a (both-sided simultaneous opening).

As shown in FIG. 16B, both of the coating clamps 50 on both left and right sides are arranged at the positions at the time of fiber mounting in a state where the coating clamp lid 52 is located at the opening limit position, after the completion of the spliced portion tension inspection.

However, the fusion splicer 20A can execute not only the program operation (hereinafter referred to as a both-sided simultaneous opening operation) of automatically simultaneously opening (both-sided simultaneous opening) the coating clamps 50 (the coating clamp lid 52 and a second coating clamp lid 52) on both left and right sides as described above, but also the program operation (hereinafter referred to as a one-sided automatic opening operation) of switching the setting of software of the control device automatically opening (one-sided automatic opening) only one of the coating clamps 50 (the coating clamp lid 52 and the second coating clamp lid 52) on both left and right sides.

The fusion splicer 20A can also select and execute the both-sided simultaneous opening operation and the one-sided automatic opening operation by switching the setting of the software of the control device.

That is, whether both of the coating clamp lid 52 and the second coating clamp lid 52 are simultaneously opened or whether one of the coating clamp lid 52 and the second coating clamp lid 52 is opened may be switched by switching the setting of the lid software.

Here, the coating clamp lid 52 and the second coating clamp lid 52 face each other in the advance direction of the coating clamp installation base.

The operation of the installation base advancing mechanism 80 from the ON operation of the cover closing switch 31d to the completion of the fusion splicing operation, and the advance and retract movement of the movable stages 22 and the coating clamps 50 on both left and right sides with respect to the discharge portion 24a, which is caused by the operation of the installation base advancing mechanism, are common in the both-sided simultaneous opening operation and the one-sided automatic opening operation.

The one-sided automatic opening operation is different from both-sided simultaneous opening operation in terms of the spliced portion tension inspection and the subsequent operations.

Here, first, the operation of the fusion splicer 20A after the completion of the fusion splicing operation in the both-sided simultaneous opening operation will be described.

In the spliced portion inspection operation and the subsequent operation to be described herein, the operations of the installation base advancing mechanisms 80 on both left and right sides of the discharge portion 24a are the same as each other, and the operations of the clamp opening mechanisms 90 on both left and right sides of the discharge portion 24a are also the same as each other.

The operations of the installation base advancing mechanisms 80 and the clamp opening mechanisms 90 are synchronized with each other and realized similar to each other, on both left and right sides.

The advance and retract movements of the movable stages 22 and the coating clamps 50 with respect to the discharge portion 24a and the automatic openings of the coating clamps 50 are synchronized with each other and realized similar to each other, on both left and right sides.

In the spliced portion inspection (spliced portion inspection operation), as shown in FIG. 3, a fusion-spliced portion is imaged by the cameras 71 assembled into the apparatus body 21, the captured images are analyzed by an image processor, the splicing loss of the spliced optical fibers 9 are automatically measured, and the abnormality of a spliced state is automatically determined.

When there is an abnormality in measurement results, the fusion splicer emits an alarm to the operator, but when the measurement results are normal, an alarm is not emitted, and the operator automatically proceeds to the following step without performing the operation of inspection completion.

In the spliced portion tension inspection, as shown in FIGS. 8A and 9A, after the completion of spliced portion inspection operation, the electric motor 81 is reversely rotationally driven to move (retreat) the movable shaft 82b of the micrometer 82 toward the rear side (drive mechanism rear side) with respect to the barrel 82a, and a tensile load is made to act on the fusion-spliced portion between the optical fibers 9A and 9B by the elastic biasing force of the proofing spring 83.

If the movable shaft 82b of the micrometer 82 is retreated from a position shown in FIG. 7A after the completion of the spliced portion inspection operation, the tip (front end) of the movable shaft 82b is separated from the movable stage 22 (specifically, the advancement power receiving protrusion 22c).

As a result, a tensile load can be made to act on the fusion-spliced portion of the optical fibers 9A and 9B by the elastic biasing force of the proofing spring 83.

As shown in FIG. 9A, the movable shaft 82b (and the gear 82c having a pressing portion) of the micrometer 82 is moved to a position shifted further toward the drive mechanism rear side than the initial position by the reverse rotational driving of the electric motor 81 after the completion of spliced portion inspection operation.

Additionally, as will be described below, the movable shaft 82b of the micrometer 82 is advanced by the normal rotational driving of the electric motor 81 and arranged at the initial position shown in FIG. 6A, after the completion of spliced portion tension inspection.

Hereinafter, the position of the movable shaft 82b and the gear 82c having a pressing portion shown in FIG. 7A is also referred to as a maximum advance position, and the position of the movable shaft 82b and the gear 82c having a pressing portion shown in FIG. 9A is also referred to as a maximum retreat position.

As shown in FIG. 7B, when the fusion splicing operation is completed (discharge stop), the movable stage 22 is located in a place shifted from the position at the time of fiber mounting to the discharge portion 24a side.

For this reason, compared to the movable stage 22 located at the position at the time of fiber mounting, the proofing spring 83 is compressed and deformed.

In the coating clamp 50, a state where the front end of the lower clamp member 51 is located on line B until the start of the spliced portion tension inspection after the completion of the fusion splicing operation is maintained.

Accordingly, in the spliced portion tension inspection, a tensile load can be made to act on the fusion-spliced portion of the optical fibers 9A and 9B by the elastic biasing force of the proofing spring 83 if the movable shaft 82b of the micrometer 82 is retreated from the maximum advance position shown in FIG. 7A.

In addition, in this embodiment, in the movable stage 22 and the coating clamp 50, the position when the front end of the lower clamp member 51 is located on line B is the advance limit position.

As shown in FIG. 7A, the gear 82c having a pressing portion (specifically, the pressing protrusion 82f of the rear portion) of the micrometer 82 is separated from the driving force receiving portion 91c of the link part 91 of the clamp opening mechanism 90 by advancing the movable shaft 82b of the micrometer 82 from the initial position toward the maximum advance position.

As shown in FIGS. 8A and 8B, the gear 82c having a pressing portion of the micrometer 82 is butted against and brought into contact with the driving force receiving portion 91c of the link part 91 of the clamp opening mechanism 90 and pushes the link part 91 in a direction away from the discharge portion 24a, in the process of moving from the maximum advance position to the maximum retreat position by the retreat movement after the completion of the spliced portion inspection operation.

As already described, the gear 82c having a pressing portion pushes the link part 91, specifically, as the pressing protrusion 82f at the rear portion thereof is butted against and brought into contact with the driving force receiving portion 91c of the link part 91.

As shown in FIGS. 8A and 8B, in the clamp opening mechanism 90, the gear 82c having a pressing portion pushes the link part 91, and consequently, the opening lever 93 rotates to push up the thrust-up pin 54 at the elevation lower limit position.

The opening lever 93 pushes up the thrust-up pin 54 until the gear 82c having a pressing portion that retreats reaches the maximum retreat position, and rotates the coating clamp lid 52 of the coating clamp 50 so that the coating clamp lid 52 is located further upward than the attractive force and biasing force balanced position from the state where the coating clamp lid is closed with respect to the lower clamp member 51.

The coating clamp lid 52 that is thrust up by the thrust-up pin 54 and rotated further upward than the attractive force and biasing force balanced position is rotated by the elastic biasing force of the opening auxiliary elastic member 56 and is arranged at the opening limit position already described.

The fusion splicer 20A can automatically open the coating clamp 50 by the retreat movement of the gear 82c having a pressing portion.

Additionally, in the both-sided simultaneous opening operation, the drivings of the installation base advancing mechanisms 80 on both left and right sides are synchronized with each other and are executed similar to each other.

For this reason, the automatic openings of the coating clamps 50 on both left and right sides are realized simultaneously with each other.

FIGS. 8B, 13, 14A, and 14B show a state where the opening lever 93 of the clamp opening mechanism 90 pushes up the thrust-up pin 54, and pushes up the coating clamp lid 52 of the coating clamp 50 from a state where the coating clamp lid is closed with respect to the lower clamp member 51 to the attractive force and biasing force balanced position.

The gripping and fixing of the optical fiber 9 by the coating clamp 50 is released until the coating clamp lid 52 in a state where the coating clamp lid is closed with respect to the lower clamp member 51 is thrust up by the thrust-up pin 54 and reaches the attractive force and biasing force balanced position.

The spliced portion tension inspection is completed by the release of the gripping and fixing of the optical fiber 9 by the coating clamp 50.

As shown in FIGS. 9A and 9B, if the coating clamp 50 releases the gripping and fixing of the optical fiber 9, the coating clamp moves (retreats) in the direction away from the discharge portion 24a together with the movable stage 22 by the elastic biasing force of the proofing spring 83.

As already described, the covered portion 9d of the optical fiber 9 is capable of being inserted into the fiber groove 51i.

For this reason, the coating clamp 50 that has released the gripping and fixing of the optical fiber 9 is movable with respect to the optical fiber 9.

If the coating clamps 50 on both left and right sides release the gripping and fixing of the optical fibers 9, one or both thereof retreats by slidingly moving with respect to the optical fibers 9.

The optical fibers 9A and 9B that have completed the fusion splicing do not become an obstacle to the retreat movement of the coating clamps 50 that have released the gripping and fixing of the optical fibers 9.

As shown in FIG. 9A, the movable stage 22 and the coating clamp 50 stop the retreat movement as the advancement power receiving protrusion 22c of the movable stage 22 is brought into contact with the tip of the micrometer movable shaft 82b at the maximum retreat position.

As shown in FIG. 9A, the position of the movable stage 22 and the coating clamp 50 when the advancement power receiving protrusion 22c of the movable stage 22 is brought into contact with the tip of the micrometer movable shaft 82b at the maximum retreat position is hereinafter also referred to as a retreat limit position.

As shown in FIGS. 9A and 9B, line D represents the front end position of the lower clamp member 51 of the coating clamp 50 when the movable stage 22 and the coating clamp 50 are at the retreat limit position.

As shown in FIG. 8B, the coating clamp lid 52 thrust up and rotated by the thrust-up pin 54 reaches the attractive force and biasing force balanced position at a position where the movable stage 22 and the coating clamp 50 have retreated slightly from the advance limit position (line A) after the release of the gripping and fixing of the optical fiber 9 by the coating clamp 50.

As shown in FIG. 8B, line C represents the front end position of the lower clamp member 51 of the coating clamp 50 when the coating clamp lid 52 thrust up and rotated by the thrust-up pin 54 reaches the attractive force and biasing force balanced position.

Line C deviates to the discharge portion 24a side from line D.

Next, the fusion splicer 20A drives the advance mechanism drive source 81 (normally rotationally drives the electric motor) to advance the movable shaft 82b and the gear 82c having a pressing portion of the micrometer 82 from the maximum retreat position of FIG. 9A to return the movable shaft and the gear to the initial position.

As a result, the movable stage 22 and the coating clamp 50 return to the position at the time of fiber mounting.

The coating clamp 50 returns to the position at the time of fiber mounting in a state where the coating clamp lid 52 is arranged at the opening limit position (refer to FIG. 16B).

The fusion splicer 20A has a sensor (hereinafter also referred to as a maximum retreat position sensor) (not shown) that detects that the movable shaft 82b and the gear 82c having a pressing portion of the micrometer 82 has moved from a position closer to the drive mechanism front side than the maximum retreat position and has reached the maximum retreat position.

Here, the driving of the advance mechanism drive source 81 for advancing the movable shaft 82b and the gear 82c having a pressing portion of the micrometer 82 from the maximum retreat position to return the movable shaft and the gear having a pressing portion to the initial position is automatically executed, for example, after elapse of a predetermined period of time that is set in advance after detecting (the maximum retreat position sensor detects) that the gear 82c having a pressing portion of the micrometer 82 has retreated from a position shown in FIG. 9A and has reached the maximum retreat position, by the control of the control device.

In addition, as the fusion splicer 20, a configuration that does not have the maximum retreat position sensor can also be adopted.

As the fusion splicer 20 that does not have the maximum retreat position sensor, a configuration can also be adopted in which the driving of the advance mechanism drive source 81 for advancing the movable shaft 82b and the gear 82c having a pressing portion of the micrometer 82 from the maximum retreat position and automatically returning the movable shaft and the gear having a pressing portion to the initial position is automatically executed, for example, after elapse of a predetermined period of time (hereinafter also referred to as elapsed time after tension inspection start) that is set in advance from the start (start of the retreat movement of the movable shaft 82*b* and the gear 82*c* having a pressing portion shown in FIG. 9B) of the spliced portion tension inspection, by the control of the control device.

The elapsed time after tension inspection start is set to be equal to or longer than the time required that is required in order for the movable shaft 82*b* and the gear 82*c* having a pressing portion shown in FIG. 9B to reach the maximum retreat position by the retreat movement of the movable shaft 82*b* and the gear 82*c* having a pressing portion.

The fusion splicer 20A can adopt a configuration in which the advancement power receiving protrusion 22*c* of the movable stage 22 retreated by the elastic biasing force of the proofing spring 83 when the spliced portion tension inspection is completed (the release of the gripping and fixing of the optical fiber 9 by the coating clamp 50) is butted against and brought into contact with the tip of the micrometer movable shaft 82*b* stopped at the maximum retreat position.

Additionally, the fusion splicer 20A can adopt a configuration in which the advancement power receiving protrusion 22*c* of the movable stage 22 retreated by the elastic biasing force of the proofing spring 83 when the spliced portion tension inspection is completed is butted against and brought into contact with the tip of the micrometer movable shaft 82*b* during a retreat movement before the arrival at the maximum retreat position, and retreats together with the micrometer movable shaft 82*b* until the movable shaft 82*b* reaches the maximum retreat position.

The clamp opening mechanism 90 returns the movable shaft 82*b* and the gear 82*c* having a pressing portion of the micrometer 82 to the initial position, and thereby, the opening lever 93 is rotated due to its self-weight and returns from the state shown in FIG. 9B to the initial state shown in FIG. 6B.

The thrust-up pin 54 of the coating clamp 50 descends to the elevation lower limit position due to its self-weight with respect to the lower clamp member 51 from the state shown in FIG. 9B.

The opening lever shaft 92 of the clamp opening mechanism 90 rotates integrally with the opening lever 93 as the opening lever 93 rotates from the state shown in FIG. 9B to the state shown in FIG. 6B.

As shown in FIGS. 15A and 15B, the link part 91 of the clamp opening mechanism 90 advances as the engaging protrusion 92*a* provided so as to protrude from the opening lever shaft 92 pushes the front stepped portion 91*e* of the front end portion of the rod-shaped main body 91*a* of the link part 91 to the discharge portion 24*a* side by the rotation of the opening lever shaft 92.

Then, the link part 91 stops its advance as the protruding end of the driving force receiving portion 91*c* is butted against and brought into contact with the protruding end (rear end) of the pressing protrusion 82*f* of the gear 82*c* having a pressing portion of the micrometer 82 as shown in FIG. 6A, and consequently, returns to the position shown in FIG. 6A.

The weight of the thrust-up pin 54 that descends due to its self-weight to the lower clamp member 51 in addition to the self-weight of the opening lever 93 also contributes to realization of the rotation of the opening lever 93 from the position shown in FIG. 9B to the position shown in FIG. 6B.

FIG. 16B shows the state of the fusion splicer 20A where the movable shaft 82*b* and the gear 82*c* having a pressing portion of the micrometer 82 return to an initial position, the movable stage 22 and the coating clamp 50 return to the position at the time of fiber mounting, the clamp opening mechanism 90 returns to the initial state, and the thrust-up pin 54 is arranged at the elevation lower limit position.

Additionally, the fusion splicer 20A returns to the fiber set standby state already described, as the cover opening operation is completed.

As shown in FIGS. 9A and 9B, as already described, the coating clamp 50 of the fusion splicer 20A is automatically opened by the retreat movement of the movable shaft 82*b* and the gear 82*c* having a pressing portion of the micrometer 82 after the completion of the spliced portion tension inspection.

For this reason, after the automatic opening and cover opening operation of the coating clamp 50 are completed, an operator can manually and extremely simply perform the operation (fiber take-out operation) of taking out the optical fibers 9A and 9B together with the fusion-spliced portion from the coating clamps 50 on both left and right sides.

Since the coating clamp 50 is already opened when this fiber take-out operation is performed, it is unnecessary for the operator to perform the operation of manually opening the coating clamps on both left and right sides.

In the above-described both-sided simultaneous opening operation, the coating clamps 50 on both left and right sides are simultaneously opened. Thus, if the operator grips the optical fibers 9 with an operator's fingers, the fiber take-out operation can be rapidly performed after the opening of the coating clamps 50 and the completion of the cover opening operation.

It is suitable to execute the gripping of the optical fibers 9 by the operator from when the coating clamps 50 on both left and right sides are automatically opened or from before that time until the completion of the fiber take-out operation.

The two-sided simultaneous opening operation is advantageous in shortening time until proceeding to the following step after the opening of the coating clamps 50 and the completion of the cover opening operation.

Accordingly, the both-sided simultaneous opening operation effectively contributes to improvement in operation efficiency when the fusion splicing of the optical fibers is repeatedly executed multiple times.

Next, the one-sided automatic opening operation will be described.

In the one-sided automatic opening operation executed by the fusion splicer 20A, the operation of the installation base advancing mechanisms 80 on both left and right sides is performed similar to the both-sided simultaneous opening operation, from the ON operation of the cover closing switch 31*d* to the completion of the fusion splicing operation.

Additionally, the advance and retract operation in the one-sided automatic opening operation of the movable stages 22 and the coating clamps 50 on both left and right sides with respect the discharge portion 24*a*, which is caused by the operation of the installation base advancing mechanisms 80, is the same as the advance and retract operation of the both-sided simultaneous opening operation.

In the both-sided simultaneous opening operation, the installation base advancing mechanisms 80 on both left and right sides are synchronously driven similar to each other, and the spliced portion tension inspection after the completion of the spliced portion inspection operation is performed.

Subsequently, the operation until the movable stages 22 and the coating clamps 50 are returned to the positions at the time of fiber mounting is performed.

On the other hand, in the one-sided automatic opening operation, only one of the installation base advancing mechanisms 80 on both left and right sides is driven, and the spliced portion tension inspection after the completion of the spliced portion inspection operation is performed.

Subsequently, the operation until the movable stages 22 and the coating clamps 50 are returned to the positions at the time of fiber mounting is executed, and the other installation base advancing mechanism 80 is brought into a stopped state.

The installation base advancing mechanism 80 driven in the one-sided automatic opening operation moves the movable shaft 82b and the gear 82c having a pressing portion of the micrometer 82 from the maximum advance position shown in FIG. 6B to the maximum retreat position shown in FIG. 9A and then, advances the movable shaft and the gear having a pressing portion from the maximum retreat position to return the movable shaft and the gear having a pressing portion to the initial position, by the driving of the advancing mechanism power source 81 after the completion of the spliced portion inspection operation.

The operation of the installation base advancing mechanism 80 driven in the one-sided automatic opening operation is the same as the operation of the installation base advancing mechanism 80 in the both-sided simultaneous opening operation.

The one-sided automatic opening operation is, in other words, the operation of driving only one of the installation base advancing mechanisms 80 on both left and right sides similar to the case of the both-sided simultaneous opening operation and keeping the other installation base advancing mechanisms 80 stopped.

In the one-sided automatic opening operation, in the spliced portion tension inspection and the subsequent operation, only one of the movable stages 22 on both left and right sides is advanced and retreated with respect to the discharge portion 24a by the driving of the installation base advancing mechanism 80, and is arranged (returned) at the position at the time of fiber mounting.

In the one-sided automatic opening operation, only the coating clamp 50 out of the coating clamps 50 on both left and right sides, which is mounted on the movable stage 22 advanced and retreated with respect to the discharge portion 24a by the driving of the installation base advancing mechanism 80 after the completion of the spliced portion inspection operation, is opened (automatically opened).

In the one-sided automatic opening operation, only one of the coating clamps 50 on both left and right sides is automatically opened, and the other coating clamp 50 maintains a state where the optical fiber 9 is gripped and fixed.

For this reason, the fusion splicer 20A is brought into a state shown in FIG. 16A if the automatically opened coating clamp 50 is arranged at (returned to) the position at the time of fiber mounting by the driving of the installation base advancing mechanisms 80.

In this one-sided automatic opening operation, when the automatic opening and cover opening operation of one of the coating clamps 50 on both left and right sides are completed, the coating clamp 50 in the closed state grips and fixes the optical fiber 9.

For this reason, there is no concern that the fusion-spliced optical fibers 9A and 9B inadvertently fall out of the left and right coating clamps 50, and there is no necessity that an operator grips the optical fibers 9 with an operator's fingers during the automatic opening of the coating clamp 50.

In this one-sided automatic opening operation, the coating clamp 50 in the closed state is manually opened to perform fiber take-out operation, after the completion of the automatic opening and the cover opening operation of one of the coating clamps 50 on both the left and right sides thereof.

In the fusion splicer 20, the coating clamp lid 52 is automatically opened by the driving force of the advancing mechanism power source 81, regarding both or one of the coating clamps 50 on both left and right sides, after the fusion splicing is completed.

In the fusion splicer 20, the operation in which an operator manually opens the coating clamp lid 52 after the completion of the fusion splicing, regarding one or both of the coating clamps 50 on both left and right sides, can be omitted.

For this reason, in the fusion splicer 20, the coating clamps 50 on both left and right sides can be efficiently opened in a short time compared to a case where an operator manually opens the coating clamp lids 52 of both of coating clamps 50 on both left and right sides after the completion of the fusion splicing.

In the fusion splicer 20, the operability of the fusion splicing of the optical fibers can be improved, and the total operation time including the fiber take-out operation after the fusion splicing can be shorted.

Additionally, since the fusion splicer 20A has the configuration in which the advancing mechanism power source 81 is used as a power source for opening the coating clamp lid 52, there is no need for separately providing a power source exclusive for opening coating clamp lid opening.

The fusion splicer 20A can reduce the number of power sources to be installed, and can avoid or suppress an increase in apparatus size.

For this reason, the fusion splicer 20A can realize shortening of the operation time of the fusion splicing of the optical fibers and improvement in operability at low costs, without nearly (or completely) affecting the apparatus size.

Additionally, the reduction in the number of power sources to be installed also has an advantage that an increase in power consumption can be avoided or suppressed.

As already described, the clamp opening mechanism 90 is driven by the driving force of the advancing mechanism power source 81 to push up the thrust-up pin 54 and pushes up and opens the coating clamp lid 52 in the closed state with respect to the lower clamp member 51 by the thrust-up pin 54.

The clamp opening mechanism 90 does not become an obstacle to the manual opening of the coating clamp lid 52 in the closed state.

Additionally, in the clamp opening mechanism 90, when the coating clamp lid 52 in the closed state is manually openable and closable, component parts that follow the coating clamp lid 52 are not present.

In the fusion splicer 20, the manual opening and closing of the coating clamp lid 52 in the closed state can be performed without damaging the component parts of the clamp opening mechanism 90.

Additionally, the manual opening and closing of the coating clamp lid 52 in the closed state can be performed without affecting the component parts of the installation base advancing mechanism 80.

In the motor driven coating clamp of Japanese Unexamined Patent Application, First Publication No. H6-160662 already described, a gear or the like will be damaged when an operator manually opens the lid plate in the closed state forcedly.

For this reason, the motor driven coating clamp cannot perform operations, such as manually opening the lid plate once to re-grip an optical fiber after the gripping of the optical fiber.

For example, if the motor driven coating clamp has a configuration in which the normal and reverse rotational driving of the motor can be appropriately switched, it is possible to re-grip the optical fiber.

However, in this configuration, the re-gripping operation of the optical fiber requires substantial time and effort, and operation efficiency declines.

In contrast, when the clamp opening mechanism 90 manually opens and closes the coating clamp lid 52 in the closed state as already described, component parts that follow the coating clamp lid 52 are not present, and there is no concern of any damage caused by the manual opening and closing of the coating clamp lid 52.

The fusion splicer 20A can perform the operation of manually opening the coating clamp 50 once to re-grip the optical fiber after gripping the optical fiber 9, without affecting the clamp opening mechanism 90.

(Example of Split Type Windshield Cover)

The windshield cover is not limited to the configuration illustrated in FIGS. 2 to 5.

Figure 17:
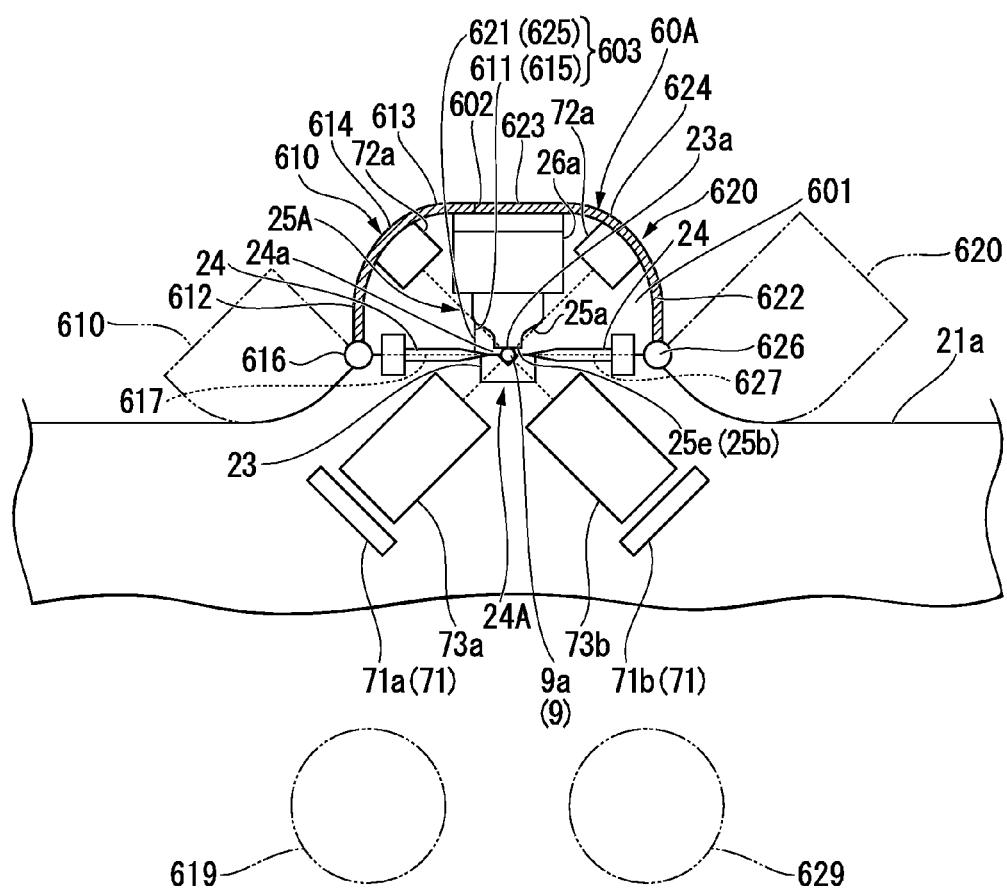
FIG. 17 is a view showing a modification example of the windshield cover of the optical fiber fusion splicer of FIG. 1, and is a cross-sectional view showing the structure of a dual-split type windshield cover including a pair of cover members rotationally driven by separate opening and closing power sources.

The windshield cover may, for example, as shown in FIG. 17, may be configured to have a pair of cover members 610 and 620 obtained by splitting the windshield cover 60 illustrated in FIGS. 2 to 5 into two in the splicer front-and-rear direction.

FIG. 17 shows schematically an example of a dual-split type windshield cover 60A.

The pair of cover members 610 and 620 of the windshield cover 60A shown in FIG. 17 are different from each other in terms of installation position in the splicer front-and-rear direction (left-and-right direction in FIG. 17).

Hereinafter, the cover member 610 on the splicer front side is also referred to as a first cover member, and the cover member 620 on the splicer rear side is also referred to as a second cover member.

The windshield cover 60A shown in FIG. 17 is openable and closable by the opening and closing between the pair of cover members 610 and 620.

The windshield cover 60A is configured in the shape of an elongated container that extends in the splicer left-and-right direction by causing end faces 611 and 621 of the closed cover members 610 and 620 to butt against and come into contact with each other.

The windshield cover 60A closes the pair of cover members 610 and 620 to thereby cover the pair of electrode rods 24 on the apparatus body 21, the coating clamps 50 on the respective movable stages 22, and the pair of grooved substrates 23.

As shown in FIG. 17, the first cover member 610 has a cover member body 614 with a configuration in which a top wall portion 613 that is inclined with respect to an elongated plate-shaped side wall portion 612 overhangs from a whole width-direction piece end perpendicular to the longitudinal direction of the side wall portion 612, and end wall portions 615 formed substantially perpendicularly to the longitudinal direction of the cover member body 614, at both ends of the cover member body 614 in the longitudinal direction.

The first cover member 610 has a space that functions as a portion of the inner space 601 of the windshield cover 60A provided in the shape of an elongated container, inside a portion surrounded by the cover member body 614 and the end wall portions 615 at both ends of the cover member body.

The second cover member 620 has a cover member body 624 with a configuration in which a top wall portion 623 that inclines with respect to an elongated plate-shaped side wall portion 622 overhangs from a whole width-direction piece end perpendicular to the longitudinal direction of the elongated plate-shaped side wall portion 622, and end wall portions 625 formed substantially perpendicularly to the longitudinal direction of the cover member body 624, at both ends of the cover member body 624 in the longitudinal direction.

The second cover member 620 has a space that functions as a portion of the inner space 601 of the windshield cover 60A provided in the shape of an elongated container, inside a portion surrounded by the cover member body 624 and the end wall portions 625 at both ends of the cover member body.

The top wall portions 613 and 623 of the respective cover members 610 and 620 butt against and come into contact with each other by closing the cover members 610 and 620, and constitute the top wall portion 602 of the windshield cover 60A.

Additionally, the top wall portions 615 and 625 of the respective cover members 610 and 620 butt against and come into contact with each other by closing the cover members 610 and 620, and constitute the top wall portion 603 of the windshield cover 60A.

The closed end face 611 of the first cover member 610 is constituted by the end face of the top wall portion 613 opposite to the side where the side wall portion 612 is formed, and the end face of the end wall portion 615 located opposite to the side wall portion 612.

The closed end face 621 of the second cover member 620 is constituted by the end face of the top wall portion 623 opposite to the side where the side wall portion 622 is provided, and the end face of the end wall portion 625 located opposite to the side where the side wall portion 622 is provided.

The windshield covers 610 and 620 are attached to the apparatus body 21 via the rotating shafts 616 and 626 supported on the apparatus body 21, respectively, so as to be rotatable around the rotation axis of the splicer in the left-and-right direction.

The first cover member 610 is provided on the apparatus body 21 such that the end portion of the side wall portion 612 opposite to the side where the top wall portion 613 is provided is attached to the apparatus body 21 (specifically, the housing 29 thereof) via a rotating shaft 616.

The second cover member 620 is provided on the apparatus body 21 such that the end portion of the side wall portion 622 opposite to the side where the top wall portion 623 is provided is attached to the apparatus body 21 (specifically, the housing 29 thereof) via a rotating shaft 626.

The respective cover members 610 and 620 are rotated around the rotating shafts 616 and 626 by the driving forces generated by windshield opening and closing power sources 619 and 629 (second power sources) of a windshield opening and closing mechanism provided in the apparatus body 21.

The cover members 610 and 620 are rotationally driven in mutually opposite directions by the windshield opening and closing mechanism.

The windshield cover 60A is brought into the closed state as the pair of cover members 610 and 620 are closed and connected to each other, and is brought into the opened state (cover members 610 and 620 shown by two-dot chain lines shown in FIG. 17) as the pair of cover members 610 and 620 are rotated in mutually opposite directions from the closed state and separated from each other.

When the windshield cover 60A is in the closed state as shown in FIG. 17, the pair of cover members 610 and 620 are closed and connected to each other, the end wall portions 615 and 625 on both sides of the respective cover members in the longitudinal direction butt against and come into contact with the apparatus body upper surface 21a, and the windshield cover is brought into the closed state with respect to the apparatus body 21 (in detail, the upper surface 21a thereof).

The end wall portions 615 and 625 of the cover members 610 and 620 have contact end faces 617 and 627 that butt against and come into contact with the apparatus body upper surface 21a when the windshield cover 60A is brought into the closed state.

When the windshield cover 60A is in the opened state as shown by two-dot chain lines in FIG. 17, the a pair of cover members 610 and 620 are arranged opposite to the positions (the positions of the cover members 610 and 620 shown by solid lines in FIG. 17) when being closed with respect to the apparatus body 21, via the respective rotating shaft 616 and 626.

The state of each of the cover members 610 and 620 at this time is brought into the opened state.

Additionally, when the pair of cover members 610 and 620 are brought into the state shown by two-dot chain lines in FIG. 17 is hereinafter also referred to as a fully opened state.

The windshield opening and closing power sources 619 and 629 may be the same as the windshield opening and closing power source (electric power source 69) illustrated in FIG. 2.

In addition, in the configuration illustrated in FIG. 17, two windshield opening and closing mechanisms are provided corresponding to the two cover members 610 and 620, respectively, within the apparatus body 21.

The pair of cover members 610 and 620 are separately rotationally driven by the windshield opening and closing mechanisms provided corresponding to the cover members 610 and 620, respectively.

The fiber clamp member 25 is provided only at the second cover member 620.

The fiber clamp member 25 is provided on the inner surface (the surface of the windshield cover 60A on the inner space 601 side) side of the top wall portion 623 of the second cover member 620.

(Example of Windshield Cover Having Coating Clamp Lid Coupling Portion)

Figure 18:
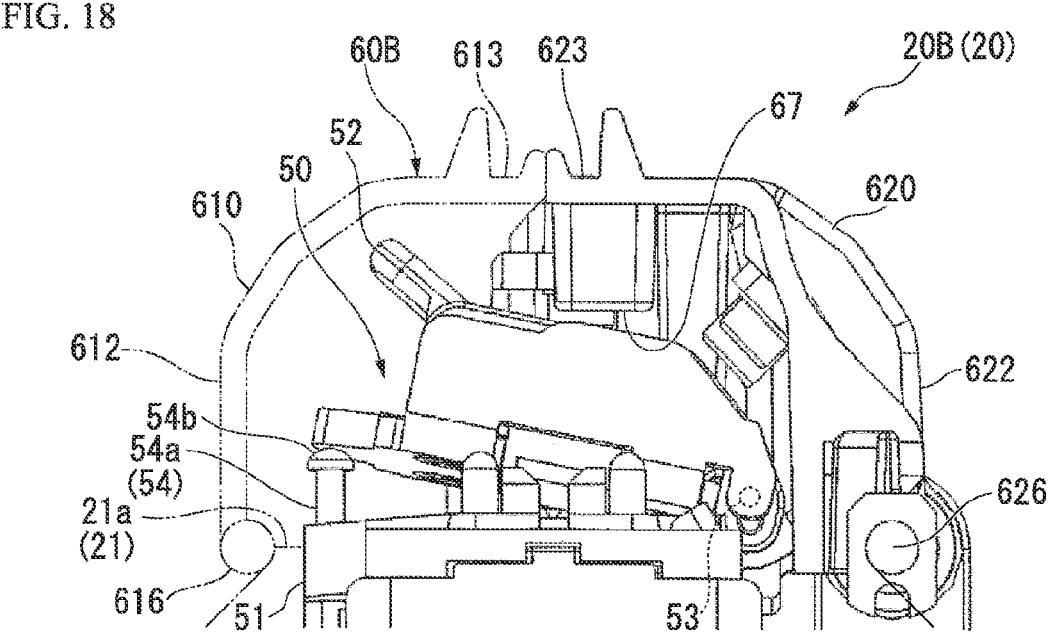
FIG. 18 is an enlarged cross-sectional view showing the vicinity of the windshield cover and the coating clamp of the optical fiber fusion splicer in which the windshield cover with a configuration in which a magnet magnetically attracts the coating clamp lid of the coating clamp on the coating clamp installation base is adopted inside one of the pair of cover members of the windshield cover illustrated in FIG. 17 and showing the windshield cover in a closed state and a state where the coating clamp lid of the coating clamp is rotated and lifted from the closed state by a thrust-up pin.
Figure 19:
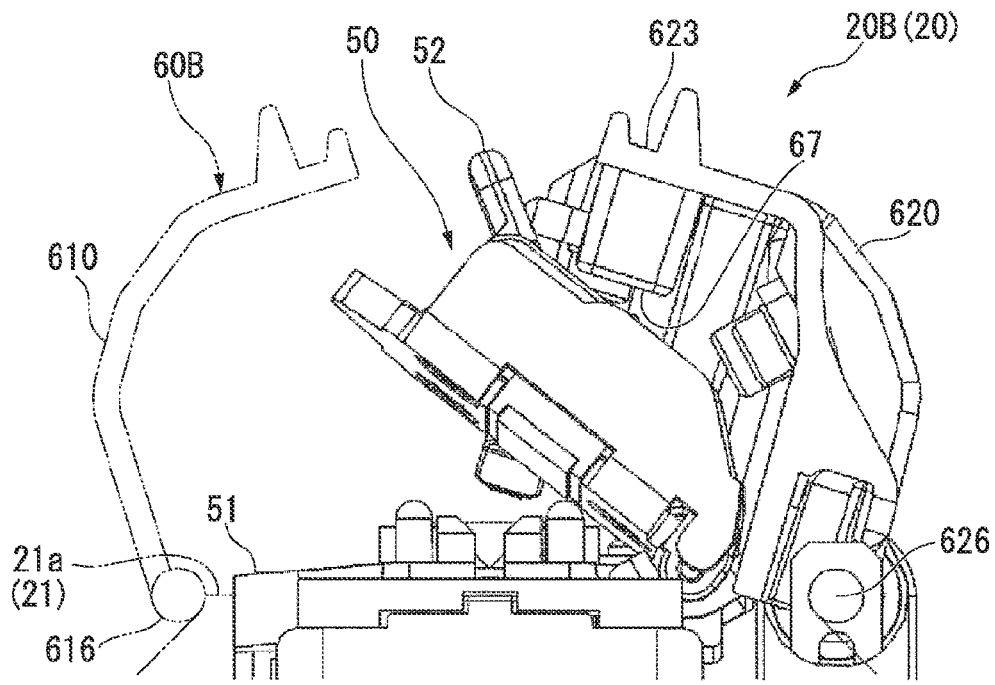
FIG. 19 is an enlarged cross-sectional view showing the vicinity of the windshield cover and the coating clamp of the optical fiber fusion splicer of FIG. 18, and showing the operation of opening one cover member together with the coating clamp lid held by the attractive force of the magnet inside the one cover member as the pair of cover members of the windshield cover are opened.
Figure 20:
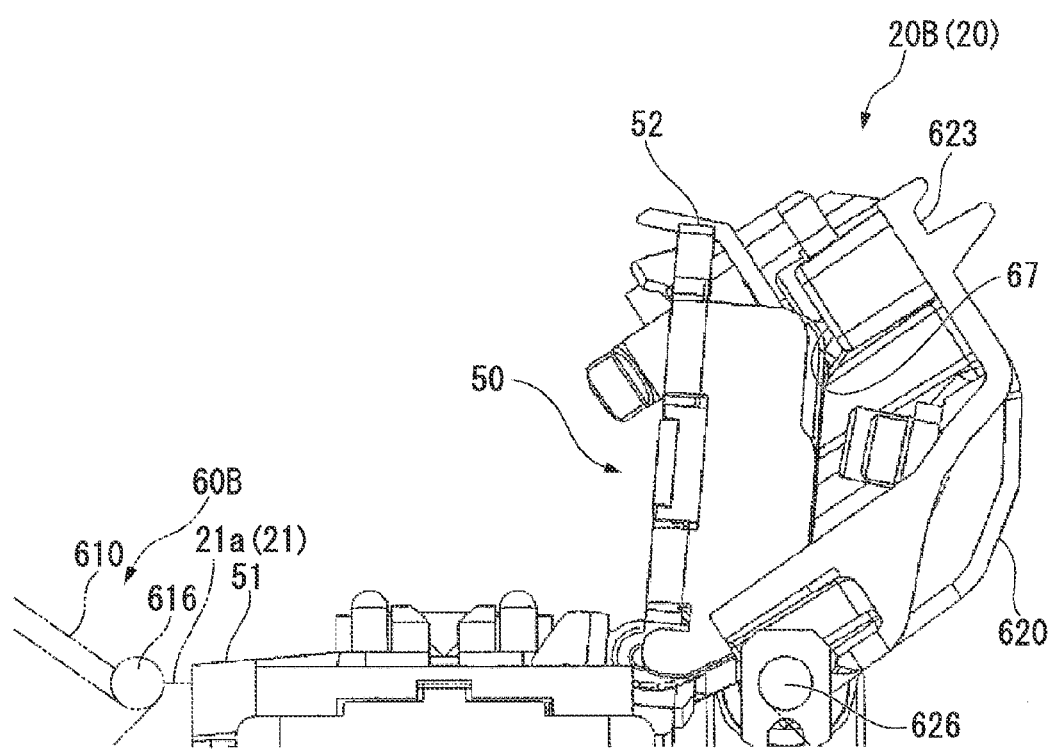
FIG. 20 is an enlarged cross-sectional view of the vicinity of the windshield cover and the coating clamp, illustrating a state when the coating clamp lid of the coating clamp of FIG. 19 reaches an opening limit position.

FIGS. 18 to 20 are views illustrating an example of the fusion splicer 20 (reference numeral 20B is appended in FIGS. 18 to 20) that adopts a windshield cover 60B having a magnet 67 (permanent magnet) for magnetically attracting the coating clamp lid 52 of the coating clamp 50.

In the windshield cover 60B shown in FIGS. 18 to 20, the magnet 67 is provided inside the cover members of the dual-split type windshield cover.

The same components in FIGS. 18 to 20 as those of the windshield cover 60A illustrated of FIG. 17 will be designated by common reference numerals, and a description thereof will be omitted or simplified here.

In the windshield cover 60B shown in FIGS. 18 to 20, the magnet 67 is attached to the inner surface side of the top wall portion 623 of the second cover member 620 of the dual-split type windshield cover 60A.

The magnet 67 is arranged at a position apart from the coating clamp lid 52 in the closed state to the upper side in a state where the second cover member 620 is closed with respect to the apparatus body 21.

In addition, in FIGS. 18 to 20, the illustration of the fiber clamp member 25 and the windshield opening and closing power sources 619 and 629 is omitted.

Configurations other than the windshield cover 60B and the windshield opening and closing mechanisms that rotate the cover members 610 and 620 of the windshield cover 60B in the fusion splicer 20B are the same as those of the fusion splicer 20A described with reference to FIGS. 1 to 16B.

The fiber set standby state of the fusion splicer 20B is the same as the fiber set standby state of the fusion splicer 20A described with reference to FIGS. 1 to 16B except for the opening (full opening) of the dual-split type windshield cover 60B.

In the fusion splicer 20B in the fiber set standby state, the movable stage 22 is arranged at the position at the time of fiber mounting, the windshield cover 60B is opened, the movable shaft 82b and the gear 82c having a pressing portion of the micrometer 82 (refer to FIGS. 6A and 6B) are arranged at the initial position with respect to the barrel 82a, the clamp opening mechanism 90 is brought into the initial state shown in FIGS. 6B and 10, and the thrust-up pin 54 is arranged at the elevation lower limit position (refer to FIG. 6B).

Here, the state where the windshield cover 60B is opened indicates the fully opened state, that is, the state where the pair of cover members 610 and 620 are shown by the two-dot chain lines in FIG. 17.

In the fusion splicing of the optical fibers using the fusion splicer 20B, the cover closing switch 31d (refer to FIG. 2) is turned on after the fiber set operation of gripping and fixing the optical fibers 9 by the coating clamps 50 on both sides in the fiber set standby state.

The fusion splicer 20B performs the cover closing operation of closing the pair of cover members 610 and 620 with respect to the apparatus body 21 by the ON operation of the cover closing switch 31d.

Additionally, after the completion of the cover closing operation, the fusion splicer 20B executes the fusion splicing operation and the spliced portion inspection in a state where the windshield cover 60B is closed, and then, starts the spliced portion tension inspection.

The operation of the installation base advancing mechanism 80 and the clamp opening mechanism 90 of the fusion splicer 20B after the cover closing switch 31d is turned on is the same as that of the fusion splicer 20A described with reference to FIGS. 1 to 16.

In the fusion splicer 20B, after the start of the spliced portion tension inspection, the clamp opening mechanism 90 pushes up the thrust-up pin 54 by the driving force of the advancing mechanism power source 81 (refer to FIG. 18), and rotates the coating clamp lid 52 in the closed state to the upper side.

However, as shown in FIG. 18, in the fusion splicer 20B, in a state where the windshield cover 60B is closed, the thrust-up pin 54 is pushed up by the clamp opening mechanism 90, and the coating clamp lid 52 is arranged in contact with or in proximity to the magnet 67 inside the second cover member 620 (in FIG. 18, arranged in proximity to the second cover member).

Additionally, in the fusion splicer 20B, the cover opening operation of rotating the pair of cover members 610 and 620, respectively, and opening the windshield cover 60B (rotate the windshield cover in the opening direction) by the driving force of the windshield opening and closing power sources is started after the coating clamp lid 52 is arranged in contact with or in proximity to the magnet 67 inside the second cover member 620.

Here, as for the thrust-up of the thrust-up pin 54 by the clamp opening mechanism 90, a rotational ascending force that acts on the coating clamp lid 52 by the elastic biasing force of the opening auxiliary elastic member 56 and the attractive force of the magnet 67 rotates and lifts of the coating clamp lid 52 in the closed state to a position exceeding the attractive force of the permanent magnet 55 of the lower clamp member 51 that acts on the coating clamp lid 52.

Accordingly, as shown in FIG. 19, if the rotation of the second cover member 620 in the opening direction is started, the coating clamp lid 52 is opened together with the second cover member 620 in a state where the coating clamp lid is attached to and held by the second cover member 620 with the attractive force of the magnet 67 of the second cover member 620.

The coating clamp lid 52 is opened together with the second cover member 620, so to speak, with the state of connection with the second cover member 620 being maintained by the attractive force of the magnet 67 of the second cover member 620.

The magnet 67 functions as a coating clamp lid coupling portion (coupling portion) for bringing the coating clamp lid 52 into the state of connection with the second cover member 620.

Additionally, the magnet 67 of the second cover member 620 is hereinafter also referred to as a lid holding magnet.

The position of the coating clamp lid 52 where the rotational ascending force that acts on the coating clamp lid 52 rotating around the pivot 53 with the elastic biasing force of the opening auxiliary elastic member 56 and the attractive force of the magnet 67, and the attractive force of the permanent magnet 55 of the lower clamp member 51 that acts on the coating clamp lid 52 become equal to each other is hereinafter referred to as an attractive force and ascending force balanced position (attractive force and opening force balanced position).

In the push-up operation of the thrust-up pin 54 by the clamp opening mechanism 90, the coating clamp lid 52 in the closed state is rotated and lifted further upward than the attractive force and ascending force balanced position with respect to the lower clamp member 51.

In addition, the coating clamp lid 52 shown in FIG. 18 is arranged at the attractive force and biasing force balanced position already described.

In the fusion splicer 20B shown in FIG. 18, in addition to the elastic biasing force of the opening auxiliary elastic member 56, the attractive force of the lid holding magnet 67 of the windshield cover 60B also acts on the coating clamp lid 52 as the rotational ascending force of the coating clamp lid.

The attractive force and biasing force balanced position shown in FIG. 18 is located on the opening limit position side in the rotational direction of the coating clamp lid 52 above the attractive force and ascending force balanced position.

In the fusion splicer 20B, when the coating clamp lid 52 in the closed state reaches the attractive force and biasing force balanced position as a result of the push-up operation of the thrust-up pin 54 by the clamp opening mechanism 90, the cover opening operation of rotating the pair of cover members 610 and 620, respectively, and opening the windshield cover 60B (rotating the windshield cover in the opening direction) by the driving force of the lid opening and closing power sources 619 and 629 (refer to FIG. 17).

As shown in FIG. 19, the rotation center of the coating clamp lid 52 is located at a position shifted in the splicer front-and-rear direction (left-and-right direction in FIGS. 18 to 20) from the rotation center of the second cover member 620.

For this reason, with the start of the opening operation of the second cover member 620, the coating clamp lid 52 opened together with the second cover member 620 in a state where the coating clamp lid is held by the second cover member 620 with the attractive force of the lid holding magnet 67 increased in the distance thereof from the lid holding magnet 67 as the second cover member 620 is opened (refer to FIG. 20).

FIG. 20 shows a state where the coating clamp lid 52 reaches the opening limit position thereof and the cover members 610 and 620 on both sides of the windshield cover 60B continues the opening operation.

As shown in FIG. 20, the opening operation of the coating clamp lid 52 exceeding the opening limit position is regulated as the coating clamp lid reaches the opening limit position by the opening operation.

On the other hand, the second cover member 620 is opened from a state where the second cover member is closed with respect to the apparatus body upper surface 21a to a place where the second cover member is arranged on the opposite side via the rotating shaft 626 in the splicer front-and-rear direction.

The windshield cover 60B is brought into the fully opened state (state where the cover members 610 and 620 on both sides are located at the positions shown by two-dot chain lines in FIG. 17) by opening the cover members 610 and 620 on both sides.

When the coating clamp lid 52 reaches the opening limit position opened together with the opening operation of the second cover member 620 by the cover opening operation, the attraction and holding of the coating clamp lid 52 by the lid holding magnet 67 of the second cover member 620 is released by the continuation of the opening operation of the second cover member 620.

The fusion splicer 20B returns to the fiber set standby state at the time of the completion of the cover opening operation or after that.

When the cover opening operation is completed, the coating clamp lid 52 is arranged at the opening limit position.

The fiber set operation of gripping and fixing the optical fibers 9 with the coating clamps 50 on both left and right sides of the fusion splicer 20B in the fiber set standby state is realized, for example, by manually closing the coating clamp lids 52 after the optical fibers 9 are arranged on the lower clamp members 51 of the coating clamps 50 that are brought into the opened state by arranging the coating clamp lids 52 at the opening limit position.

When the fusion splicer 20B is in the fiber set standby state, the holding of the coating clamp lid 52, which is arranged at the opening limit position, onto the second cover member 620 is released by to the attractive force of the lid holding magnet 67.

In the fiber set operation in the fiber set standby state, the coating clamp lid 52 arranged at the opening limit position is not substantially influenced by the attractive force of the lid holding magnet 67, and the coating clamp lid 52 can be manually rotated and closed toward the lower clamp member 51.

In addition, the operation of the installation base advancing mechanism 80, the clamp opening mechanism 90, and the cover members 610 and 620 of the fusion splicer 20B after the cover closing switch 31d is turned on is also the same as that of the fusion splicer 20 adopting the dual-split type windshield cover 60A shown in FIG. 17.

Figure 21:
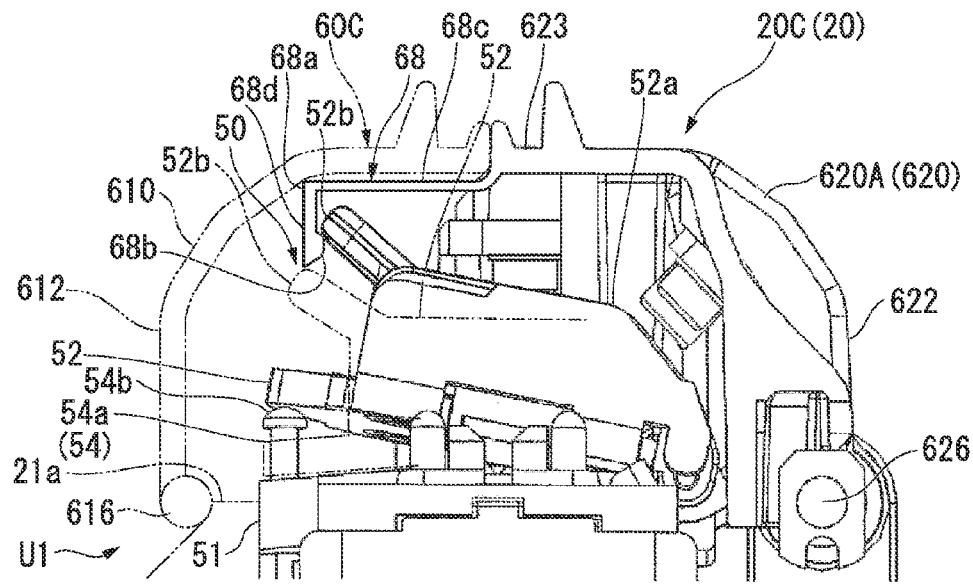
FIG. 21 is an enlarged cross-sectional view showing the vicinity of the windshield cover and the coating clamp of the optical fiber fusion splicer in which the windshield cover with a configuration in which a lid engagement protruding piece is provided as a coupling means (coupling portion) is adopted in one of the pair of cover members of the windshield cover illustrated in FIG. 17, and showing the windshield cover in a closed state and a state where the coating clamp lid of the coating clamp is rotated and lifted from the closed state by the thrust-up pin.
Figure 22:
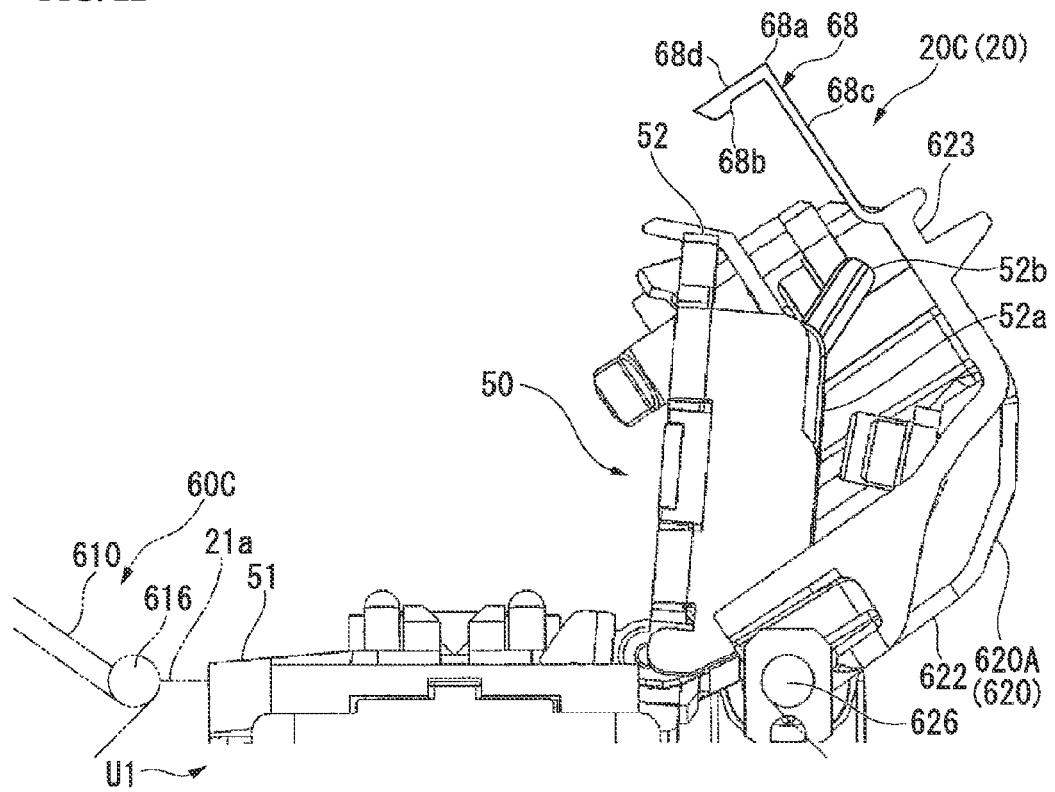
FIG. 22 is an enlarged cross-sectional view of the vicinity of the windshield cover and the coating clamp, illustrating a state when the coating clamp lid of the coating clamp of FIG. 21 reaches the opening limit position.

FIGS. 21 and 22 show a modification example of the windshield cover.

A windshield cover 60C shown in FIGS. 21 and 22 is a windshield cover adopting a cover member 620A with a lid engaging portion in which an engagement protruding piece 68 (hereinafter also referred to as a lid engagement protruding piece) detachably engaged with the coating clamp lid 52 of the coating clamp 50 is provided so as to protrude from the second cover member 620, regarding the windshield cover 60A illustrated in FIG. 17.

The windshield cover 60C is different from the windshield cover 60A illustrated in FIG. 17 only in that the cover member 620A with a lid engaging portion is adopted, and is the same as the windshield cover 60A illustrated in FIG. 17 in terms of the other configurations.

More specifically, the cover member 620A with a lid engaging portion in which the lid engagement protruding piece 68 already described is provided so as to protrude from the second cover member 620 is adopted in the windshield cover 60C shown in FIGS. 21 and 22 instead of the second cover member 620 having the lid holding magnet 67 of the windshield cover 60B illustrated in FIGS. 18 to 20.

The windshield cover 60C is different from the windshield cover 60B illustrated in FIGS. 18 to 20 only in that the cover member 620A with a lid engaging portion is adopted, and is the same as the windshield cover 60B illustrated in FIGS. 18 to 20 in terms of the other configurations.

Additionally, the fusion splicer 20 (reference numeral 20C is appended in the drawings) shown in FIGS. 21 and 22 has a configuration in which the windshield cover 60B of the fusion splicer 20B illustrated in FIGS. 18 to 20 is changed to the windshield cover 60C already described in FIGS. 21 and 22.

The fusion splicer 20C is different from the fusion splicer 20B illustrated in FIGS. 18 to 20 only in that the lid engagement protruding piece 68 of the cover member 620A with a lid engaging portion is used as the coating clamp lid coupling portion (coupling portion) for coupling the coating clamp lid 52 to the second cover member 620.

The installation base advancing mechanism 80, the clamp opening mechanism 90, and the cover members 610 and 620 of the fusion splicer 20C perform the same operation as the installation base advancing mechanism 80, the clamp opening mechanism 90, and the cover members 610 and 620 of the fusion splicer 20B illustrated in FIGS. 18 to 20, and returns from the fiber set standby state to the fiber set standby state through the fusion splicing operation.

As shown in FIGS. 21 and 22, in the lid engagement protruding piece 68 of the cover member 620A with a lid engaging portion, an engaging claw 68b is provided so as protrude from a tip portion side surface of the elastic protruding piece 68a that protrudes from the top wall portion 623 of the second cover member 620 to the side opposite to the side where the side wall portion 622 is provided.

In the elastic protruding piece 68a of the illustrated example, specifically, a tip piece portion 68d that extends in a downward direction when the second cover member 620 is closed with respect to the apparatus body upper surface 21a is provided so as to protrude from a protruding end of an overhanging piece portion 68c that protrudes from the top wall portion 623 of the second cover member 620 to the side opposite to the side where the side wall portion 622 is provided.

The engaging claw 68b of the lid engagement protruding piece 68 is provided so as to protrude from a protruding end side surface of the tip piece portion 68d of the elastic protruding piece 68a.

The engaging claw 68b of the lid engagement protruding piece 68 of the illustrated example, specifically, is provided so as to protrude from the side of the tip piece portion 68d of the elastic protruding piece 68a facing the side wall portion 622 of the second cover member 620.

As shown in FIG. 21, the lid engagement protruding piece 68 of the cover member 620A with a lid engaging portion is engaged with the coating clamp lid 52 thrust up from the closed state thereof with respect to the lower clamp member 51 of the coating clamp 50 by the thrust-up pin 54, and functions as a coating clamp lid coupling portion (coupling portion) that couples the coating clamp lid 52 to the second cover member 620.

As shown in FIG. 21, the engaging claw 68b of the lid engagement protruding piece 68 of the cover member 620A with a lid engaging portion is engaged with the coating clamp lid 52 that is thrust up by the thrust-up pin 54, is rotated and lifted from the closed state, and reaches the attractive force and biasing force balanced position, in a state where the windshield cover 60C is closed.

In the coating clamp lid 52, a plate-shaped clamp lid body 52a that is openable and closable with respect to the lower clamp member 51 is provided with an opening and closing operating protrusion 52b that protrudes from the end portion of the clamp lid body 52a opposite to the side where the pivot 53 of the coating clamp 50 is provided.

The engaging claw 68b of the lid engagement protruding piece 68, specifically, is detachably engaged with the opening and closing operating protrusion 52b of the coating clamp lid 52.

The engaging claw 68b of the lid engagement protruding piece 68 is located at a position apart from the coating clamp lid 52 (coating clamp 52 shown by a two-dot chain line in FIG. 21) in the closed state, specifically, the opening and closing operating protrusion 52b to the upper side, with respect to the lower clamp member 51 of the coating clamp 50 in a state where the second cover member 620 is closed together with the apparatus body upper surface 21a.

The engaging claw 68b has a projection formed in the shape of a chevron whose protruding length from the tip piece portion 68d decreases from a central portion toward both sides, in an extending direction of the tip piece portion 68d from the overhanging piece portion 68c of the elastic protruding piece 68a.

The coating clamp lid 52 thrust up from the closed state thereof with respect to the lower clamp member 51 of the coating clamp 50 by the thrust-up pin 54 rides over the engaging claw 68b upward from below the engaging claw, and reaches the attractive force and biasing force balanced position.

The opening and closing operating protrusion 52b of the coating clamp lid 52 is rotated and lifted from the closed state as the coating clamp lid 52 is thrust up by the thrust-up pin 54.

As a result, the protruding end of the opening and closing operating protrusion 52b is butted against and brought into contact with the engaging claw 68b of the elastic protruding piece 68a, slightly elastically deforms the elastic protruding piece 68a, moves to the upper side of the engaging claw 68b, and reaches the attractive force and biasing force balanced position.

The opening and closing operating protrusion 52b of the coating clamp lid 52 rides over the engaging claw 68b upward from below the engaging claw, and is thereby engageable with the lid engagement protruding piece 68 (specifically, the engaging claw 68b).

In the fusion splicer 20C, when the opening and closing operating protrusion 52b of the coating clamp lid 52 in the closed state rides over a place (hereinafter also referred to as a maximum protruding place) upward from therebelow, the cover opening operation of rotating (opening operation) the pair of cover members 610 and 620 in the opening direction, respectively, and opening the windshield cover 60C with the driving force of the lid opening and closing power sources 619 and 629 (refer to FIG. 17) is started. Here, the above place is a place where the length of the engaging claw 68b of the lid engagement protruding piece 68 from the tip piece portion 68d becomes the maximum as a result the push-up operation of the thrust-up pin 54 by the clamp opening mechanism 90.

The coating clamp lid 52 is rotated and lifted by one or both of a force (push-up force) with which the clamp opening mechanism 90 pushes up the thrust-up pin 54 and a force (opening force) with which the lid opening and closing power source 629 (refer to FIG. 17) rotates the second cover member 620 in the opening direction, until the thrust-up pin 54 reaches a push-up limit position based on the clamp opening mechanism 90 after the opening and closing operating protrusion 52*b* of the coating clamp lid rides over the maximum protruding place of the engaging claw 68*b* of the lid engagement protruding piece 68 upward from below the maximum protruding place.

The coating clamp lid 52 is rotated (opening operation) in the opening direction together with the second cover member 620 in a state where the coating clamp lid is held by (coupled to) the second cover member 620 with the lid engagement protruding piece 68 (specifically, the engaging claw 68*b*), after the engaging claw 68*b* of the lid engagement protruding piece 68 is brought into contact with (engaged with) the opening and closing operating protrusion 52*b* by the opening operating of the second cover member 620.

However, as already described, the rotation center of the coating clamp lid 52 is located at a position shifted in the splicer front-and-rear direction (left-and-right direction in FIGS. 21 to 22) from the rotation center of the second cover member 620.

For this reason, with the progress of the opening operation of the second cover member 620, the position of the engaging claw 68*b* of the tip portion of the lid engagement protruding piece 68 deviates in a direction opposite to the clamp lid body 52*a* side relative to the opening and closing operating protrusion 52*b* of the coating clamp lid 52.

Then, as shown in FIG. 22, the engaging claw 68*b* of the tip portion of lid engagement protruding piece 68 is separated from the opening and closing operating protrusion 52*b* of the coating clamp lid 52 and disengaged from the opening and closing operating protrusion 52*b* until the coating clamp lid 52 reaches the opening limit position.

FIG. 22 shows a state where the coating clamp lid 52 reaches the opening limit position thereof and the cover members 610 and 620 on both sides of the windshield cover 60C continues the opening operation.

As shown in FIG. 22, the opening operation of the coating clamp lid 52 exceeding the opening limit position is regulated as the coating clamp lid reaches the opening limit position by the opening operation.

On the other hand, the second cover member 620 is opened from a state where the second cover member is closed with respect to the apparatus body upper surface 21*a* to a place where the second cover member is arranged on the opposite side via the rotating shaft 626 in the splicer front-and-rear direction.

The windshield cover 60C is brought into the fully opened state (state where the cover members 610 and 620 on both sides are located at the positions shown by the two-dot chain lines in FIG. 17) by the opening operation of the cover members 610 and 620 on both sides.

In the fusion splicer 20C in the fiber set standby state, the coating clamp lid 52 arranged at the opening limit position is apart from the engaging claw 68*b* of the lid engagement protruding piece 68 of the cover member 620A with a lid engaging portion of the windshield cover 60C in the fully opened state, and is brought into a state where the coating clamp lid is separated from the cover member 620A with a lid engaging portion.

For this reason, when the coating clamp lid 52 arranged at the opening limit position is manually closed with respect to the lower clamp member 51, it is not necessary to release the engagement with the lid engagement protruding piece 68 of the cover member 620A with a lid engaging portion.

Accordingly, the operation of being closed with respect to the lower clamp member 51 can be easily performed.

The specific shape of the lid engagement protruding piece that is detachably engaged with the coating clamp lid 52 to couple the coating clamp lid 52 to the second cover member 620 is not limited to the illustrated example, but a design change can be appropriately made.

Additionally, coupling means (coupling portion) that couples the coating clamp lid 52 and the second cover member 620 to each other is not limited to the coating clamp lid coupling portion provided at the windshield cover (second cover member 620 in FIGS. 18 to 22).

The coupling between the coating clamp lid 52 and the windshield cover may be, for example, a coupling portion (windshield coupling portion) provided at the coating clamp lid 52, such as a magnet that magnetically attracts a ferromagnetic body that is attached to the coating clamp lid 52 and provided at the windshield cover, or an engagement protruding piece that is provided so as to protrude from the coating clamp lid 52 and is detachably engaged with a locking portion of the windshield cover.

Additionally, as the coupling between the coating clamp lid 52 and the windshield cover, the coating clamp lid coupling portion and the coupling portion (windshield coupling portion) provided at the coating clamp lid 52 may be used together.

The configuration in which the windshield cover is provided with the coating clamp lid coupling portion can also be applied to the windshield cover 60 illustrated in FIGS. 2 and 3.

As the configuration in which the windshield cover is provided with the coating clamp lid coupling portion, for example, a configuration can be adopted in which an inner surface side (inner space 66 side of the windshield cover 60) of the top wall portion 64 of the windshield cover 60 is provided with a lid holding magnet 67 and/or the lid engagement protruding piece 68.

Additionally, even in the fusion splicer adopting the windshield cover 60 illustrated in FIGS. 2 and 3, the coating clamp lid 52 and the windshield cover may be coupled together by a combination of the coupling portion (windshield coupling portion) provided at the coating clamp lid 52 or the coating clamp lid coupling portion, and the coupling portion (windshield coupling portion) provided at the coating clamp lid 52.

In addition, in the windshield cover 60 illustrated in FIGS. 2 and 3, the windshield cover 60 itself functions as a cover member openable and closable by the rotation thereof with respect to the apparatus body 21.

In other words, the windshield cover 60 illustrated in FIGS. 2 and 3 is a windshield cover constituted by one cover member.

In the fusion splicer in which the cover member or the coating clamp lid 52 of the windshield cover is provided with the engagement protruding piece, for example, it is also possible to adopt a configuration in which the cover member and the coating clamp lid 52 of the windshield cover are coupled together by the engagement protruding piece in the stage where the coating clamp lid 52, which starts to be rotated and lifted from the closed state as the clamp opening mechanism 90 pushes up the thrust-up pin 54, does not reach the attractive force and ascending force balanced position or the attractive force and ascending force balanced position.

(Modification Example of Coating Clamp Installation Base)

Figure 23:
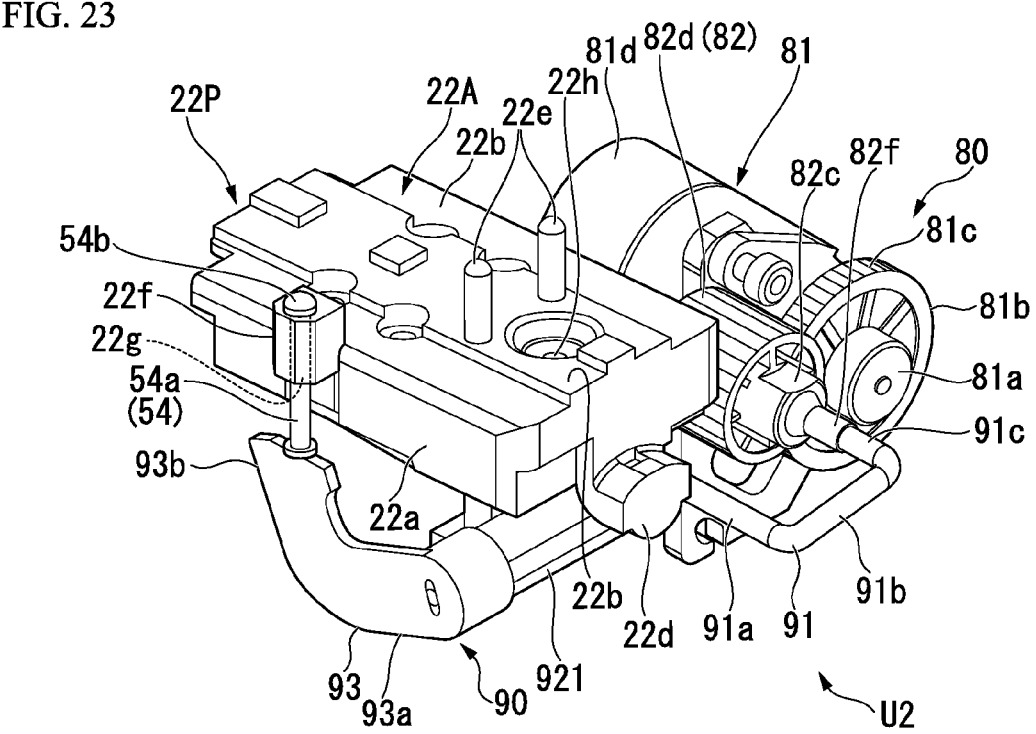
FIG. 23 is a perspective view illustrating a modification example of the coating clamp installation base provided in the optical fiber fusion splicer, and an advancing and retreating unit constituted by the coating clamp installation base, the installation base advancing mechanism, and the clamp opening mechanisms.

FIG. 23 shows a modification example of the movable stage (coating clamp installation base).

In the movable stage 22A (coating clamp installation base) shown in FIG. 23, the movable stage 22 illustrated in FIGS. 6A to 14B and the like is provided with a pin supporting protrusion 22f used to support the thrust-up pin 54.

Additionally, FIG. 23 shows an installation base 22P with a thrust-up pin with a configuration in which the thrust-up pin 54 is elevatably provided at the movable stage 22A.

In addition, in the present specification, the installation base 22P with a thrust-up pin is also treated as functioning as the coating clamp installation base.

As shown in FIG. 23, the movable stage 22A is provided so that the pin supporting protrusion 22f protrudes to the side surface of the installation base body 22a of the movable stage 22 illustrated in FIGS. 6A to 14B and the like, on one side in the splicer front-and-rear direction.

In FIG. 23, the pin supporting protrusion 22f is provided so as to protrude from the side surface of the installation base body 22a opposite to the splicer rear side where the installation base advancing mechanism 80 is installed.

The pin supporting protrusion 22f of the movable stage 22A of the illustrated example is a protrusion formed integrally with the installation base body 22a.

However, the pin supporting protrusion 22f may be a member separate from the installation base body 22a, which is fixed to and integrated with the installation base body 22a.

The thrust-up pin 54 is provided at the movable stage 22A so as to be movable in the up-and-down direction by inserting the pin body 54a into a pin insertion hole 22g penetrating the pin supporting protrusion 22f up and down so as to be movable in the axis direction of the pin insertion hole.

The pin insertion hole 22g of the pin supporting protrusion 22f is formed with a cross-sectional size such that the head 54b arranged on the pin supporting protrusion 22f of the thrust-up pin 54 does not enter the pin insertion hole.

The thickness of the pin supporting protrusion 22f in a direction along the central axis of the pin insertion hole 22g is adjusted so that the portion of the thrust-up pin 54 on the lower end 54c side protrudes downward from the pin supporting protrusion 22f when the head 54b of the thrust-up pin 54 is brought into contact with the upper surface of the pin supporting protrusion.

Figure 24:
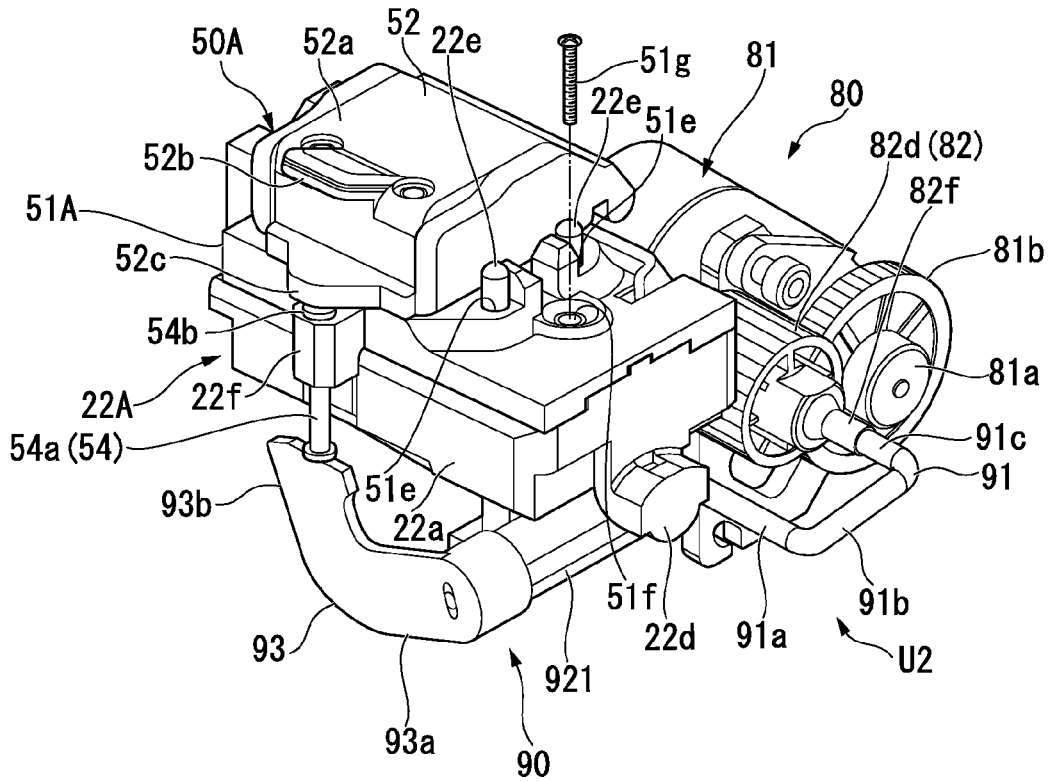
FIG. 24 is a perspective view showing a state where the coating clamp is attached onto the coating clamp installation base of an advancing and retreating mechanism of FIG. 23.

FIG. 24 shows a state where a coating clamp 50A is attached onto the installation base body 22a of the movable stage 22A in FIG. 23.

The coating clamp 50A illustrated in FIG. 24 is different from the coating clamp 50 illustrated in FIGS. 6A to 14B and the like only in that the coating clamp adopts a lower clamp member 51A with a configuration in which the pin insertion hole 51b and the thrust-up pin 54 are omitted from the lower clamp member 51 of the coating clamp 50.

The coating clamp 50A is different from the coating clamp 50 illustrated in FIGS. 6A to 14B and the like in that the coating clamp does not have the pin insertion hole 51b and the thrust-up pin 54, and is the same as those of the coating clamp 50 in terms of the other configurations.

FIG. 24 shows a configuration in which the coating clamp 50A that does not have the installation base 22P with a thrust-up pin, and the thrust-up pin 54 is adopted instead of the movable stage 22 and the coating clamp 50, regarding the fusion splicer 20A described with reference to FIGS. 1 to 16B.

The movable stage 22 shown in FIG. 6A, FIG. 6B, FIG. 10, and the like and the installation base advancing mechanism 80 and the clamp opening mechanism 90 around the movable stage constitute an advancing and retreating unit U1 that advances and retreats the coating clamp 50 toward the discharge portion 24a (refer to FIGS. 6A and 6B).

The advancing and retreating unit U1 advances and retreats the coating clamp 50 toward the discharge portion 24a with a driving force generated by the advancing mechanism power source 81 and the elastic biasing force of the proofing spring 83.

Additionally, the advancing and retreating unit U1 rotates and lifts the coating clamp lid 52 in the closed state as the clamp opening mechanism 90 pushes up the thrust-up pin 54 provided at the coating clamp 50 with the driving force generated by the advancing mechanism power source 81.

FIG. 24 shows an advancing and retreating unit U2 with a configuration in which the installation base 22P with a thrust-up pin is adopted instead of the movable stage 22, regarding the advancing and retreating unit U1 shown in FIG. 6A, FIG. 6B, FIG. 10, and the like.

The advancing and retreating unit U2 advances and retracts the coating clamp 50A toward the discharge portion 24a with the driving force generated by the advancing mechanism power source 81 and the elastic biasing force of the proofing spring 83.

Additionally, in the advancing and retreating unit U2, the clamp opening mechanism 90 pushes up the thrust-up pin 54 of the installation base 22P with a thrust-up pin, and the coating clamp lid 52 of the coating clamp 50A gripping and fixing the optical fiber is pushed up, rotated, and lifted by the thrust-up pin 54.

That is, in the advancing and retreating unit U2, even when the coating clamp 50A attached on the installation base body 22a of the movable stage 22 is not provided with the thrust-up pin 54, the clamp opening mechanism 90 can push up the thrust-up pin 54 of the installation base 22P with a thrust-up pin to rotate and lift the coating clamp lid 52 in the closed state.

The relationship between the lower end 54c of the thrust-up pin 54 of the installation base 22P with a thrust-up pin and the opening lever 93 of the clamp opening mechanism 90 is the same as the relationship between the lower end 54c of the thrust-up pin 54 of the coating clamp 50 and the opening lever 93 that are illustrated in FIGS. 6A to 14B and the like.

In the clamp opening mechanism 90, the push-up piece 93b of the opening lever 93 rotated by the driving force of the advancing mechanism power source 81 (refer to FIG. 6A, FIG. 10, and the like) pushes up the thrust-up pin 54.

In the clamp opening mechanism 90, the coating clamp lid 52 in the closed state can be rotated and lifted, for example, to a position above the attractive force and biasing force balanced position by the push-up of the thrust-up pin 54.

However, the push-up amount of the thrust-up pin 54 by the clamp opening mechanism 90 can be appropriately set according to the presence/absence of installation of coupling means to the windshield cover and/or the coating clamp lid 52 of the fusion splicer, the configuration of the coupling means, or the like so that the coating clamp lid 52 can reach the opening limit position by the rotation of the coating clamp lid 52 after reaching the upper limit position.

For example, in the case of the fusion splicer 20B described with reference to FIGS. 18 to 20 already described, the coating clamp lid 52 in the closed state can be rotated and lifted to a position above the attractive force and ascending force balanced position by pushing up the thrust-up pin 54 using the clamp opening mechanism 90.

As shown in FIGS. 23 and 24, the movable stage 22A also has a protruding locating pin 22e on the installation base body 22a.

The locating pins 22e are provided so as to protrude from two places on the installation base body 22a.

Pin fitting holes 51e that allow the locating pins 22e on the installation base body 22a of the movable stage 22A to be inserted and fitted thereinto are formed in two places of the lower clamp member 51A of the coating clamp 50A.

The pin fitting holes 51e of the illustrated example are formed so as to penetrate the lower clamp member 51A of the coating clamp 50A in the thickness direction.

The coating clamp 50A is provided on the installation base body 22a such that the locating pins 22e of the movable stage 22A are respectively inserted and fitted into the pin fitting holes 51e in two places of the lower clamp member 51A and the lower clamp member 51A is fixed onto the installation base body 22a by fixing means (fixing portion), such as screwing.

The two locating pins 22e of the movable stage 22A fulfill the functions of positioning of the lower clamp member 51A of the coating clamp 50A with respect to the installation base body 22a, and positional deviation prevention.

The coating clamp lid 52 of the coating clamp 50A shown in FIG. 24 has a push-up receiving protrusion 52c that protrudes to the side opposite to the side where the pivot 53 is provided, from the lower clamp member 51A, in a state where coating clamp lid is closed with respect to the lower clamp member 51A.

The thrust-up pin 54 pushed up by the clamp opening mechanism 90, specifically, thrusting up the push-up receiving protrusion 52c of the coating clamp lid 52 from below the push-up receiving protrusion to rotate and lift the coating clamp lid 52.

In the coating clamp 50A, the lower clamp member 51A is positioned on the installation base body 22a by the locating pins 22e of the movable stage 22A and attached onto the movable stage 22A so that the push-up receiving protrusion 52c of the coating clamp lid 52 when being brought into the closed state with respect to the lower clamp member 51A is located on an extension of the central axis of the pin insertion hole 22g (refer to FIG. 23) of the movable stage 22A.

The locating pins 22e are provided also on the installation base body 22a of the movable stage 22 illustrated in FIGS. 6A to 14B and the like.

The movable stage 22 has the locating pins 22e provided so as to protrude from two places on the installation base body 22a.

In the coating clamp 50 illustrated in FIGS. 6A to 14B and the like, the locating pins 22e of the movable stage 22 are respectively fitted into the pin fitting holes 51e formed in two places of the lower clamp member 51, and the lower clamp member 51 is fixed onto the installation base body 22a by fixing means (fixing portion), such as screwing, attached onto the installation base body 22a.

The two locating pins 22e of the movable stage 22 fulfill the functions of positioning of the lower clamp member 51 of the coating clamp 50 with respect to the installation base body 22a, and positional deviation prevention.

As shown in FIG. 24, the plate-shaped lower clamp member 51A of the coating clamp 50A is formed with a screw insertion hole 51f penetrating the lower clamp member 51A in the thickness direction.

Additionally, as shown in FIG. 23, the installation base body 22a of the movable stage 22A is formed with a female thread hole 22h that allows a screw 51g passed through the screw insertion hole 51f of the lower clamp member 51A (refer to FIG. 24) installed on the upper surface 22b of the installation base body to be screwed thereinto and fastens and fixes the lower clamp member 51A onto the installation base body 22a.

The female thread hole 22h is formed so as to open to the upper surface 22b of the installation base body 22a.

As shown in FIG. 24, the coating clamp 50A is attached to the movable stage 22A by fastening and fixing the lower clamp member 51A to the installation base body 22a with the screw 51g that is screwed into the female thread hole 22h (refer to FIG. 23) of the installation base body 22a of the movable stage 22A through the screw insertion hole 51f of the lower clamp member 51A.

The screw 51g functions as a fixing portion (hereinafter also referred to as coating clamp fixing means) for fixing the coating clamp 50A onto the movable stage 22A.

As the coating clamp fixing means, means capable of switching between fixing and unfixing of the coating clamp 50A with respect to the movable stage 22A is used.

The screw 51g that fixes the coating clamp 50A onto the movable stage 22A can be rotationally operated in a direction opposite to the direction when being screwed into the female thread hole 22h of the installation base body 22a and be extracted from the female thread hole 22h, and thereby be released from the fixing of the coating clamp 50A to the movable stage 22A.

The coating clamp 50A attached by fixing the lower clamp member 51A onto the installation base body 22a of the movable stage 22A with the female thread hole 22h can be detached from the movable stage 22A by lifting, from the installation base body 22a, the lower clamp member 51A released from the fixing to the movable stage 22A by the female thread hole 22h, and extracting the lower clamp member 51A from the locating pins 22e fitted into the pin fitting holes 51e.

In addition, the female thread hole 22h is formed in the installation base body 22a illustrated in FIG. 23; the same applies to the installation base body 22a of the movable stage 22 illustrated in FIGS. 6A to 14B and the like.

Illustration of the female thread hole 22h of the installation base body 22a of the movable stage 22 is omitted.

The lower clamp member 51 of the coating clamp 50 illustrated in FIGS. 6A to 14B and the like is also attached to the movable stage 22 by being fastened and fixed to the installation base body 22a by screwing the screw 51g, which is passed through the screw through hole (not shown) penetrating the lower clamp member in the thickness direction, into the female thread hole 22h of the installation base body 22a.

The coating clamp 50 can be detached from the movable stage 22 by extracting the screw 51g from the female thread hole 22h by the rotational operation of the screw in the direction opposite to the direction when being screwed into the female thread hole of the installation base body 22a.

Additionally, the lower clamp member 51 of the coating clamp 50 illustrated in FIGS. 6A to 14B and the like is also formed with the pin fitting holes 51e (refer to FIGS. 6A and 10) penetrating the lower clamp member in the thickness direction.

The lower clamp member 51 of the coating clamp 50 is positioned with respect to the movable stage 22 and is attached to the movable stage 22 by inserting and fitting the locating pins 22e provided so as to protrude from two places on the installation base body 22a of the movable stage 22 into the pin fitting hole 51e.

The coating clamp fixing means capable of switching the fixing and unfixing of the lower clamp member of the coating clamp with respect to the movable stage is not limited to the screw 51*g*.

The coating clamp fixing means has, for example, a hold-down member arranged on the lower clamp member of the coating clamp installed on the installation base body 22*a*, and a fixing mechanism capable of switching the fixing and unfixing of the lower clamp member with respect to the installation base body 22*a* by the hold-down member by the rotation operation of a nut threadedly attached to a screw shaft that protrudes onto the installation base body 22*a* of the movable stage can be adopted.

Figure 25:
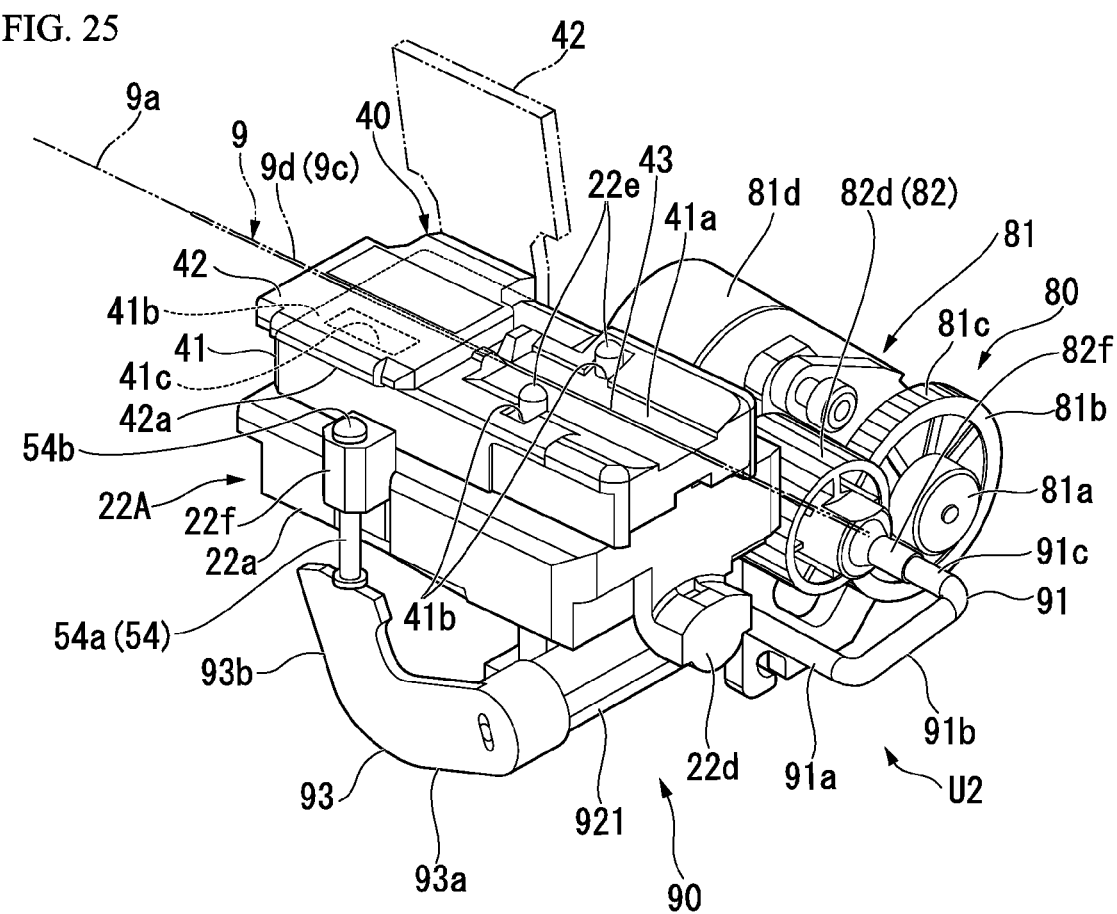
FIG. 25 is a perspective view showing a state where the fiber holder is placed on the coating clamp installation base of the advancing and retreating mechanism of FIG. 23.

As shown in FIG. 25, the movable stage 22A illustrated in FIG. 23 can also mount the fiber holder 40 that is a coating clamp detachably placed on the installation base body 22*a*.

The fiber holder 40 has an elongated plate-shaped base plate 41 (lower clamp member), and a lid plate 42 (coating clamp lid) pivotally attached to the base plate 41 via a pivot (not shown) provided at a width-direction piece end of the base plate 41 in the upper surface 41*a* of the base plate 41.

The lid plate 42 is openably and closably provided on the base plate upper surface 41*a* by its rotation around the pivot.

Additionally, the fiber holder 40 maintains a metallic lid plate 42 formed of, for example, a ferromagnetic material, such as iron, in a state where the lid plate 42 is closed with respect to the base plate 41 by the magnetic attractive force of the permanent magnet 41*c* (hereinafter also referred to as a lid closing magnet) provided at the base plate 41.

However, the attractive force of the permanent magnet acting on the lid plate 42 in the closed state with respect to the base plate 41 is set to a magnitude that an operator forcibly can rotate and open the lid plate 42 closed with respect to the base plate 41 in the opening direction with an operator's fingers.

The lid plate 42 is not limited to a configuration formed entirely of a ferromagnetic material capable of being magnetically attracted to the lid closing magnet 41*c* of the base plate 41, but may adopt a configuration formed only partially of a ferromagnetic material.

As shown in FIG. 25, the fiber groove 43 that positions the optical fiber 9 is formed in the base plate upper surface 41*a* so as to extend over the total length of the base plate upper surface 41*a* in the longitudinal direction thereof that coincides with the longitudinal direction of the base plate 41.

The fiber holder 40 can grip and fix the optical fiber 9 between the base plate 41 and the lid plate 42 by closing the lid plate 42 in the opened state with respect to the base plate 41 after the optical fiber 9 is arranged in the fiber groove 43 of the base plate 41 in a state where the lid plate 42 is closed with respect to the base plate 41.

In the fiber set operation of mounting the fusion splicer with the optical fiber 9 to be fusion-spliced using the fiber holder 40, the fiber holder 40 is placed on the movable stage of the fusion splicer in a state where the optical fiber 9 is gripped and fixed after the optical fiber 9 is gripped and fixed by the fiber holder 40.

The optical fiber 9 is gripped and fixed between the base plate 41 and the lid plate 42 of the fiber holder 40 in a state where the tip portion thereof is made to protrude from the fiber holder 40.

The covered portion 9*d* (refer to FIG. 1 and the like) of the optical fiber 9 is gripped and fixed between the base plate 41 and the lid plate 42 of the fiber holder 40.

The fiber holder 40 that has gripped and fixed the optical fiber 9 is placed on the movable stage in a state that the covering material 9*c* of the tip portion of the optical fiber 9 made to protrude from the fiber holder 40 is removed to expose the optical fiber glass portion 9*a*.

As shown in FIG. 25, pin fitting holes 41*b* that allow the two locating pins 22*e* on the installation base body 22*a* of the movable stage 22A to be inserted and fitted thereinto are formed in two places in the base plate 41 of the fiber holder 40.

The pin fitting holes 41*b* of the illustrated example are formed so as to penetrate the base plate 41 of the fiber holder 40 in the thickness direction.

The base plate 41 is placed on the upper surface 22*b* (refer to FIG. 23) of the installation base body 22*a* by inserting and fitting the locating pins 22*e* of the movable stage 22A into the pin fitting holes 41*b* in two places of the base plate 41, respectively, in a state where the fiber holder 40 grips and fixes the optical fiber 9.

The base plate 41 of the fiber holder 40 placed on the installation base body 22*a* is positioned with respect to the installation base body 22*a* by the two locating pins 22*e* of the movable stage 22A, and the positional deviation of the base plate with respect to the installation base body 22*a* is also regulated.

The base plate 41 of the fiber holder 40 placed on the installation base body 22*a* of the movable stage 22A is not fixed to the installation base body 22*a*.

The fiber holder 40 attached to the movable stage 22A by placing the base plate 41 on the installation base body 22*a* can be detached from the movable stage 22A simply by lifting the fiber holder from the installation base body 22*a* and extracting the base plate 41 from the locating pins 22*e* fitted into the pin fitting holes 41*b* of the base plate 41.

The lid plate 42 of the fiber holder 40 has an opening and closing operating protrusion 42*a* that protrudes from the base plate 41 to the side opposite to the side where the pivot is provided, in the width direction of the base plate 41.

The fiber holder 40 placed on the installation base body 22*a* of the installation base 22P with a thrust-up pin is positioned and arranged with respect to the installation base body 22*a* by the two locating pins 22*e* of the movable stage 22A so that the opening and closing operating protrusion 42*a* of the lid plate 42 is located on the extension of the central axis of the pin insertion hole 22*g* of the movable stage 22A in a state where the lid plate 42 is closed with respect to the base plate 41.

In the advancing and retreating unit U2, the opening and closing operating protrusion 42*a* of the lid plate 42 of the fiber holder 40 that grips and fixes the optical fiber 9 and is placed on the movable stage 22A can be thrust up from below the operating protrusion by the thrust-up pin 54 pushed up by the clamp opening mechanism 90 and be rotated (opening operation) and lifted in the opening direction.

Additionally, the coating clamps 50 and 50A already described has the opening auxiliary elastic member 56 (refer to FIG. 10 and the like).

In contrast, the fiber holder 40 of the illustrated example is not provided with the elastic member that elastically biases the lid plate 42 in the opening direction with respect to the base plate 41.

The push-up amount of the thrust-up pin 54 by the clamp opening mechanism 90 in the advancing and retreating unit U2 can be appropriately set.

For example, in a case where the advancing and retreating unit U2 is applied to the fusion splicer 20B described with reference to FIGS. 18 to 20 already described, the lid holding magnet 67 of the second cover member 620 is arranged so that a slight separation distance is secured on the upper side of the fiber holder 40 carried on the movable stage 22A in a state where the optical fiber is gripped and fixed, when the windshield cover 60B is brought into the closed state by the cover closing operation.

In the advancing and retreating unit U2, after the start of the spliced portion tension inspection, the thrust-up pin 54 is pushed up by the clamp opening mechanism 90 to rotate and lift the lid plate 42 of the fiber holder 40 to a position where the attractive force of the lid holding magnet 67 that acts on the lid plate 42 exceeds the attractive force of the lid closing magnet 41c that acts on the lid plate 42.

Here, an attractive force and attractive force balanced position (attractive force and opening force balanced position) where the attractive force of the lid closing magnet that acts on the lid plate 42 rotated and lifted from the closed state, and the attractive force of the lid holding magnet 67 become equal to each other is present between the lid closing magnet 41c of the base member 41 of the fiber holder 40 mounted on the movable stage 22A, and the lid holding magnet 67 of the second cover member 620 of the windshield cover 60B in the closed state.

In the advancing and retreating unit U2, the thrust-up pin 54 is pushed up by the clamp opening mechanism 90 to rotate and lift the lid plate 42 of the fiber holder 40 to a position above the attractive force and attractive force balanced position.

In addition, as the coating clamp, a configuration in which the opening auxiliary elastic member 56 is omitted from the coating clamp 50 already described, and a configuration in which the opening auxiliary elastic member 56 is omitted from the coating clamp 50A can also be adopted.

When the thrust-up pin 54 by the clamp opening mechanism 90 in this case is pushed up, the coating clamp lid 52 is rotated and lifted to a position above the attractive force and attractive force balanced position.

Additionally, the advancing and retreating unit U2 can also be applied to the fusion splicer 20B described with reference to FIGS. 21 and 22 already described.

In this case, in the advancing and retreating unit U2, the thrust-up pin 54 is pushed up by the clamp opening mechanism 90 to rotate and lift the lid plate 42 in the closed state of the fiber holder 40 to a position where the opening and closing operating protrusion 42a thereof is engageable with the engaging claw 68b of the tip portion of the lid engagement protruding piece 68, that is, a position where the opening and closing operating protrusion 42a rides over the engaging claw 68b of the tip portion of the lid engagement protruding piece 68, and is arranged on the upper side the engaging claw.

Here, the thrust-up pin 54 by the clamp opening mechanism 90 of the advancing and retreating unit U2 is pushed up to a position where the opening and closing operating protrusion 42a of the lid plate 42 of the fiber holder 40 can ride over the engaging claw 68b of the lid engagement protruding piece 68 from below the engaging claw and is arranged on the upper side the engaging claw 68b.

In the thrust-up pin 54 by the clamp opening mechanism 90, the position of the thrust-up pin 54 where the opening and closing operating protrusion 42a of the lid plate 42 that has ridden over the engaging claw 68b is brought into contact with the engaging claw 68b may be defined as an upper limit, and the position of the thrust-up pin 54 where the opening and closing operating protrusion 42a of the lid plate 42 is arranged in a place slightly apart from the engaging claw 68b to the upper side may be defined as an upper limit.

The installation base 22P with a thrust-up pin illustrated in FIG. 23 can selectively mount the coating clamp 50A and the fiber holder 40 on the installation base body 22a.

Additionally, in the installation base 22P with a thrust-up pin, it is also possible to release the fixing by the coating clamp fixing tool of the coating clamp 50A fixed onto the installation base body 22a using the coating clamp fixing tool already described to detach the coating clamp 50A from on the installation base body 22a, and to detachably mount the fiber holder 40 on the installation base body 22a.

That is, in the installation base 22P with a thrust-up pin, the coating clamp 50A can be replaced with the fiber holder 40.

Additionally, it is also possible to change the installation base 22P with a thrust-up pin from a state where the installation base is used to mount the fiber holder 40 to a configuration where the coating clamp 50A is fixed onto the installation base body 22a.

(Configuration in which Coating Clamp Lid is Opened Only by Driving Force of Windshield Opening and Closing Power Source)

For example, as in the fusion splicer 20C illustrated in FIGS. 21 and 22, a configuration in which the engaging claw 68b of the tip portion of the lid engagement protruding piece 68 enters the lower side of the opening and closing operating protrusion 52b of the coating clamp lid 52 in the closed state and is engageable with the opening and closing operating protrusion 52b when the cover closing operation of closing the windshield cover brought into the opened state (full opened) in the fiber set standby state is completed can also be adopted in the fusion splicer in which the cover member or the coating clamp lid 52 of the windshield cover is provided with the engagement protruding piece.

This configuration can be realized by performing a design change of increasing the protruding length of the tip piece portion 68d from the overhanging piece portion 68c, on the lid engagement protruding piece 68 illustrated in FIGS. 21 and 22 so that the engaging claw 68b enters the lower side of the opening and closing operating protrusion 52b of the coating clamp lid 52 in the closed state when cover closing operation is completed.

In this configuration, for example, in the cover opening operation executed after the start of the spliced portion inspection after the fusion splicing operation without performing the push-up of the coating clamp lid 52 by the clamp opening mechanism 90 pushing up the thrust-up pin 54, the coating clamp lid 52 held on the second cover member 620 by the lid engagement protruding piece 68 can be opened by the opening operation of the second cover member 620 and arranged at the opening chord opening position.

In this case, the coating clamp lid 52 in the closed state is opened simply by the power generated by the windshield opening and closing power source 629.

Additionally, since it is necessary to push up the thrust-up pin 54 by the clamp opening mechanism 90, the clamp opening mechanism 90 can be omitted in the advancing and retreating unit U1.

As the configuration in which the coating clamp lid only is opened by the driving force of the windshield opening and closing power sources, it is also possible to adopt, for example, a configuration or the like in which the thrust-up pin 54 is pushed up by the power (driving force) generated the windshield opening and closing power source to open the coating clamp lid 52 in the closed state, in addition to the configuration in which the windshield cover provided with the lid engagement protruding piece 68 is adopted as described above.

As the configuration in which the thrust-up pin 54 is pushed up by the driving force of the shield opening and closing power source in this case, for example, it is possible to adopt a configuration in which an elevating member lifted and lowered by the driving force of the windshield opening and closing power source is arranged under the thrust-up pin 54, and the push-up of the thrust-up pin 54 is realized by the ascent of the elevating member.

Although the invention has been described above on the basis of the best mode, the invention is not limited to the above-described best mode, and various improvements can be made without departing from the scope of the invention.

For example, the execution of the cover closing operation from the fiber set standby state in the fusion splicer is not limited to the operation of the cover closing switch 31d (refer to FIG. 3) shown in FIG. 2.

As the fusion splicer related to the invention, for example, the cover closing operation may be automatically executed when the completion of gripping and fixing of the optical fibers 9A and 9B to the coating clamps 50 on both left and right sides, or the completion of installation of the fiber holders 40 onto the movable stages 22 on both left and right sides is detected by a sensor, and the fusion splicing operation may be automatically started after the completion.

Additionally, as the Coating clamp system fusion splicer 20A, a configuration may be adopted which the cover closing operation is automatically executed using, as a trigger, an event that a sensor has detected the installation of the optical fibers 9A and 9B onto the lower clamp members 51 of the coating clamps 50 on both left and right sides or an event that sensors installed near the coating clamps 50 on both left and right sides have detected operator's fingers simultaneously on the right and left sides, and the fusion splicing operation is automatically executed after the completion.

In addition, the fusion splicer related to the invention has a configuration in which the fusion splicing operation is not started when occurrence of a closing operation abnormality is detected irrespective of what a trigger signal that functions as an operation start command for the start of the cover closing operation is.

What is claimed is:

1. An optical fiber fusion splicer,
   wherein after a fusion splicing is completed, a portion of a drive mechanism, which advances a coating clamp installation base by a power of a power source for advancing the coating clamp installation base, is separated and retreated from the coating clamp installation base,
   when retreating a portion of the drive mechanism, the power of the power source is transmitted to a pin that is placed at a lower portion of a coating clamp lid of a coating clamp via the drive mechanism, the coating clamp being attached to the coating clamp installation base, and
   the pin pushes up the coating clamp lid to perform an operation of opening the coating clamp lid.

2. The optical fiber fusion splicer according to claim 1,
   wherein the pin is pushed up via a link part when the portion of the drive mechanism is separated and retreated from the coating clamp installation base, and
   the pin pushes up the coating clamp lid.

3. The optical fiber fusion splicer according to claim 2, further comprising:
   a windshield opening and closing mechanism that opens and closes a windshield cover by using a power source; and
   a coupling portion arranged at at least one of the coating clamp lid and the windshield cover and coupling the coating clamp lid and the windshield cover to each other,
   wherein both the power generated by the power source for advancing the coating clamp installation base and opening the coating clamp lid by an operation of opening the windshield cover and a power generated by the power source of the windshield opening and closing mechanism by the operation of opening the windshield cover coupled to the coating clamp lid are used for the operation of opening the coating clamp lid.

4. The optical fiber fusion splicer according to claim 3, wherein
   the coupling portion is a magnet that couples the coating clamp lid and the windshield cover to each other with magnetic attraction.

5. The optical fiber fusion splicer according to claim 3,
   wherein the coupling portion is a lid engagement protruding piece that is provided so as to protrude from the windshield cover and is detachably engaged with the coating clamp lid to couple the coating clamp lid to the windshield cover.

6. The optical fiber fusion splicer according to claim 1, further comprising:
   a windshield opening and closing mechanism that opens and closes a windshield cover by using a power source; and
   a coupling portion arranged at at least one of the coating clamp lid and the windshield cover and coupling the coating clamp lid and the windshield cover to each other,
   wherein both the power generated by the power source for advancing the coating clamp installation base and opening the coating clamp lid by an operation of opening the windshield cover and a power generated by the power source of the windshield opening and closing mechanism by the operation of opening the windshield cover coupled to the coating clamp lid are used for the operation of opening the coating clamp lid.

7. The optical fiber fusion splicer according to claim 1,
   wherein the coating clamp has an elastic member which adds a force in a direction in which the coating clamp lid is opened so that the coating clamp lid is easily opened.

8. The optical fiber fusion splicer according to claim 1,
   wherein the coating clamp is fixable on the coating clamp installation base by using a fixing portion and detachable from the coating clamp installation base by releasing fixation of the fixing portion, and a fiber holder is detachably mounted on the coating clamp installation base, and
   the coating clamp and the fiber holder have a replaceable structure, and the lid plate of the fiber holder is opened by the same mechanism as the mechanism that opens the coating clamp lid when the fiber holder is mounted.

9. The optical fiber fusion splicer according to claim 1,
   wherein whether to simultaneously open both of the coating clamp lid and an other coating clamp lid or whether to open only one of the coating clamp lid and the other coating clamp lid after the fusion splicing is completed is switchable by switching a setting of software.

10. The optical fiber fusion splicer comprising:
    a windshield opening and closing mechanism that opens and closes a windshield cover by a power source;
    a coating clamp capable of maintaining a state where a coating clamp lid is closed with respect to a lower clamp member; and
    a coupling portion arranged at at least one of the coating lamp lid and the windshield cover and coupling the coating clamp lid to the windshield cover to each other,
    wherein after a fusion splicing is completed, a closed state of the coating clamp lid is released, and the coating clamp lid is floated with respect to the lower clamp member, an operation of opening the coating clamp lid is performed by an operation of opening the windshield cover coupled to the coating clamp lid by a power generated by the power source of the windshield opening and closing mechanism, wherein the coating clamp is fixable on the coating clamp installation base by using a fixing portion and detachable from the coating clamp installation base by releasing fixation of the fixing portion, and a fiber holder is detachably mounted on the coating clamp installation base, and the coating clamp and the fiber holder have a replaceable structure, and the lid plate of the fiber holder is opened by the same mechanism as the mechanism that opens the coating clamp lid when the fiber holder is mounted.

11. The optical fiber fusion splicer according to claim 10, wherein the coupling portion is a magnet that couples the coating clamp lid and the windshield cover to each other with magnetic attraction.

12. The optical fiber fusion splicer according to claim 10, wherein the coupling portion is a lid engagement protruding piece that is provided so as to protrude from the windshield cover and is detachably engaged with the coating clamp lid to couple the coating clamp lid to the windshield cover.

13. The optical fiber fusion splicer according to claim 10, wherein the coating clamp has an elastic member which adds a force in a direction in which the coating clamp lid is opened so that the coating clamp lid is easily opened.

14. The optical fiber fusion splicer according to claim 10, wherein whether to simultaneously open both of the coating clamp lid and an other coating clamp lid or whether to open only one of the coating clamp lid and the other coating clamp lid after the fusion splicing is completed is switchable by switching a setting of software.

* * * * *